(12) United States Patent
Kumar et al.

(10) Patent No.: US 11,564,195 B2
(45) Date of Patent: Jan. 24, 2023

(54) METHOD AND SYSTEM FOR HANDLING SERVICE REQUEST PROCEDURE IN COMMUNICATION NETWORK

(71) Applicant: Samsung Electronics Co., Ltd., Suwon-si (KR)

(72) Inventors: Lalith Kumar, Bangalore (IN); Kailash Kumar Jha, Bangalore (IN); Nitesh Pushpak Shah, Bangalore (IN); Ricky Kumar Kaura, Bangalore (IN); Shweta M, Bangalore (IN); Ajay Kumawat, Bangalore (IN); Vikrant Bajaj, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/040,756

(22) PCT Filed: Mar. 25, 2019

(86) PCT No.: PCT/KR2019/003458
§ 371 (c)(1),
(2) Date: Sep. 23, 2020

(87) PCT Pub. No.: WO2019/182430
PCT Pub. Date: Sep. 26, 2019

(65) Prior Publication Data
US 2021/0022099 A1  Jan. 21, 2021

(30) Foreign Application Priority Data

Mar. 23, 2018  (IN) .............................. 201841010796
Apr. 17, 2018  (IN) .............................. 201841014625
Mar. 20, 2019  (IN) .............................. 201841010796

(51) Int. Cl.
*H04W 60/04* (2009.01)
*H04W 76/11* (2018.01)
(Continued)

(52) U.S. Cl.
CPC ............. *H04W 60/04* (2013.01); *H04W 8/08* (2013.01); *H04W 68/005* (2013.01); *H04W 76/11* (2018.02); *H04W 80/08* (2013.01)

(58) Field of Classification Search
CPC ....... H04W 8/08; H04W 60/00; H04W 60/04; H04W 68/005; H04W 76/10; H04W 76/11; H04W 76/12
(Continued)

(56) References Cited

U.S. PATENT DOCUMENTS

2015/0223284 A1   8/2015  Jain et al.
2018/0376444 A1*  12/2018 Kim ...................... H04W 76/12
(Continued)

FOREIGN PATENT DOCUMENTS

EP         3 419 374 A1   12/2018
WO      2017/142171 A1    8/2017
(Continued)

OTHER PUBLICATIONS

Samsung et al.; Infrequent Small Data Transmission; Using Resume and Suspend procedure; SA WG2 Meeting #127; S2-183744; Apr. 16-20, 2018; Sanya, China.
(Continued)

*Primary Examiner* — Harun Chowdhury
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to
(Continued)

intelligent services based on the 5G communication technology and the IoT-related technology, such as smart home, smart building, smart city, smart car, connected car, health care, digital education, smart retail, security and safety services. The method includes configuring, by a User Equipment (UE) (100), a Protocol Data Unit (PDU) session type as an always-ON type or a normal PDU type. Further, the method includes sending, by the UE (100), a PDU session establishment request message including the PDU session type to be the always-ON type or the normal PDU type to a network (200) during an initial PDU session establishment procedure.

14 Claims, 30 Drawing Sheets

(51) Int. Cl.
    *H04W 8/08*     (2009.01)
    *H04W 68/00*     (2009.01)
    *H04W 80/08*     (2009.01)

(58) Field of Classification Search
    USPC ................................ 370/252, 331, 338, 352
    See application file for complete search history.

(56) References Cited

U.S. PATENT DOCUMENTS

| | | |
|---|---|---|
| 2019/0069327 A1 | 2/2019 | Kim et al. |
| 2019/0124561 A1* | 4/2019 | Faccin .................. H04W 60/00 |
| 2019/0166647 A1 | 5/2019 | Velev et al. |
| 2019/0364541 A1* | 11/2019 | Ryu ....................... H04W 76/25 |
| 2020/0099750 A1* | 3/2020 | Kim ....................... H04W 60/00 |
| 2020/0187276 A1* | 6/2020 | Wang .................... H04W 76/10 |

FOREIGN PATENT DOCUMENTS

| | | |
|---|---|---|
| WO | 2018/008980 A1 | 1/2018 |
| WO | 2018/034337 A1 | 2/2018 |

OTHER PUBLICATIONS

European Search Report dated Mar. 24, 2021; European Appln No. 19771874.5-1231 / 3756414 PCT/KR2019003458.

SAMSUNG; Discussion on service request procedure handling in 5G; 3GPP TSG-CT WG1 Meeting #109; C1-181369 Feb. 26, 2018-Mar. 2, 2018; Montreal (Canada).

MFC; Updated interim agreements on KI 4; SA WG2 Meeting #S2-118; S2-166724 (was S2-16xxxx); Nov. 14-18, 2016; Reno, Nevada, USA.

SAMSUNG; Interaction between AMF and SMF; SA WG2 Meeting #118-BIS; S2-170263 (revision of S2-17xxxx) Jan. 16-20, 2017; Spokane, WA, USA.

* cited by examiner

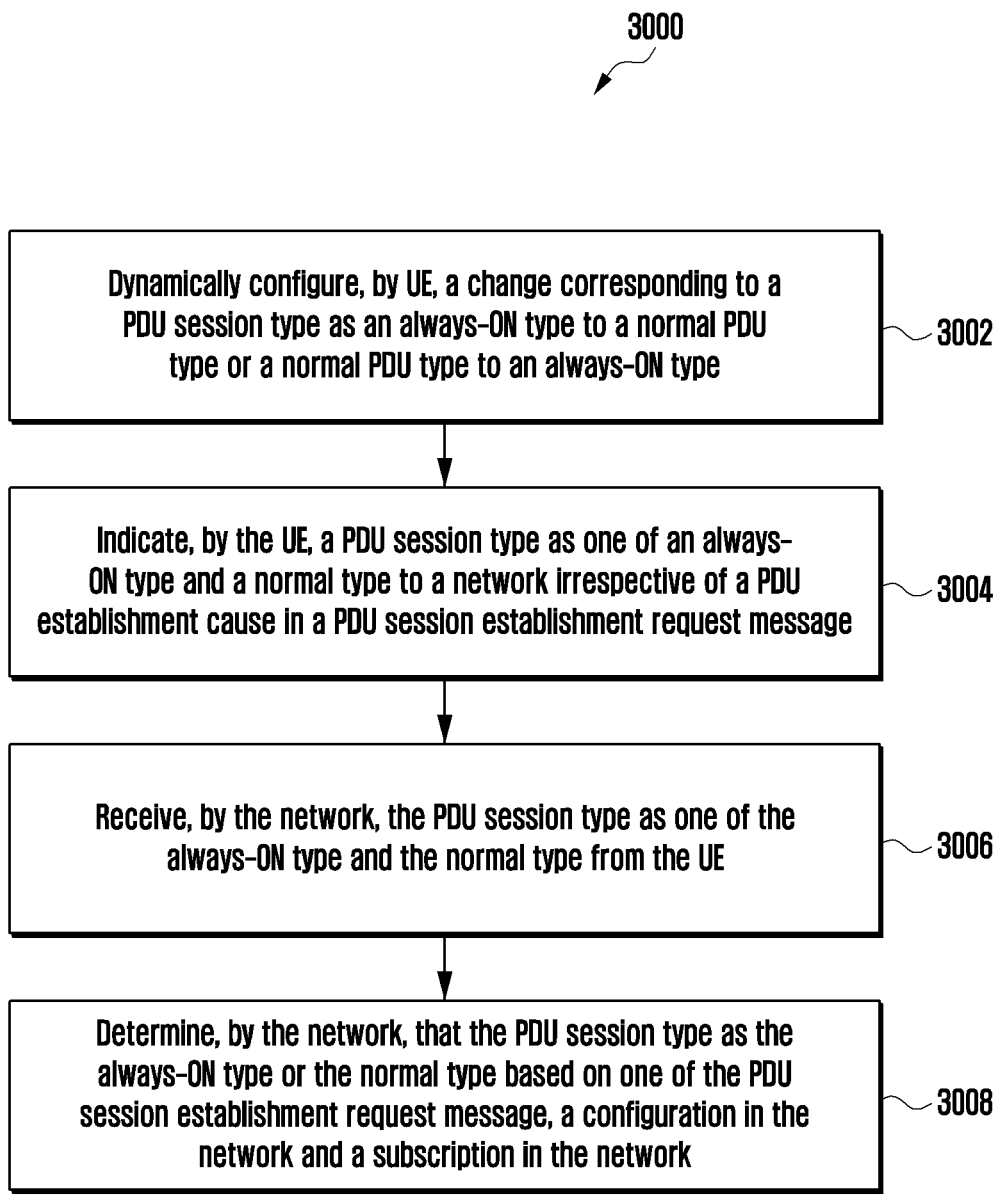

METHOD AND SYSTEM FOR HANDLING SERVICE REQUEST PROCEDURE IN COMMUNICATION NETWORK

TECHNICAL FIELD

The present disclosure relates to a wireless communication system, and more particularly related to a method and system for handling a service request procedure in the wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Current 3rd Generation Partnership Project (3GPP) agreement states that a User Equipment (UE) 100 can support only one service request procedure at a time. This causes an impact when multiple accesses (3GPP access and Non-3GPP access) are involved in the UE 100. Consider an example scenario when a service request procedure is on-going over the 3GPP. At the same time, other access (i.e., Non-3GPP) has data/signaling request to be sent to a network, the UE 100 has to wait to trigger service request over the Non-3GPP until the service request procedure is completed over the 3GPP access which can lead to a significant delay varying between 10 sec to ~2 min.

There are a lot of existing scenarios which are not been handled properly if the service request procedure is not allowed on the access due to on-going service request procedure on another access. Consider an ideal time for the completion of the service request procedure say is 10 seconds (similar to T3417) considering the message exchanges between the UE 100 and the network entities (including the communication within the network entities) for all existing scenarios.

In an existing scenario, pre-conditions of UE 100 includes 3GPP-5GMM-REGISTERED, 5GMM-CONNECTED mode over 3GPP access and Non-3GPP -5GMM-REGISTERED, 5GMM-CONNECTED mode over the non-3GPP access. As shown in FIG. 1, the Service Request is initiated over the 3GPP. Though, the UE 100 is in registered over the Non-3GPP and has data to send (Non-3GPP Protocol Data Unit (PDU's) also would be activated selectively), cannot initiate the service request until the service request procedure over the 3GPP is completed. However, there would be a delay for the non-3GPP PDU until the service request procedure is completed over the 3GPP assuming no failures or re-tries for 3GPP service request.

As shown in the FIG. 1, at 1, the UE 100 sends the service request over 3GPP to a 5G Core Network (5GC) 200. At 2, NON-3GPP PDU has data to send. At 3, the user plan/DRB established is established between the UE 100 and the 5GC 200 over the 3GPP. At 4, the 5GC 200 sends the service accept message over the 3GPP to the UE 100. At 5, the UE 100 sends the service request over the Non-3GPP to the 5GC 200.

As shown in the FIG. 2, At 1, the UE 100 sends the service request over 3GPP to the 5GC 200. At 2, NON-3GPP PDU has data to send. At 3-At 6, the UE 100 resends the service request over 3GPP to the 5GC 200. At 7, the user plan/DRB established is established between the UE 100 and the 5GC 200 over the 3GPP. At 8, the 5GC 200 sends the service accept message over the 3GPP to the UE 100. At 9, the UE 100 sends the service request over Non-3GPP to the network 200. At 10, UE 100 waits until TX expires (say 1 min) and at 11, the UE 100 sends the service request over Non-3GPP.

In another existing scenario, as shown in the FIG. 2, the service request is initiated for PDU1 over the 3GPP. Simultaneously, the UE 100 has data to send for a PDU2 over non-3GPP. However, due to an (any) abnormal case, the service request procedure completion is getting delayed over the 3GPP. Further, due to already on-going service request procedure over the 3GPP, the UE 100 is unable to send the service request over the Non-3GPP. This scenario leads to a significant delay due to abnormal case in the range of 10 sec to ~2 min for Non-3GPP PDU2. In general, as per 3GPP specification, timer T3325 value is implementation defined with a minimum of 60 seconds. Hence, the delay can be more than 150 seconds depending on the timer value of T3325 which is chosen by a particular implementation.

In another existing scenarios, the pre-conditions of the UE 100 includes 3GPP -5GMM-REGISTERED, 5GMM-CONNECTED mode over 3GPP access and Non-3GPP-5GMM-REGISTERED, 5GMM-CONNECTED mode over the non-3GPP access. The Service Request is initiated for the PDU1 over 3GPP. Now, Application/Non-3GPP PDU2 mapped to low latency requirements (app which expect low latency) has data to send over 3GPP/Non-3GPP. And, the PDU2 has no uplink (UL) established yet. Until on-going Service request procedure over the 3GPP completes, a new Service Request cannot be triggered for PDU2. This scenario leads to not satisfying 5G requirements for low latency services. In successful case where there are no re-tries for the first service request (SR), it will take a maximum of 10 sec before the UE 100 can request for UL resources for PDU2 over 3GPP/Non-3GPP.

In another existing scenario, pre-conditions of UE 100 includes 3GPP-5GMM-REGISTERED, 5GMM-CONNECTED mode over 3GPP access and Non-3GPP-5GMM-REGISTERED, 5GMM-CONNECTED mode over non-3GPP access. The Service Request is initiated for the PDU1 over 3GPP. Concurrently, the network 200 had downlink (DL) data for other PDU say PDU2 (which is established over N3GPP) for which the network 200 sends a notification to the UE 100 over 3GPP (cross over of the UE initiated SR and network initiated notification message on the 3GPP access). The UE 100 cannot initiate response for the notification for Non-3GPP until the on-going Service request procedure over the 3GPP completes. However, this scenario leads to a delay that can vary from 10 Sec to ~2 min (abnormal case) due to the current agreement.

In another existing scenario, pre-conditions of the UE 100 includes 3GPP -5GMM-REGISTERED, 5GMM-CONNECTED mode over 3GPP access and Non-3GPP-5GMM-REGISTERED, 5GMM-IDLE mode over non-3GPP access. The Service Request is initiated over 3GPP. Meanwhile, the Non-3GPP Access is in 5GMM-IDLE mode over non-3GPP and has to send Service Request to get into 5GMM-CONNECTED mode as it gained coverage over Non-3GPP access. However, the UE 100 has to wait to send Service Request over Non-3GPP access until Service request procedure completed over 3GPP access. This scenario can occur more frequently because Non-3GPP coverage can easily be lost and regained based on the Non-3GPP access point. Further, there would be a delay that can range from 10 Sec (assuming no failures or re-tries for the Service Request) to ~2 min (considering abnormal cases) for Non-3GPP.

In another existing scenario, pre-conditions of UE 100 includes 3GPP-5GMM-REGISTERED, 5GMM-CONNECTED mode over 3GPP access and Non-3GPP-5GMM-REGISTERED, 5GMM-CONNECTED mode over non-3GPP access. The Service Request is initiated over 3GPP. This is the first attempt of the procedure. Now Non-3GPP needs to send Service Request for mobile originated (MO) data but has to wait until the Service request procedure completes over 3GPP. However, first attempt of Service Request over 3GPP fails. Now, the problem arises should Service Request be triggered for 3GPP or for Non-3GPP. Further, how to handle the situation in which both the accesses have a condition where it has to trigger Service Request. However, there would be a delay of over 10 Sec to ~2 min to trigger Service Request over either of the access.

In an existing scenario, pre-conditions of UE 100 includes 3GPP -5GMM-REGISTERED, 5GMM-IDLE over 3GPP and Non-3GPP -5GMM-REGISTERED, 5GMM-CONNECTED over non-3GPP, PDU3 & PDU4 exists with UP established only for PDU3. A mobility registration update procedure is started. The data is generated for PDU1 for 3GPP. Since, the Mobility Registration Update Procedure is on-going, Service Request cannot be sent over 3GPP and is pended until the update procedure is completed. Data is generated for PDU4 of Non-3GPP. What should be the behavior at this point? Can the UE 100 send Service Request over Non-3GPP at this point? After the Mobility Registration Update procedure is successfully completed over 3GPP, then either of the below two cases arise and UE behavior needs to be defined. Case 1: If Service Request is sent over Non-3GPP, then Service Request over 3GPP needs to further wait until Service request procedure over Non-3GPP completes. Case 2: If Service Request is pended, then which Service Request will be processed first 3GPP or Non-3GPP one? However, in either cases, the delay for one Service Request over an access will range from 10 sec to ~2 min as per the current agreement.

In an existing scenario, pre-conditions of UE 100 includes 3GPP-5GMM-REGISTERED with PLMN 1, 5GMM-CONNECTED mode over 3GPP access and Non-3GPP-5GMM-REGISTERED with PLMN 2, 5GMM-CONNECTED mode over non-3GPP access. The Service Request is initiated over 3GPP (registered with PLMN 1). Though, the UE 100 is in registered state over Non-3GPP (with PLMN 2) and has data to send (Non-3GPP PDU's also would be activated selectively), cannot initiate Service Request until Service request procedure over 3GPP is completed. However, there would be a delay for Non-3GPP PDU until Service request procedure is completed over 3GPP assuming no failures or re-tries for 3GPP Service Request. Delay in this scenario is unnecessary as the UE 100 is registered over different PLMNs.

Thus, it is desired to address the above mentioned disadvantages or other shortcomings or at least provide a useful alternative.

DISCLOSURE OF INVENTION

Technical Problem

The principal object of the embodiments herein is to provide a method and system for handling a service request procedure in a wireless communication system.

Another object of the embodiments herein is to configure, by a UE, a Protocol Data Unit (PDU) session type as an always-ON type.

Another object of the embodiments herein is to send, by the UE, a PDU session establishment request message including the PDU session type to be the always-ON type to a network during an initial PDU session establishment procedure.

Another object of the embodiments herein is to receive, by the network, the PDU session establishment request message including the PDU session type to be the always-ON type from the UE.

Another object of the embodiments herein is to determine, by the network, that the PDU session type as the always-ON type or a normal PDU type based on the PDU session establishment request message.

Another object of the embodiments herein is to initiate, by the UE, one of a service request procedure and a registration request procedure to the network, wherein the one of the service request procedure and the registration request procedure comprises a PDU session identifier with a PDU session type as always-ON type in an uplink data status information element (IE) request.

Another object of the embodiments herein is to activate, by the network, a user plane resource for a particular PDU session for handling service request irrespective of no indication of the PDU session type as the always-ON in an Uplink Status information element (IE) request during one of a service request procedure and a registration request procedure.

Another object of the embodiments herein is to dynamically trigger, by the network, a configuration change corresponding to a PDU session type as an always-ON type to normal PDU type or a normal PDU type to always-ON type using one of a UE generic configuration update procedure and a PDU modification procedure.

Another object of the embodiments herein is to dynamically configure, by the UE, a change corresponding to a PDU session type as an always-ON type to a normal PDU type or a normal PDU type to an always-ON type.

Another object of the embodiments herein is to indicate, by the UE, a PDU session type as one of an always-ON type and a normal type to a network irrespective of a PDU establishment cause in a PDU session establishment request message.

Another object of the embodiments herein is to receive, by the network, the PDU session type as one of the always-ON type and the normal type from the UE.

Another object of the embodiments herein is to determine, by the network, that the PDU session type as the always-ON type or the normal type based on one of the PDU session establishment request message, a configuration in the network and a subscription in the network.

Another object of the embodiments herein is to define an always on PDU whose user plane resources active whenever a UE is moving from a CM IDLE mode to a CONNECTED mode.

Another object of the embodiments herein is to indicate, by an upper layers (i.e., application layer), whether a PDU is an always-ON PDU or not during an establishment of a PDU session with a network.

Another object of the embodiments herein is to include PDUs of type always-ON in an uplink status IE request to avoid any delay in resource establishment for PDUs, whenever the UE initiates service request or registration request procedure.

Another object of the embodiments herein is to ensure user plane resources for Always-ON PDU when the UE is in the CONNECTED mode.

Another object of the embodiments herein is to determine that PDU to be the always-ON PDU or not in a negotiation between the UE and the network during initial PDU session establishment procedure.

Another object of the embodiments herein is to trigger a configuration change dynamically using procedures (e.g., UE generic configuration update procedures, PDU modification procedures, or the like), if the network decides to change the PDU preference type from an always-ON to normal or vice-versa.

Solution to Problem

Accordingly, the embodiments herein provides a method for handling a service request procedure in a wireless communication system. The method includes configuring, by a User Equipment (UE), a Protocol Data Unit (PDU) session type as an always-ON type or normal PDU type. Further, the method includes sending, by the UE, a PDU session establishment request message to activate the PDU session including the PDU session type to be the always-ON type or the normal PDU type to a network during an initial PDU session establishment procedure. i.e. UE sends Always-on PDU session requested IE as part of PDU SESSION ESTABLISHMENT REQUEST with values either Always-on PDU session requested (indicating UE requests for PDU session type as always-ON type) or Always-on PDU session not requested (indicating UE requests for PDU session type as normal PDU type). Further the terms normal PDU type and not Always-on PDU session are used interchangeably. Further, the method includes receiving, by the network, the PDU session establishment request message including the PDU session type to be the always-ON type or the normal PDU type from the UE. Further, the method includes establishing, by the network, a PDU session with the PDU session type as the always-ON type or the normal PDU type based on the PDU session establishment request message or subscription parameter stored for the PDU session in the network or local configuration information.

In an embodiment, the UE configures the PDU session type as the always-ON type based on one of a configuration in the UE including Universal Integrated Circuit Card (UICC), an indication from upper layers to the NAS layer and a UE Route Selection Policy (URSP) command from the network.

In an embodiment, the network configures the PDU session to be the always-ON type or normal PDU type in a PDU session establishment response message (i.e. for example PDU SESSION ESTABLISHMENT ACCEPT as part of Always-on PDU session indication IE with values Always-on PDU session required or Always-on PDU session not allowed) based on one of a configuration in the network, a subscription in the network and indication of the PDU session type as the always-ON type or normal PDU type from the UE during the PDU session establishment procedure.

In an embodiment, the one of the service request procedure and the registration request procedure comprises the PDU session identifier with the PDU session type as the always-ON type in the uplink data status IE request, even if the user-plane resource for the PDU sessions is not established.

In an embodiment, if the UE has one or more active always-on PDU sessions associated with the access type over which the SERVICE REQUEST message is sent and the user-plane resources for these PDU sessions are not established, the UE shall include the Uplink data status IE in the SERVICE REQUEST message and indicate that the UE has pending user data to be sent for those PDU sessions.

In an embodiment, wherein the UE (100) considers the PDU session type as the normal PDU type irrespective of the UE configuration if the network (200) does not indicate to the UE (100) whether a PDU session is one of the always-ON type or the normal PDU type in the PDU session establishment response from the network (200).

Accordingly, the embodiments herein provides a method for handling a service request procedure in a wireless communication system. The method includes initiating, by a UE, one of a service request procedure and a registration request procedure to a network. The one of the service request procedure and the registration request procedure comprises a PDU session identifier with a PDU session type as always-ON type in an uplink data status information element (IE) request.

In an embodiment, the PDU session identifier with the PDU session type as the always-ON type in the uplink data status IE request indicates setting a bitmap of the PDU session ID in the uplink data status IE.

In an embodiment, the PDU session type as the always-ON type indicates that a user plane resource between the UE and the network is always activated for PDU sessions, when the UE is moving from a CM IDLE mode to a CM-CONNECTED mode.

Accordingly, the embodiments herein provides a method for handling a service request procedure in a wireless communication system. The method includes configuring, by a network, a PDU to be an always-ON. Further, the method includes activating, by the network, a user plane resource for a particular PDU session for handling service request irrespective of no indication of the PDU session type as the always-ON in an Uplink Status information element (IE) request during one of a service request procedure and a registration request procedure.

Accordingly, the embodiments herein provides a method for handling a service request procedure in a wireless communication system. The method includes dynamically triggering, by a network, a configuration change corresponding to a PDU session type as an always-ON type to normal PDU type or a normal PDU type to always-ON type using one of a UE generic configuration update procedure and a network initiated PDU session modification procedure.

Accordingly, the embodiments herein provides a method for handling a service request procedure in a wireless communication system. The method includes dynamically configuring, by User Equipment (UE), a change corresponding to a PDU session type as an always-ON type to a normal PDU type or a normal PDU type to an always-ON type. Further, the method includes indicating, by the UE, a PDU session type as one of an always-ON type and a normal type to a network irrespective of a PDU establishment cause in a PDU session establishment request message. Further, the method includes receiving, by the network, the PDU session type as one of the always-ON type and the normal type from the UE. Further, the method includes determining, by the network, that the PDU session type is as the always-ON type or the normal type based on one of the PDU session establishment request message, a configuration in the network and a subscription in the network.

In an embodiment, the PDU establishment cause indicates at least one of a handover scenario, an emergency scenario, and a normal scenario.

In an embodiment, the PDU session type as the always-ON type is maintained at the UE and the network which can be used during intersystem change between 5G and legacy radio access technologies like 4G.

Accordingly, the embodiments herein provides a wireless communication system for handling a service request procedure. The system includes a UE configuring a Protocol Data Unit (PDU) session type as an always-ON type or the normal PDU type and sending a PDU session establishment request message including the PDU session type to be the always-ON type or the normal PDU type to a network during an initial PDU session establishment procedure. The network receives the PDU session establishment request message including the PDU session type to be the always-ON type or the normal PDU type from the UE and establish a PDU session with the PDU session type as the always-ON type or the normal PDU type based on the PDU session establishment request message.

Accordingly, the embodiments herein provides a wireless communication system for handling a service request procedure. The system includes a UE configured to initiate one of a service request procedure and a registration request procedure to the network, wherein the one of the service request procedure and the registration request procedure comprises a PDU session identifier with a PDU session type as always-ON type in an uplink data status information element (IE) request.

Accordingly, the embodiments herein provides a network for handling a service request procedure in a wireless communication system. The network includes a Protocol Data Unit (PDU) session type handler coupled with a memory and a processor. The PDU session type handler configures a PDU to be an always-ON and activates a user plane resource for a particular PDU session for handling service request irrespective of no indication of the PDU session type as the always-ON in an Uplink Status information element (IE) request during one of a service request procedure and a registration request procedure.

Accordingly, the embodiments herein provides a network for handling a service request procedure in a wireless communication system. The network includes a Protocol Data Unit (PDU) session type handler coupled with a memory and a processor. The PDU session type handler dynamically triggers a configuration change corresponding to a PDU session type as an always-ON type to normal PDU type or a normal PDU type to always-ON type using one of a UE generic configuration update procedure and a PDU modification procedure.

Accordingly, the embodiments herein provides a wireless communication system for handling a service request procedure. The system includes a UE dynamically configures a change corresponding to a PDU session type as an always-ON type to a normal PDU type or a normal PDU type to an always-ON type and indicates a PDU session type as one of an always-ON type and a normal type to a network irrespective of a PDU establishment cause in a PDU session establishment request message. The network receives the PDU session type as one of the always-ON type and the normal type from the UE and determines that the PDU session type as the always-ON type or the normal type based on one of the PDU session establishment request message, a configuration in the network and a subscription in the network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

The present invention provides a method and system for handling a service request procedure efficeintly in a wireless communication system.

Also, the present invention provides a method and system for configuring a Protocol Data Unit (PDU) session type as an always-ON type efficeintly in a wireless communication system.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 28-30 are flow diagrams illustrating various operations, implemented by the wireless communication system, handling the service request procedure, according to embodiments as disclosed herein.

MODE FOR THE INVENTION

Figure 1:
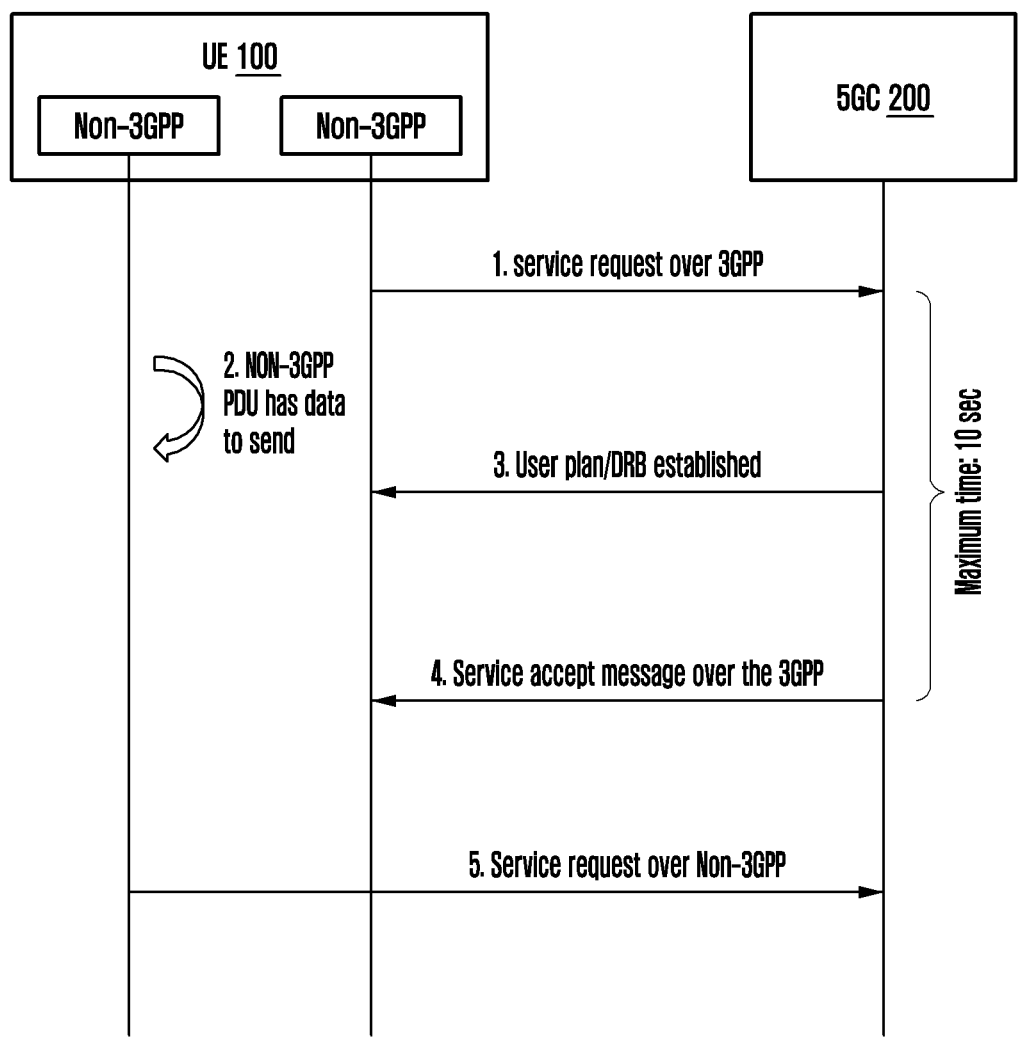
FIG. 1 is a sequence diagram illustrating a scenario in which a delay for Non-3GPP PDU, until Service Request procedure is completed over 3GPP, according to prior art.
Figure 2:
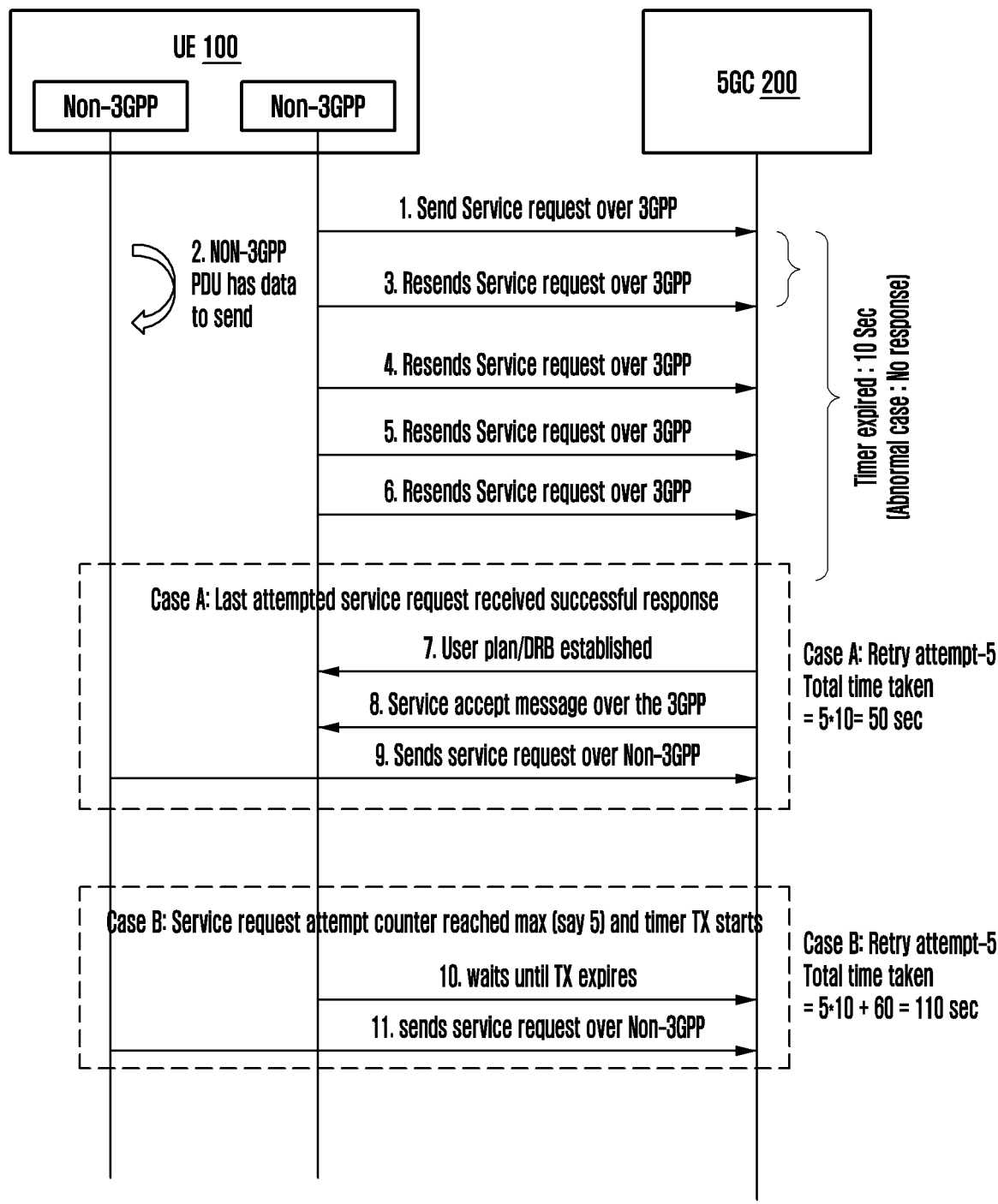
FIG. 2 is a sequence diagram illustrating the scenario in which the delay due to abnormal case for Non-3GPP PDU2, according to prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Embodiments herein achieve a method for handling a service request procedure in a wireless communication system. The method includes configuring, by a User Equipment (UE), a Protocol Data Unit (PDU) session type as an always-ON type or a normal PDU type. Further, the method includes sending, by the UE, a PDU session establishment request message including the PDU session type to be the always-ON type or the normal PDU type to a network during an initial PDU session establishment procedure. Further, the method includes receiving, by the network, the PDU session establishment request message including the PDU session type to be the always-ON type or the normal PDU type from the UE. Further, the method includes establishing, by the network, a PDU session with the PDU session type as the always-ON type or the normal PDU type based on the PDU session establishment request message.

The always-ON type corresponds to an always-on PDU session requested. The normal PDU type corresponds to an always-on PDU session not requested.

Always-on PDU session: A PDU session for which user-plane resources have to be activated during every transition from 5GMM-IDLE mode to 5GMM-CONNECTED mode. A UE requests a PDU session to be established as an always-on PDU session based on indication from upper layers (i.e., application layer) and the network decides whether a PDU session is established as an always-on PDU session or not.

Unlike conventional systems and methods, the proposed method can be used to reduce the delay between two triggers of Service Request procedure within a given access. The proposed method can be used to avoid the delay in establishing the user plane resources for the delay sensitive PDU sessions. Let's says first service request message is sent from the UE and meanwhile the NAS layer receives the request to establish the user plane resources for delay sensitive PDU session say PDU session "x". Now UE is forced to wait till the first service request procedure is completed before the UE can request the user plane resources for PDU session "x" by re triggering the service request procedure. This delay is not acceptable to delay sensitive services like mission critical.

To solve the above described problem, the UE and network first negotiate whether a PDU session is a delay sensitive PDU session and termed it as an always-ON PDU session. Further, in each service request procedure (or the registration request procedure) UE makes a request for user plane resources for the always-ON PDU session also if user plane resources are not available. So that while service request procedure or registration procedure is ongoing, if there is a uplink data to be sent for always-ON PDU session then user plane resources are readily available to the UE to send the uplink data and there is no delay in requesting for the user plane resources while waiting for the first service request procedure to complete. In other words the first service request procedure or registration procedure already carries request to establish user plane resources for the always on PDU session. Thus UE need not initiate a second service request procedure for always-ON PDU session instead it will get the required user plane resources immediately after completion of the first service request procedure or registration procedure.

The proposed method can be used to completely avoid the delay between service request procedures over single access as they are treated as independent procedures. The proposed method can be used to resolve the dependency of multi-access in trigger of Service Request procedure to reduce the delay significantly.

The proposed method can be used to send a single service request including the list of both 3GPP and Non-3GPP PDUs to be activated maintaining single attempt counter. The proposed method can be used to allow the concurrent Service Request Procedure on two different access and maintain the attempt counter per access. This reduces the delay for either accesses to a pre-determined value.

The method can be used to reduce the data plane establishment latency in the wireless communication system. The proposed method can be used to reduce the signaling overhead which is avoided as PDU establishment procedure needs to be performed for all the PDUs if the UE context gets deleted and paging can also be forwarded from MME to AMF so that the UE does not miss any paging due to the current limitation at least for high priority PDUs or emergency cases.

The method can be used to dynamic configuration of the PDU type (i.e., always-on PDU or not) that is provisioned through procedures like UE Generic configuration update, network initiated PDU session modification or any procedure that supports dynamic configuration of UE from the network.

The proposed method can be used to allow the concurrent Service Request Procedures with each session consisting of a new identifier "Service Request Identifier (SRI)" to distinguish between the sessions and maintain attempt counter, relevant timers of the procedure (T3517, T3325) per session independently. This results in reducing the delay between the trigger of Service Request between the 3GPP and Non-3GPP accesses.

In an embodiment, the method can be used to send a single service request including list of both 3GPP and Non-3GPP PDUs to be activated maintaining single attempt counter. This reduces the delay for either accesses to a pre-determined value. In another embodiment, the method can be used to allow a concurrent service request procedure on two different access and maintain the attempt counter per access. This will completely avoid any delay between the accesses. In another embodiment, the method can be used to allow the concurrent service request procedures with each session consisting of an identifier "Service Request Identifier (SRI)" to distinguish between the sessions and maintaining attempt counter, relevant timers of the procedure (T3517, T3325) per session independently.

In an embodiment, the method allowing the 3GPP and N3GPP accesses in an IDLE Mode and the UE gets paging in 3GPP with N3GPP accesses. Further, the UE can be configured to send the service request with allowed list of N3GPP PDUs which can be moved. Meanwhile, the UE tries to move to a CM_CONNECTED state in the N3GPP by sending the Service Request. This Service request shouldn't be containing PDU which was sent in 3GPP Service Request "in allowed List of PDUs". It can contain list of PDUs which were not sent in Service Request in 3GPP of "in allowed List of PDU" based on the Uplink Data.

In an embodiment, the method allowing the 3GPP access in the CM-CONNECTED state and N3GPP access in the IDLE Mode and the UE obtains the notification for downlink Data for N3GPP with PDU session identification (id). The UE can be configured to send Service Request if the PDU session for which Notification has come is allowed to be moved over 3GPP otherwise UE shall send Notification Response. Meanwhile, if the UE tries to move to CM_CONNECTED state in N3GPP by sending Service Request. This Service request shouldn't be containing PDU for which Notification had come for downlink Data in 3GPP and if it was allowed to be reactivated over 3GPP. Service request can contain N3GPP PDUs based on uplink Data which are not allowed to be activated over 3GPP or for which Notification didn't come in 3GPP.

In an embodiment, the method allows the UE to trigger Service Request when the UL data is pending for at least one PDU. In an embodiment, the method allows the UE to trigger mobility registration update when there is no uplink data pending.

In the proposed methods, the paging can be forwarded from a Mobility Management Entity (MME) to an Authentication management function (AMF) so that the UE does not miss any paging due to the current limitation at least for high priority PDUs or emergency cases. The method can be used to reduce the data plane establishment latency in the 5G network.

In an embodiment, an application processor (AP) or upper layer that provides PDU type (high priority, low latency or delay intolerant, type of application requesting the PDU etc.) to communication processor (CP) or NAS layer when requesting to establish a PDU session with the network by considering such high priority PDU's in which the upper layer informs to NAS as always-on PDU or priority PDU. This information about the always-on PDU is maintained at CP and used to set the uplink data status IE in subsequent service request or registration procedures whenever these procedures are triggered (ex. After RLF, SR initiated due to pending data etc.). AT commands can also be used to indicate to modem or NAS layer about which PDU's are to be considered as always-on PDU.

In an embodiment, when the UE is activating such always-on PDUs then it shall inform the network during the PDU establishment procedure and the network uses the UE indication of always-on PDU to manage the DRB release due to inactivity timer expiry at RAN side. When inactivity timer expired at RAN for always-on PDU then network should not release the DRB which is mapped to that particular always-on PDU when user plane resource is established for more than 1 PDU. When inactivity timer expired at RAN for always-on PDU and there is no other PDU with established user plane resource for that UE then network shall move the UE to RRC inactive state.

In another embodiment, when sending the service request or the registration request message, the UE marks the PDU's for which data is pending using uplink data status IE. While doing so, the UE can adopt any of the below two approaches. Mark All always-on PDUs (with no user plane resources or with no DRB) in the uplink data status IE. Mark all active PDUs (with no user plane resources or with no DRB) in the uplink data status IE. Alternatively when sending the service request or the registration request message, in case the UE has always-on PDU then the UE will indicate to the network that it needs DRB for all the active PDUs. In such a case, the network should establish the user plane resources for all the active PDU's for the UE. Also, if due to any abnormal scenario, connection between UE and network is lost then it is expected that network shall re-establish user plane resources for Always-On PDUs with UE after establishing connection again.

In another embodiment, if UE receives uplink data for new PDU session ID (always-on PDU) while it is waiting for completing ongoing service request procedure then UE can abort the current ongoing service request procedure and proceed with new service request procedure. When sending the service request, UE marks the PDU's for which data is pending using uplink data status IE. While doing so UE can adopt any of the below two approaches. Mark all always-on PDUs (with no user plane resources or with no DRB) in the uplink data status IE. Mark all active PDUs (with no user plane resources or with no DRB) in the uplink data status IE. Alternatively, when sending the service request or the registration request message, in case UE has always-on PDU then UE will indicate to the network that it needs DRB for all the active PDUs. In such a case, network should establish the user plane resources for all the active PDU's for the UE. Furthermore, at UE side, a SR procedure is marked as completed by checking if DRB is established for all the PDU session ID(s) for which user plane radio resources were requested in last sent service request message and are indicated successfully activated in PDU session reactivation result IE. AT commands can also be used to indicate to modem or NAS layer about which PDU's are to be considered as always-on PDU.

In another embodiment, the UE does not immediately request the already requested PDUs in the last service request, where AT commands can also be used to indicate to modem or NAS layer about which PDU's are to be considered as always-on PDU.

The method can be used identify the always-ON PDU session in the wireless communication system. The method can be used to dynamically change the PDU session type (i.e., always-ON type to normal PDU type or a normal PDU type to the always-ON type. The method can be used to handle the PDU movement between two networks (e.g., 4G network to 5G network or 5G network to 4G network).

Referring now to the drawings, and more particularly to FIGS. 3 through 30, there are shown preferred embodiments.

Figure 3:
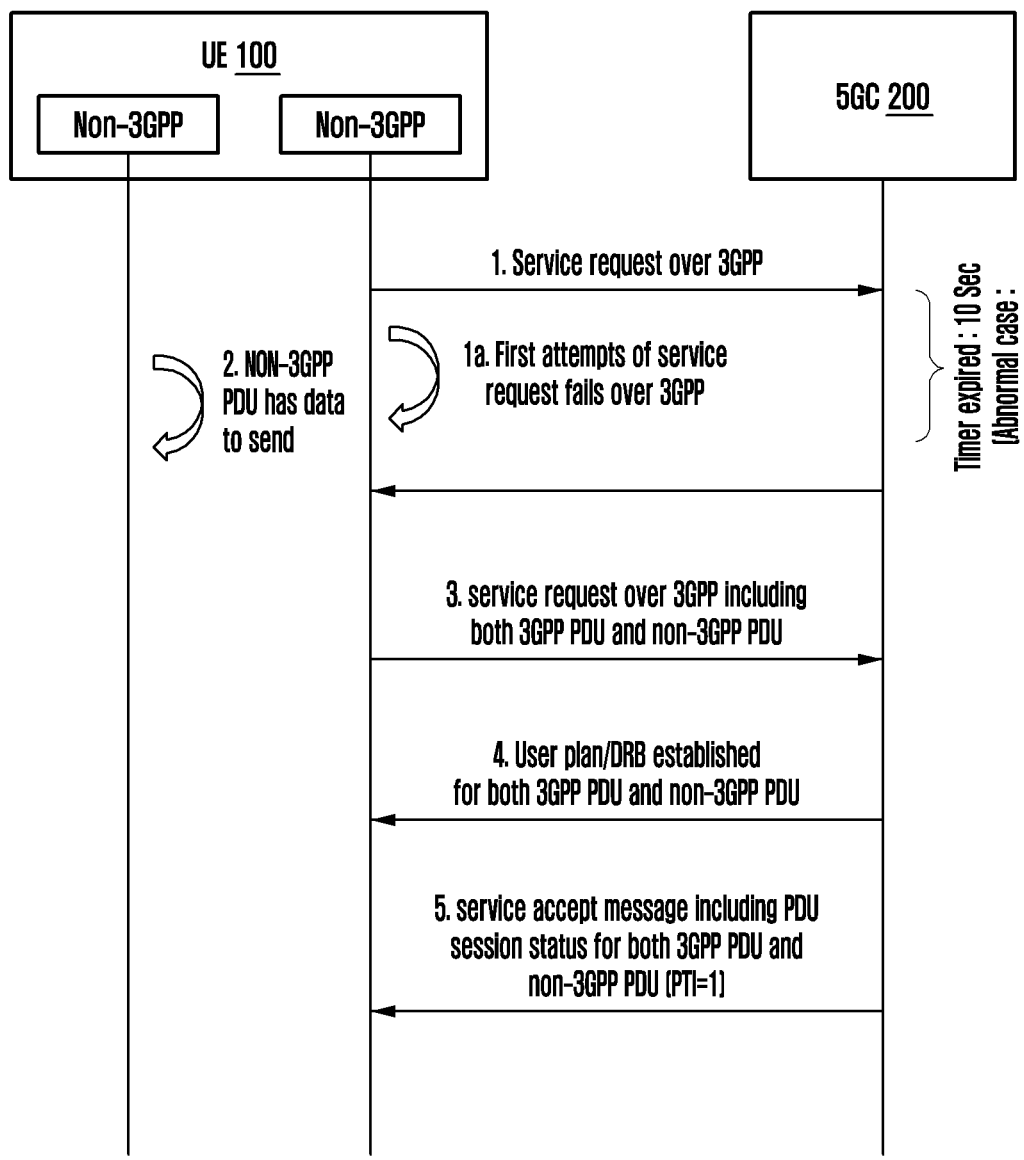
FIG. 3 is a sequence diagram illustrating various operations for sending a Service Request Response (Accept/Reject) for both 3GPP and Non-3GPP PDUs over a single access, according to embodiments as disclosed herein.

FIG. 3 is a sequence diagram illustrating various operations for sending a Service Request Response (Accept/Reject) for both 3GPP and Non-3GPP PDUs over a single access, according to embodiments as disclosed herein.

At 1, the UE 100 sends the service request to the network 200 over the 3GPP (PTI=1). At 1a, the first attempts of service request fails over the 3GPP. At 2, NON-3GPP PDU has data to send. At 3, the UE 100 sends the service request to the network 200 over 3GPP including both 3GPP PDU and non-3GPP PDU. At 4, the user plan/DRB established for both 3GPP PDU and non-3GPP PDU. At 5, the UE 100 receives the service accept message including PDU session status for both 3GPP PDU and non-3GPP PDU from the network 200.

As shown in the FIG. 3, the method includes sending the single Service Request including both 3GPP and Non-3GPP PDUs and maintaining single attempt counter. This reduces the delay for either access to the maximum of 10 seconds. Consider a list of scenarios:

Service Request is triggered over the 3GPP in SGMM-CONNECTED mode, optionally including Procedure Transaction Identity (PTI) to uniquely identify the session/procedure, Non-3GPP PDU in the SGMM-CONNECTED mode has MO data to send, First attempt of Service Request procedure over the 3GPP fails due to any abnormal scenario, (a) Next Service Request attempt should include both 3GPP and Non-3GPP PDUs to be activated incrementing the attempt counter by 1. Therefore, reducing the delay to max T3517 seconds, (OR)

(b) Next Service Request attempt should include both 3GPP and Non-3GPP PDUs to be activated resetting the attempt counter to 0. Therefore, reducing the delay to max T3517 seconds, (OR)

(c) Next Service Request attempt should include both 3GPP and Non-3GPP PDUs to be activated not changing the value of the attempt counter. Therefore, reducing the delay to max T3517 seconds.

The network 200 sends response (Service Accept or Service Reject) to the Service Request sent by the UE 100 in either of the two ways:

As shown in the FIG. 3, Service Request Response (Accept/Reject) for both 3GPP and Non-3GPP PDUs is sent over single access preferably the access which triggered the Service Request, optionally maintaining the same PTI as in the Service Request message if the UE's SR message includes the PTI.

Figure 4:
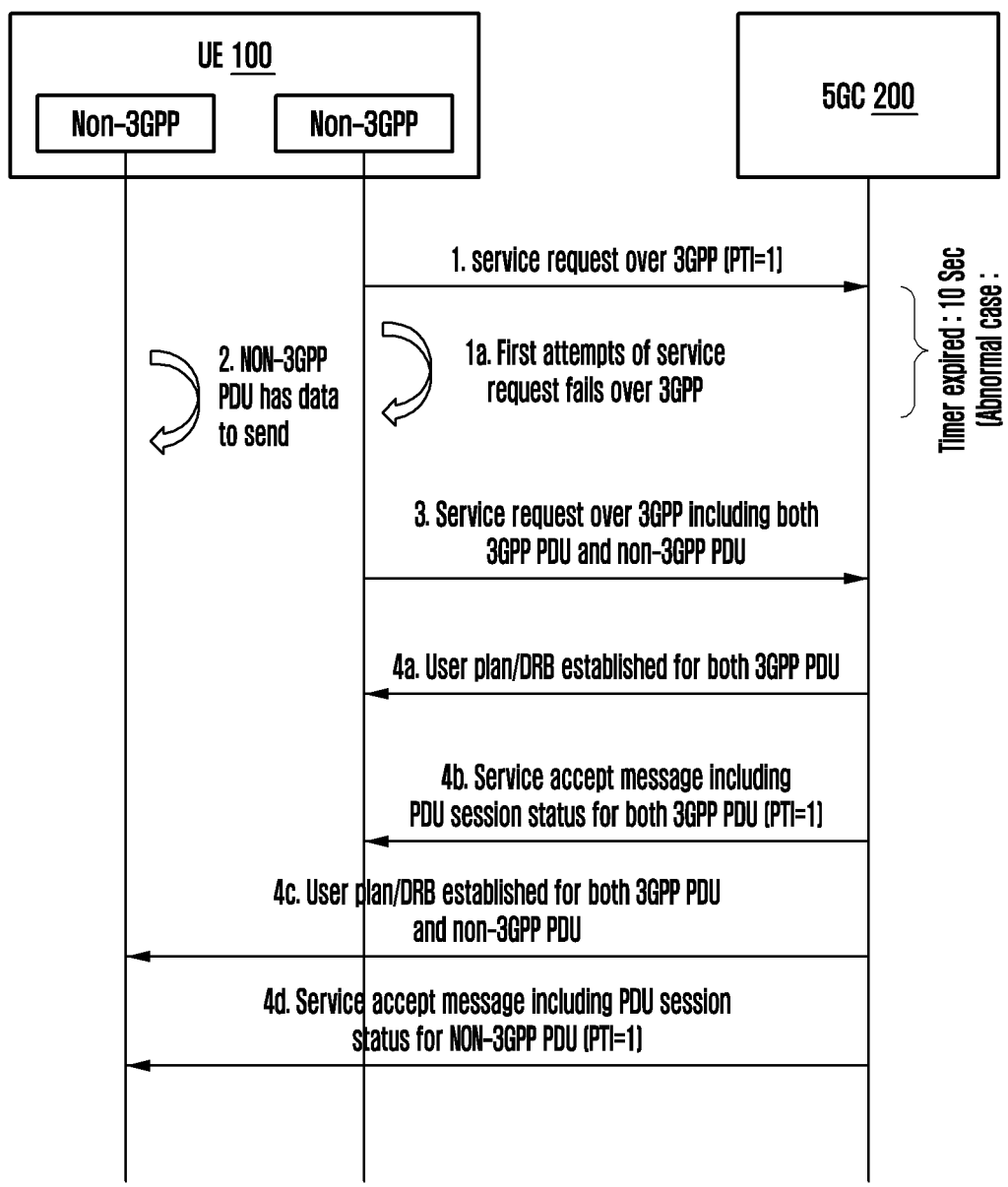
FIG. 4 is a sequence diagram illustrating various operations for sending the Service Request Response (Accept/Reject) over both accesses (3GPP, Non-3GPP individually) for their corresponding PDUs, according to embodiments as disclosed herein.

FIG. 4 is a sequence diagram illustrating the various operations for sending the Service Request Response (Accept/Reject) over both accesses (3GPP, Non-3GPP individually) for their corresponding PDUs, according to embodiments as disclosed herein.

As shown in the FIG. 4, at 1, the UE 100 sends the service request to the network 200 over 3GPP. At 1a, the first attempts of service request fails over the 3GPP. At 2, NON-3GPP PDU has data to send. At 3, the UE 100 sends the service request over 3GPP including both 3GPP PDU and non-3GPP PDU. At 4a, the user plan/DRB is established for 3GPP PDU. At 4b, the UE 100 receives the service accept message including PDU session status for 3GPP PDU. At 4c, the user plan/DRB is established for non-3GPP PDU. At 4d, the UE 100 receives the service accept message including PDU session status for NON-3GPP PDU.

In conjunction with the FIG. 3, the network 200 sends response (Service Accept or Service Reject) to the UE 100. The Service Request Response (Accept/Reject) is sent, over both accesses (3GPP, Non-3GPP individually), for their corresponding PDUs and optionally maintaining the same PTI if the UE's SR message includes the PTI.

Further, PTI and a new bit (F) represents Final Response bit needs to be added newly in the Service Accept/Reject message IE to indicate if response message is for single access or both accesses:

A. If this field is not set, then the current response is for one of the accesses and the UE needs to wait for the Service Response message for the other access or wait until procedure timer T3517 expires to mark the procedure as completed, B. If this field is set (it means network is sending the response for both 3GPP, Non-3GPP together) and the UE 100 will mark the process as completed.

A bit in spare octet can be used for the above mentioned purpose. ->Location of bit needs TBD.

Special Cases for the Service Reject: If any one of the below cause codes comes in Service Reject over one access, then it is applicable to the other access automatically.

Cause Code #3—Illegal UE,
Cause Code #6—Illegal ME,
Cause Code #8—5GS services not allowed,
Cause Code #11—PLMN not allowed,
Cause Code #22—Congestion (Same core network for 3GPP, Non-3GPP), and
Cause Code #xx—N1 mode not allowed (Registered with same PLMN for 3GPP, Non-3GPP).

All the above proposal is applicable for the case when the UE is registered on the same PLMN in 3GPP and N3GPP with the same AMF.

Figure 5:
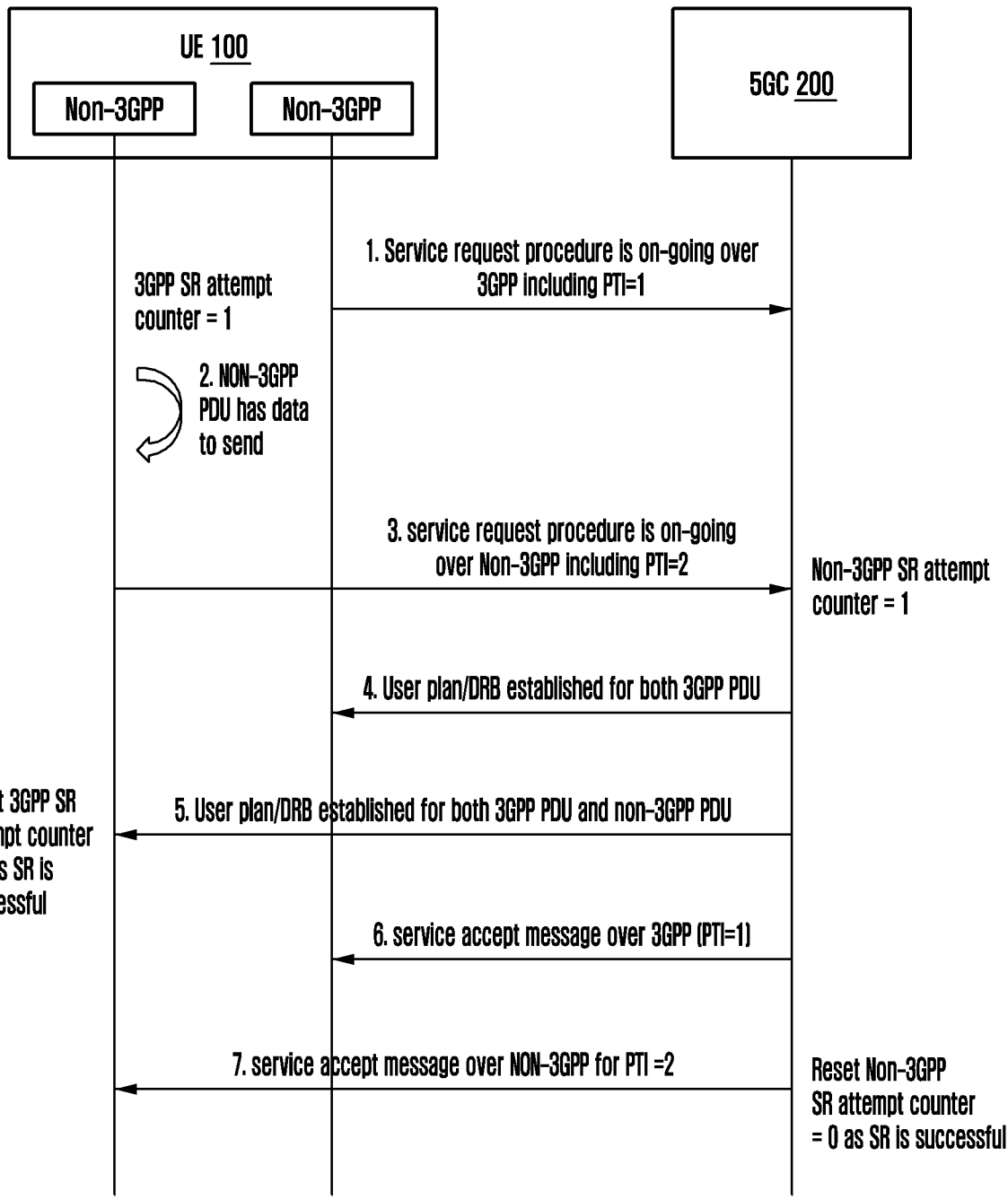
FIG. 5 is a sequence diagram illustrating various operations for allowing concurrent Service Request Procedure on two different accesses and maintaining the attempt counter per access, according to embodiments as disclosed herein.

FIG. 5 is a sequence diagram illustrating the various operations for allowing concurrent Service Request Procedure on two different accesses and maintaining the attempt counter per access, according to embodiments as disclosed herein.

As shown in the FIG. 5, At 1, the service request procedure is on-going between the UE 100 and the network 200 over 3GPP including PTI=1. At 2, NON-3GPP PDU has data to send. At 3, the service request procedure is triggered to the network 200 over non-3GPP including PTI=2. At 4, the user plan/DRB is established for 3GPP PDU and at 5, the user plan/DRB is established for non-3GPP PDU. At 6, the UE 100 receives the service accept message over 3GPP (PTI=1) and At 7, the UE 100 receives the service accept message over non-3GPP (PTI=2).

As shown in the FIG. 5, the method includes allowing concurrent Service Request Procedure on two different accesses and maintaining the attempt counter per access. This will not involve any delay between the accesses.

1. Service Request is triggered over 3GPP in SGMM-CONNECTED mode.

2. Non-3GPP PDU in the SGMM-CONNECTED mode has MO data to send.

3. Now, the UE 100 sends Service Request over Non-3GPP without waiting for the result of on-going Service Request Procedure over 3GPP.

4. Each access can trigger Service Request Procedure without waiting for the other access. Further, maintain independent attempt counters and handle the procedures independently.

With this proposed method, there won't be any kind of dependency and delay between the accesses for data or signaling procedures.

Figure 6:
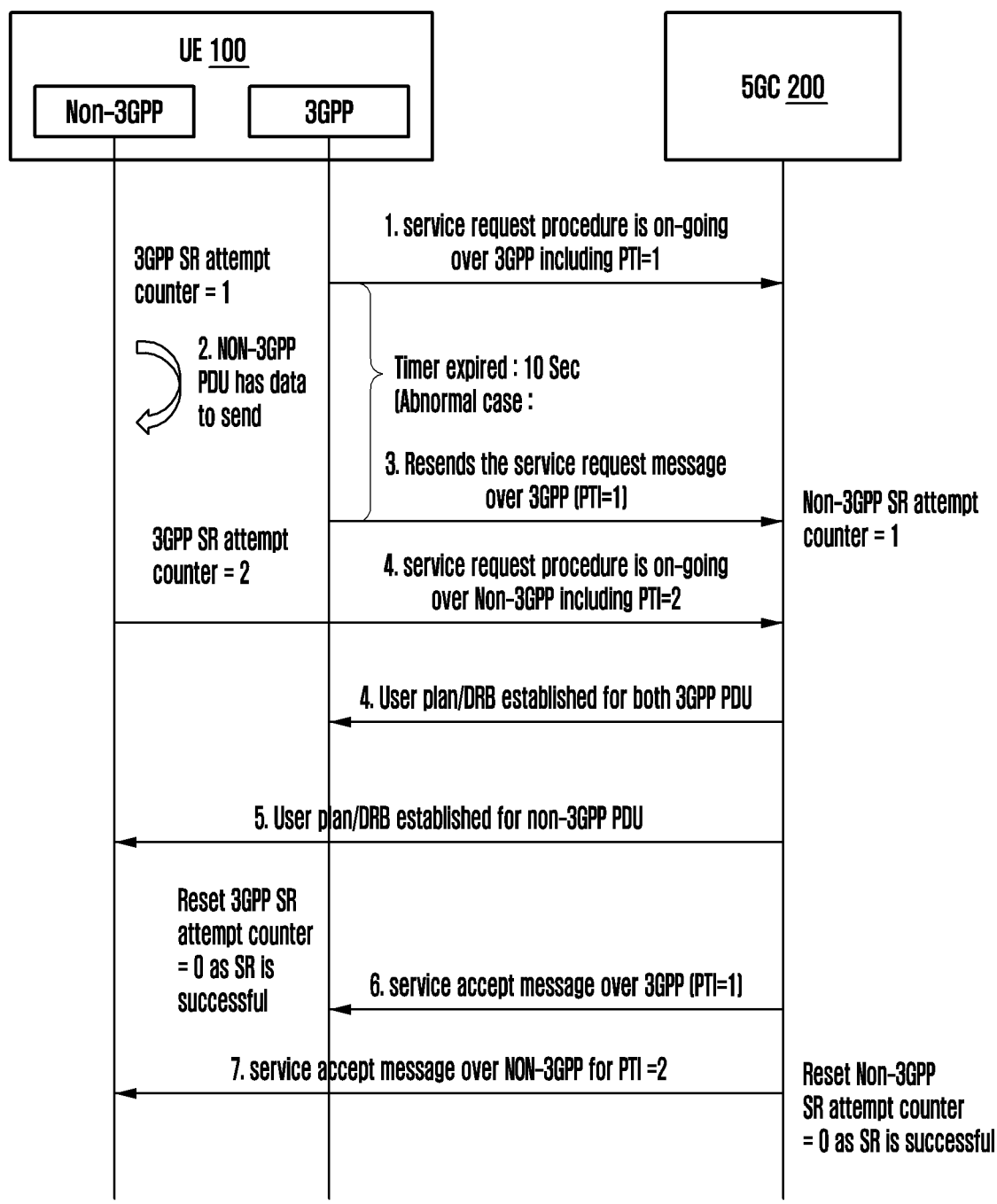
FIG. 6 is a sequence diagram illustrating various operations for maintaining the Service Request Attempt counters per access, according to embodiments as disclosed herein.

FIG. 6 is a sequence diagram illustrating the various operations for maintaining the Service Request Attempt counters per access, according to embodiments as disclosed herein. The MSC depicts that how Service Request Attempt counters is maintained per access as shown in the FIG. 6.

As shown in the FIG. 6, At 1, the service request procedure is on-going over 3GPP including PTI=1. At 2, NON-3GPP PDU has data to send. At 3, the UE 100 resends service request procedure over 3GPP including PTI=1. At 4, the service request procedure is triggered over non-3GPP including PTI=2. At 5, the user plan/DRB is established for 3GPP PDU and At 6, the user plan/DRB is established for non-3GPP PDU. At 7, the UE 100 receives the service accept message over 3GPP (PTI=1). At 8, the UE 100 receives the service accept message over non-3GPP (PTI=2).

Figure 7:
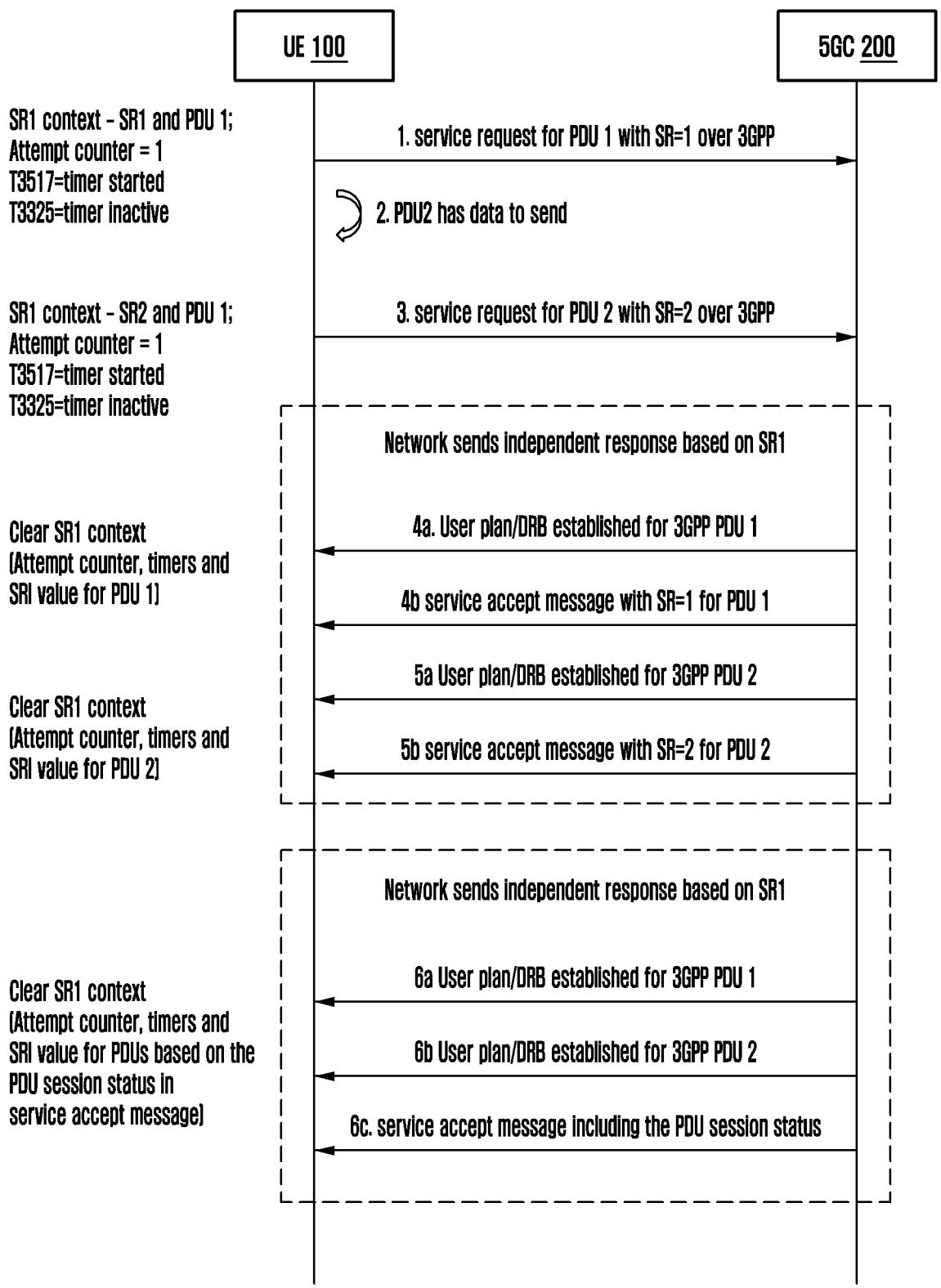
FIG. 7 is a sequence diagram illustrating various operations for allowing a concurrent Service Request Procedures with each session, where both (independent) service request sessions is successful, according to embodiments as disclosed herein.

FIG. 7 is a sequence diagram illustrating the various operations for allowing a concurrent Service Request Procedures with each session, where both (independent) service request sessions is successful, according to embodiments as disclosed herein.

As shown in the FIG. 7, At 1, the UE 100 sends the service request for PDU 1 with SR=1 over the 3GPP to the network 200. At 2, PDU2 has data to send. At 3, the UE 100 sends the service request for PDU 2 with SR=2 over 3GPP. At 4a, the user plan/DRB is established for 3GPP PDU 1. At 4b, the UE receives the service accept message with SR=1 for PDU 1. At 5a, the user plan/DRB is established for 3GPP PDU 2. At 5b, UE receives the service accept message with SR=2 for PDU 2. At 6a, the user plan/DRB is established for PDU 1. At 6b, the user plan/DRB is established for PDU 2. At 6c, the UE 100 receives the service accept message including the PDU session status.

As shown in the FIG. 7, the method includes allowing concurrent Service Request Procedures with each session consisting of a new identifier "Service Request Identifier (SRI)" to distinguish between the sessions and maintaining attempt counter, relevant timers of the procedure (T3517, T3325) per session independently. This will completely avoid any delay between the requests over the access. This can be termed as "SRI based Service Request" procedure.

In an embodiment, the method includes only two Service Request Sessions. Further, the allowed number of concurrent sessions is implementation dependent.

1. Service Request is triggered over 3GPP in 5GMM-CONNECTED mode for PDU1 with SRI=1.

2. Now, consider a case where PDU2 over 3GPP has MO data to send or the network 200 sent a data notification for PDU2 over 3GPP.

3. The UE 100 triggers Service Request Procedure for PDU2 with SRI=2. Irrespective of the response for Service Request session of PDU1 (SRI=1), procedure will perform independently for PDU2.

4. Further, below three cases (A, B and C) is possible based on the response from the network 200. If the network 200 sends:

Case A: Service Accept for PDU1 including the SRI sent by UE 100 in the request message. Similarly, the UE 100 receives Service Accept for PDU2.

Alternatively, the network 200 can send a single Service Accept Message with updated PDU session status and the UE 100 will process the message clearing SRI context of only those PDUs for which response has been received from the network 200. This is a case where both (independent) service request sessions is successful.

In an embodiment, all SRI based context (i.e., attempt counters, timers, SRI value) related to both the sessions will be cleared after the procedures are completed respectively.

Case B: Due to any abnormal case, there is no response for PDU1 Service Request. After T3517 expiry, the UE 100 re-sends Service Request for PDU1 (SRI=1). Meanwhile, the UE 100 receives response (accept/reject) for PDU2 Service Request. Both sessions act independently. In an embodiment, if Service Accept comes for PDU2 then all the context (attempt counters, timers, and SRI value) will be cleared as procedure is successful else the context is maintained until the procedure is concluded. However, for PDU1 (SRI=1) context is maintained on the UE side as procedure is not yet completed.

Figure 8:
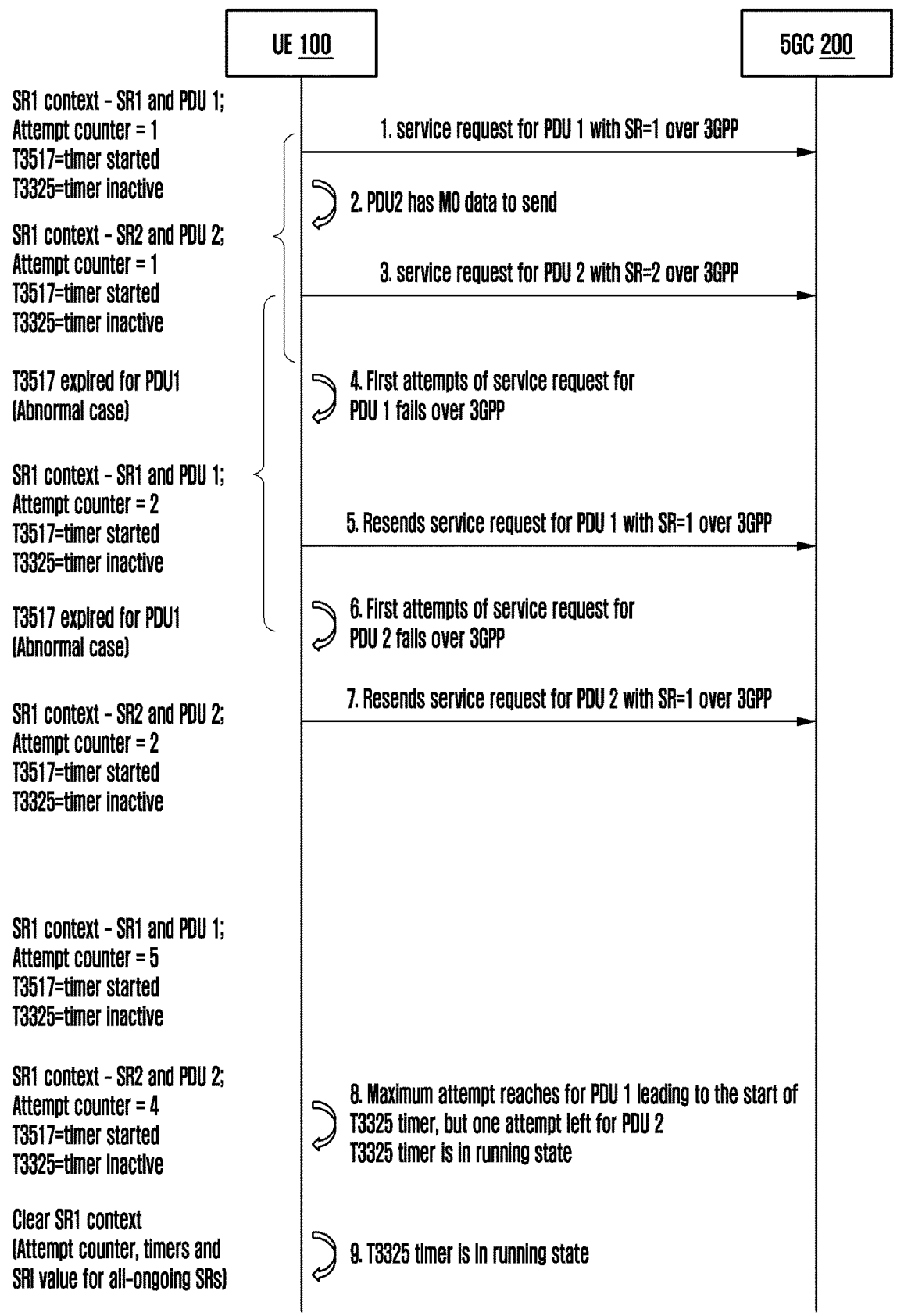
FIG. 8 is a sequence diagram illustrating various operations for allowing a concurrent Service Request Procedures with each session, where the UE keeps attempting until the UE exhausts the maximum service request attempt limit for each session independently, according to embodiments as disclosed herein.

FIG. 8 is a sequence diagram illustrating the various operations for allowing concurrent Service Request Procedures with each session, where the UE 100 keeps attempting until the UE 100 exhausts the maximum service request attempt limit for each session independently, according to embodiments as disclosed herein.

As shown in the FIG. 8, At 1, the UE 100 sends the service request for PDU 1 with SR=1 over 3GPP. At 2, PDU2 has MO data to send. At 3, the UE 100 sends the service request for PDU 2 with SR=2 over 3GPP. At 4, First attempts of service request for PDU 1 fails over 3GPP. At 5, the UE 100 resends the service request for PDU 1 with SR=1 over 3GPP. At 6, First attempts of service request for PDU 2 fails over 3GPP. At 7, the UE 100 re-sends the service request for PDU 2 with SR=2 over 3GPP. At 8, Maximum attempt reaches for PDU 1 leading to the start of T3325 timer, but one attempt left for PDU 2. At 9, T3325 timer is in running state.

As shown in the FIG. 8, there is no response for any of the Service Requests leading to T3517 timer expiry for all the existing SRI based SR sessions. The UE 100 keeps attempting until it exhausts the maximum service request attempt limit for each session independently. If there is no response from network with maximum attempts exhausted for any one session, then stop all on-going service request sessions clearing SRI based service request session context and start timer T3325. UE 100 can attempt Service Request procedure only if:

T3325 timer expires.

UE 100 has MO data to send for the PDU (new PDU) that has not been part of the last service request sessions (This can be identified using Uplink Data Status IE).

It is in response to paging from the network 200.

The below table 1 indicates the Handling for different causes of for service reject.

TABLE 1

Special Cases for Service Reject

| | |
|---|---|
| #3 (Illegal UE); | Permanent Reject Causes: |
| #6 (Illegal ME); | When the UE receives this reject cause |
| #7 (EPS services not allowed); | for a particular Service Request, then |
| #10 (Implicitly detached); | UE should consider that the other SR's |
| #11 (PLMN not allowed); or | if any which are ongoing on the same |
| #35 (Requested service option not authorized in this PLMN); | access have received this same cause and proceed accordingly. |
| #12 (Tracking area not allowed); | Any other causes apart from the listed ones should be treated for that |
| #13 (Roaming not allowed in this tracking area); | particular SR request only and should not affect the other ongoing SR's if any |
| #15 (No suitable cells in tracking area); | |
| #22 (Congestion); | |
| #40 (No EPS bearer context activated); | |
| Cause Code #8 - 5GS services not allowed | |
| Cause Code #xx - N1 mode not allowed (Registered with same PLMN for 3GPP, Non-3GPP) | |

The below table 2 indicates the special cases for service reject.

TABLE 2

| Abnormal cases on UE side | |
|---|---|
| Lower layer failure or release of the NAS signaling connection without "Extended wait time" and without redirection indication received from lower layers before the service request procedure is completed (see sub clause 5.6.1.4) or before SERVICE REJECT message is received | Will apply to all ongoing SR's on that access |
| T3417 expired | If the sendee request attempt counter is greater than or equal to 5, the UE shall start timer T3325. Each transaction has its own T3417, SR attempt counter and T3325 when the corresponding attempt counter becomes 5. |
| SERVICE REJECT received, other EMM cause values than those treated in sub clause 5.6.1.5, and cases of EMM cause values #22 and #25, if considered as abnormal cases according to sub clause 5.6.1.5 | For this case it seems to be more appropriate NOT to affect other ongoing SR's if any |
| Tracking area updating procedure is triggered | Will effect all the ongoing SR's |
| Switch off | Will effect all the ongoing SR's |
| Detach procedure collision | Will effect all the ongoing SR's |
| Transmission failure of SERVICE REQUEST message indication with TAI change from lower layers | Will effect all the ongoing SR's |
| Transmission failure of SERVICE REQUEST message indication without TAI change from lower layers | Will effect all the ongoing SR's |

Figure 9:
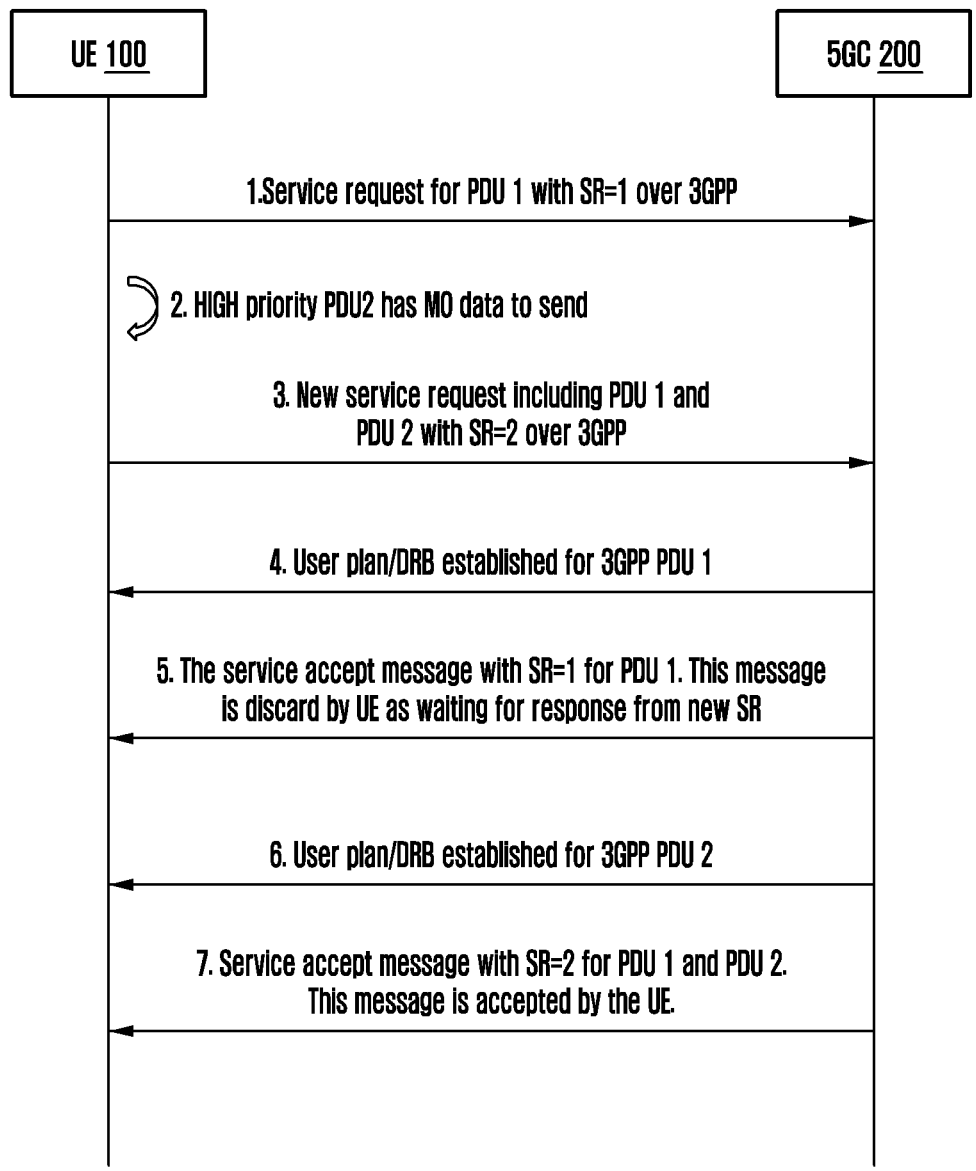
FIG. 9 is a sequence diagram illustrating various signaling messages communicated between the UE and a SGC, according to embodiments as disclosed herein.
Figure 10:
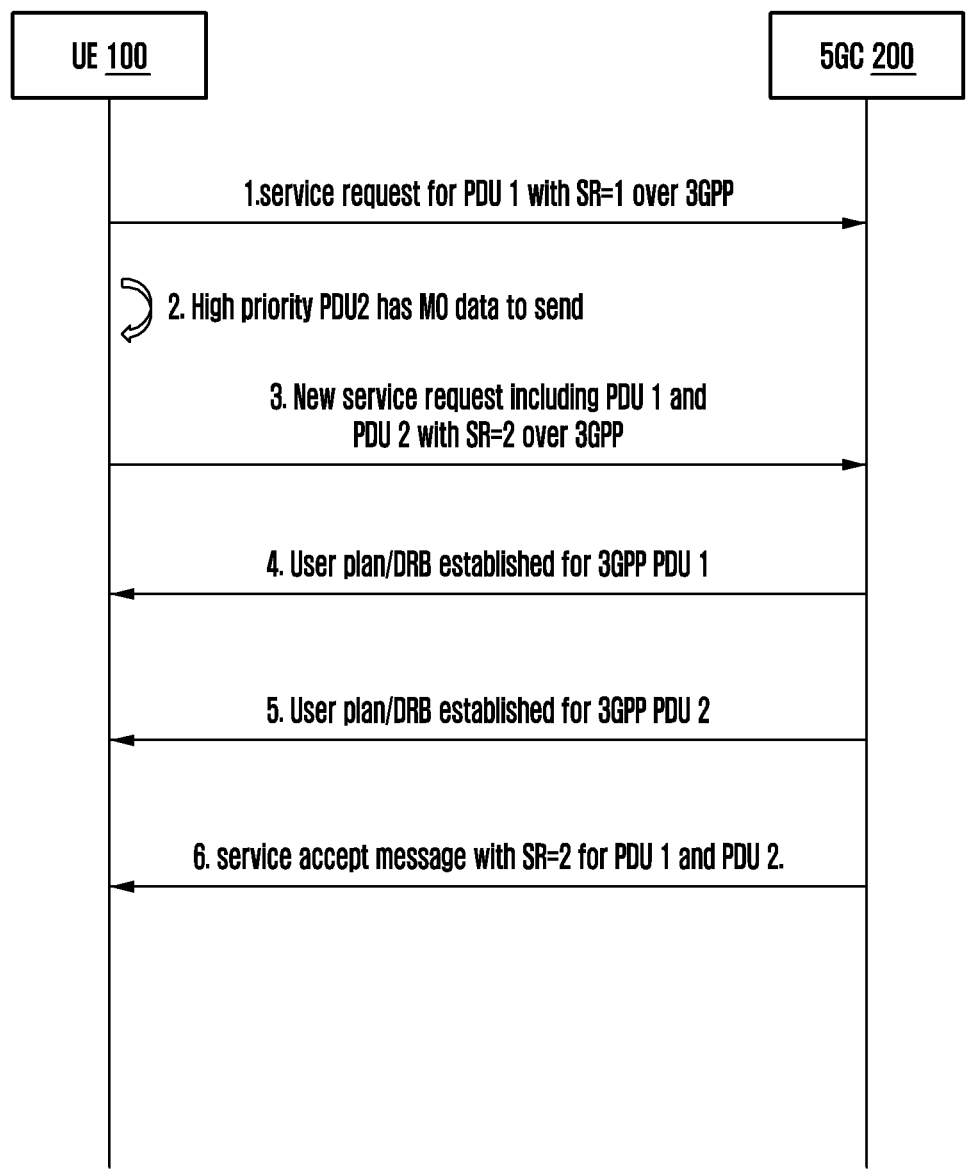
FIG. 10 is a sequence diagram illustrating various signaling messages communicated between the UE and the SGC, according to embodiments as disclosed herein.

FIG. 9 and FIG. 10 are sequence diagrams illustrating various signaling messages communicated between the UE and the 5GC, according to embodiments as disclosed herein.

As shown in the FIG. 9, At 1, UE 100 sends the service request for PDU 1 with SR=1 over 3GPP. At 2, the high priority PDU2 has MO data to send. At 3, the UE 100 sends a new service request including PDU 1 and PDU 2 with SR=2 over 3GPP. At 4, the user plan/DRB is established for 3GPP PDU 1. At 5, UE receives the service accept message with SR=1 for PDU 1. This message is discard by UE 100 as waiting for response from new SR. At 6, the user plan/DRB is established for 3GPP PDU 2. At 7, the UE 100 receives the service accept message with SR=2 for PDU 1 and PDU 2. This message is accepted by the UE 100.

As shown in the FIG. 10, At 1, the UE 100 sends the service request for PDU 1 with SR=1 over 3GPP. At 2, the high priority PDU2 has MO data to send. At 3, the UE 100 sends a new service request including PDU 1 and PDU 2 with SR=2 over 3GPP. At 4, the user plan/DRB is established for 3GPP PDU 1 and at 5, the user plan/DRB is established for 3GPP PDU 2. At 6, the UE receives the service accept message with SR=2 for PDU 1 and PDU 2.

As shown in the FIG. 9 and FIG. 10, the request for user plane resources (DRB) can be made as quickly as possible. Consider a scenario where the UE 100 had triggered a service request procedure with SRI=1 (Service Request Identifier) for PDU1. There is a request for MO data to be sent for some other PDU (may be a higher priority PDU). In this case, the UE 100 shall abort the on-going service request procedure and trigger another service request procedure as an entirely new procedure. To achieve above described behavior, the service request identifier (SRI) is used, which can be used to uniquely identify each service request procedure. It has to be included in each of service request procedure messages (Service request or Service Accept or Service Reject message etc.). The SRI uniquely identify a particular transaction of service request procedure. Optionally, the first Service Request procedures messages may not include the SRI. i.e., only from second service request procedure SRI is included in Service request procedure messages.

In order to understand the concept better, consider example: Service Request is triggered for PDU1 with SRI=1. Now, consider a case where the PDU2 has to send data over 3GPP or network 200 sent a data notification for PDU2 over 3GPP. As per current prior art, the UE 100 will block the new service request i.e. block new data request on PDU2, because already the SR procedure is ongoing. It is proposed that the UE 100 will abort the service request procedure with SRI=1 (i.e. ongoing service request procedure) and shall trigger a new service request procedure in one below ways "case A" or "case B".

Case A. the UE 100 to trigger Service Request with SRI=2 including both PDU1, PDU2 in Uplink Data Status IE. Now, the network 200 configures the UE 100 with bearers for PDU1 and sends Service Accept with SRI=1 for PDU1.

The UE 100 shall discard the Service Accept (or Service Reject) with SRI=1 as the UE 100 has already aborted the Service Request procedure with SRI=1 and waiting for response for service request with SRI=2.

Meanwhile, the network 200 configures UE 100 with bearers for PDU2 also and sends a Service Accept message including one of the below possible options:

Service Accept or Service Reject message with SRI=2. This shall be accepted by the UE 100.

The UE 100 to trigger Service Request including only PDU2 in Uplink Data Status IE with SRI=1 or 2 (implementation dependent, here SRI=2 used as an example) as for UE 100 it is a new service request.(Where UE only wants User Plane for PDU2)

The Network configures UE with bearers for PDU1 which UE has to discard or release the resources immediately treating it is an invalid message. If Service Accept is included, UE will discard the same. 5. Now, network configures UE with bearers for PDU2 which UE shall accept gracefully proceeding with the procedure. If Service Accept is included with no information about PDU1 (which is expected behavior) indicates the end of the new (second) service request procedure. UE shall trigger SR for PDU1 if there is any pending MO data for PDU1 or data notification is received from network.

The proposed method handles concurrent Service Request for same access also.

As an implementation option, the AMF 500 may store the value of PDU session re-activation result IE for time "x" (by running a timer). So that if the AMF 500 receives a new SR message with increased SRI value compared to previous service request message then the AMF 500 could act only on delta part of uplink data status IE and for the PDU session ID's it has sent the response to the UE 100 need not re-request the SMF to establish the DRB. i.e., for example first SR procedure (with SRI 1) requested PDU 1 and PDU 2. The AMF 500 establishes PDU1 and PDU2 (after requesting SMF) and sends service accept with PDU session reactivation result IE to the UE 100. Meanwhile, the AMF 500 receives new Service request message (with SRI 2) with PDU1, PDU2 and PDU3 then the AMF 500 uses the stored PDU session reactivation result IE to determine the result of PDU 1 and PDU2 and only for PDU3 requests SMF to establish the PDU sessions. Then finally the AMF 500 sends Service Accept by encoding PDU session reactivation result IE with stored value of PDU 1 and PDU2 (from SRI 1) and new result of PDU 3.

In yet another embodiment, if user plane resources (or DRB) for a given PDU session is already active then the AMF 500 shall encode PDU session reactivation result of that particular PDU session is successful activation of PDU session, even though the AMF 500 receives a request from the UE 100 to establish that particular PDU session.

Figure 11:
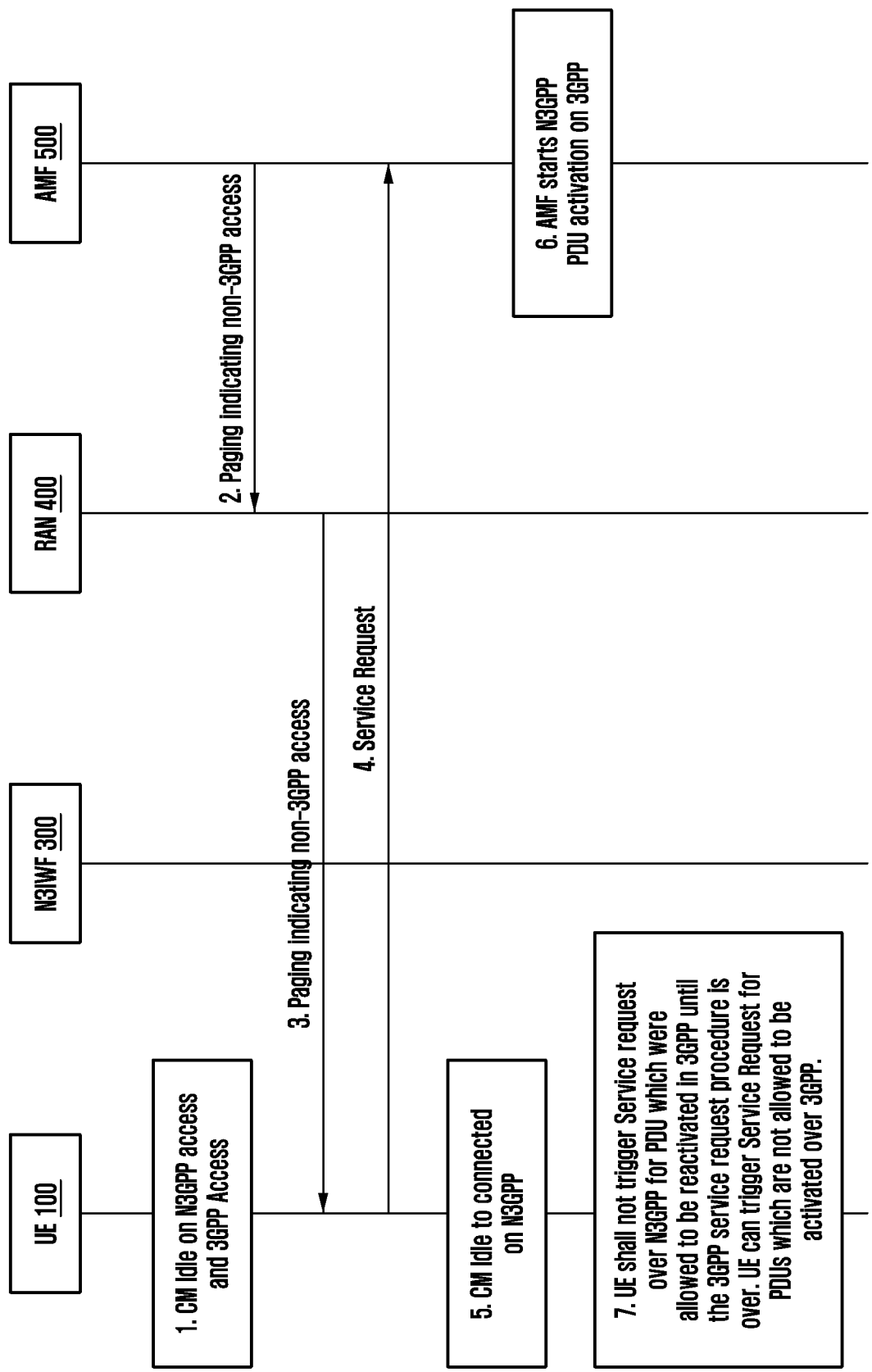
FIG. 11 is a sequence diagram illustrating PDU Movement in a CM Connected State at the 3GPP, according to embodiments as disclosed herein.

FIG. 11 is a sequence diagram illustrating PDU Movement in the CM connected state at 3GPP, according to embodiments as disclosed herein.

As shown in the FIG. 11, At 1, the UE 100 is in a CM Idle on N3GPP access mode and 3GPP Access mode. At 2, the AMF 500 sends a paging indicating non-3GPP access to the RAN. At 3, the RAN 400 sends the paging indicating non-3GPP access to the UE 100. At 4, the UE 100 sends the Service Request to the AMF. At 5, the UE 100 is in a CM Idle to connected on N3GPP. At 6, the AMF 500 starts the N3GPP PDU activation on the 3GPP. At 7, the UE 100 shall not trigger Service request over N3GPP for PDU which were allowed to be reactivated in 3GPP until the 3GPP service request procedure is over. Further, the UE 100 can trigger Service Request for PDUs which are not allowed to be activated over 3GPP.

In an embodiment, the 3GPP and N3GPP access is in IDLE Mode and the UE 100 obtains paging in 3GPP with N3GPP access. The UE 100 sends Service Request with allowed list of N3GPP PDUs which can be moved. During the time, the UE 100 tries to move to CM_CONNECTED state in N3GPP by sending the Service Request.

In an embodiment, the Service request should not be containing PDU which was sent in 3GPP Service Request "in allowed List of PDUs". It can contain list of PDUs which were not sent in Service Request in 3GPP in "in allowed List of PDU" based on Uplink Data.

Figure 12:
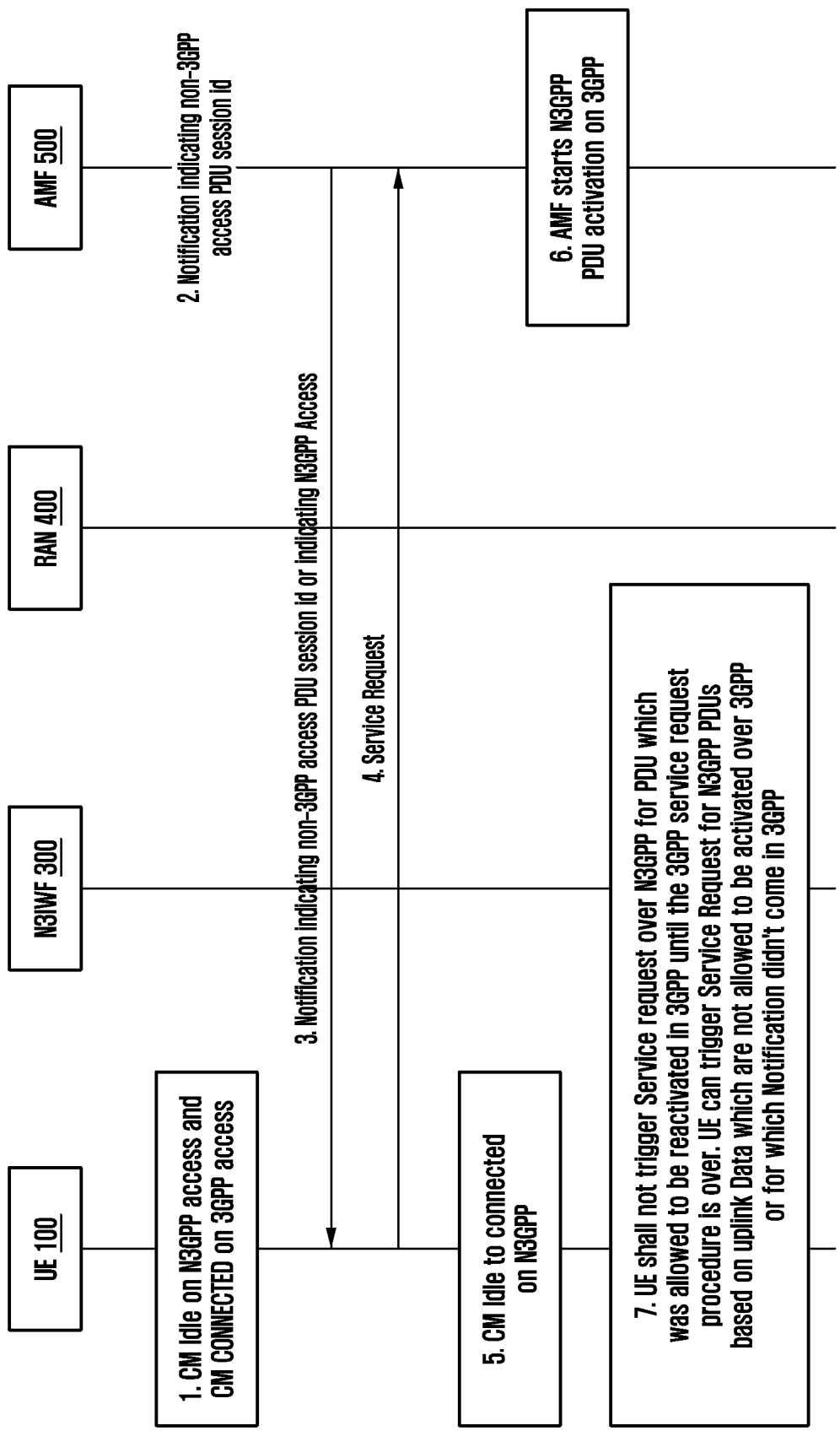
FIG. 12 is a sequence diagram illustrating PDU Movement in CM Connected State at the 3GPP, according to embodiments as disclosed herein.

FIG. 12 is a sequence diagram illustrating PDU Movement in CM Connected State at the 3GPP, according to embodiments as disclosed herein.

As shown in the FIG. 12, at 1, the UE 100 is in CM Idle on N3GPP access and CM CONNECTED on 3GPP access. At 2, the AMF 500 sends the notification indicating non-3GPP access PDU session id to the RAN. At 3, the RAN 400 sends the notification indicating non-3GPP access PDU session id to the UE 100. At 4, the UE 100 sends the service request to the AMF. AT 5, the UE 100 is in CM Idle to connected on N3GPP and At 6, the AMF 500 starts N3GPP PDU activation on 3GPP. At 7, the UE 100 shall not trigger Service request over N3GPP for PDU which was allowed to be re-activated in 3GPP and for which notification had come until the 3GPP service request procedure is over. Further, the UE 100 can trigger Service request for N3GPP PDUs based on uplink data which are not allowed to be activated over 3GPP or for which notification didn't come in the 3GPP.

In an embodiment, the 3GPP access is in the CM-CONNECTED state and N3GPP access is in the IDLE Mode and the UE 100 obtains the notification for downlink data for N3GPP with PDU session id/access technology. The UE 100 sends the service request if the PDU session for which notification has come is allowed to be moved over the 3GPP otherwise, the UE 100 shall send the notification response. During the time, if the UE 100 tries to move to CM_CONNECTED state in N3GPP by sending the service request.

In an embodiment, the service request shouldn't be containing PDU for which notification had come for downlink data in 3GPP and if the service request was allowed to be reactivated over 3GPP. Alternatively, the service request shouldn't be containing PDU which is allowed to be reactivated over 3GPP.

The service request can contain N3GPP PDUs based on uplink data which are not allowed to be activated over 3GPP or for which Notification didn't come in 3GPP.

Figure 13:
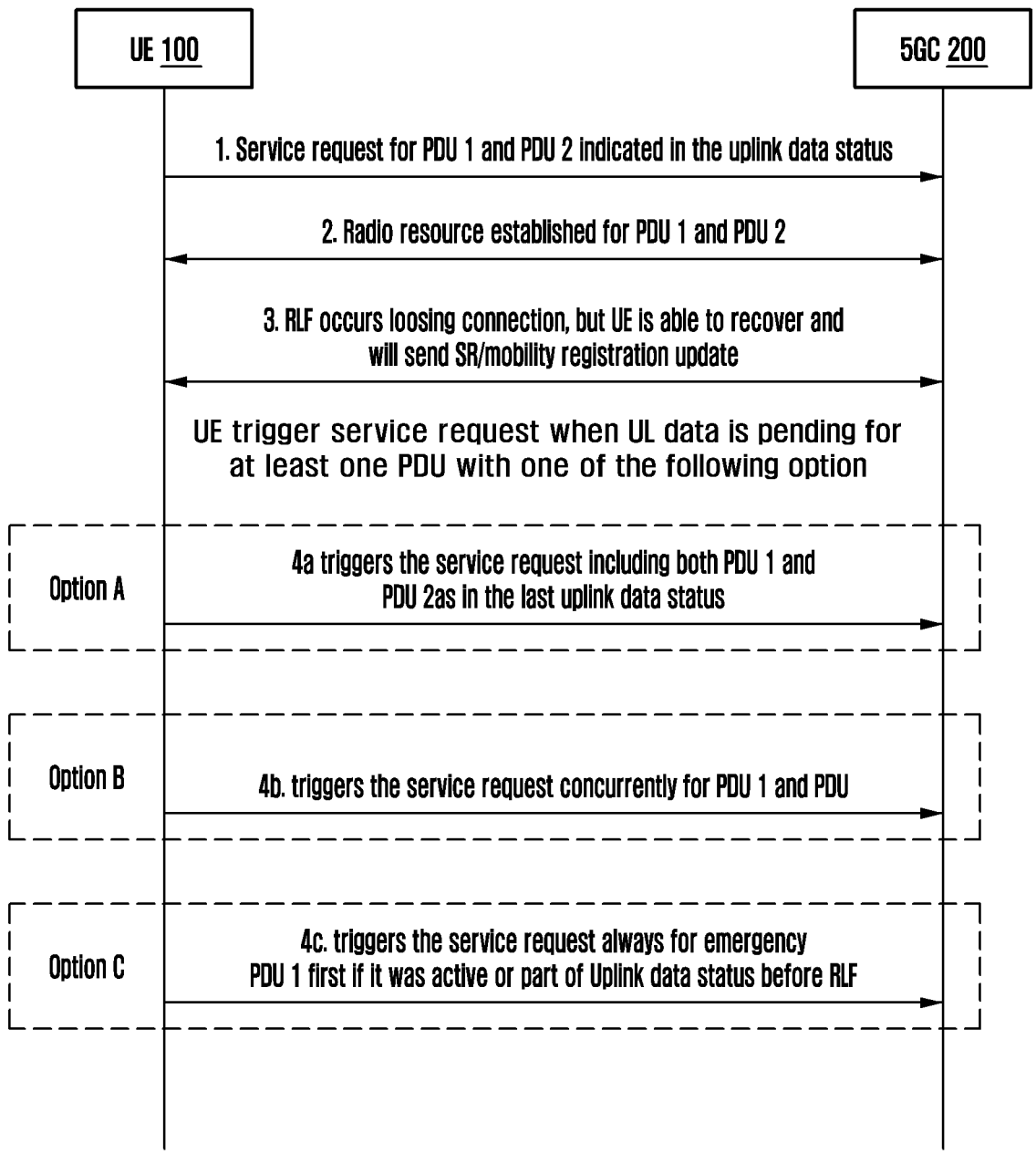
FIG. 13 is a sequence diagram illustrating that the UE shall trigger Service Request when UL data is pending for at least one PDU, according to embodiments as disclosed herein.

FIG. 13 is a sequence diagram illustrating that the UE 100 shall trigger service request when the UL data is pending for at least one PDU, according to embodiments as disclosed herein.

The problem scenario includes:

PDU 1 and PDU2 user plane are active (that is DRB is established) on 3GPP access at 1, RLF occurs at 2, and UE 100 recovers from RLF at 3

After the recovery, the UE 100 can either send the service request if the uplink data is pending (Case A below) or send the mobility update when the uplink data is not pending (Case B below).

The below listed two case scenario provides solution:

Case A: The UE 100 shall trigger the service request when the UL data is pending for at least one PDU with one of the 3 alternative options:

The UE 100 triggers the service request including PDU1, PDU2 (i.e. all the PDU's that were requested to be activated in the last uplink data status of service request) at 4*a*; or The UE 100 triggers the service request concurrently for PDU1, PDU2 (i.e. all the PDU's that were requested to be activated in the last uplink data status of service request) at 4*b*; or The UE 100 triggers service request immediately after gaining service for the emergency PDU (if any) was active before the occurrence of RLF at 4*c*.

Figure 14:
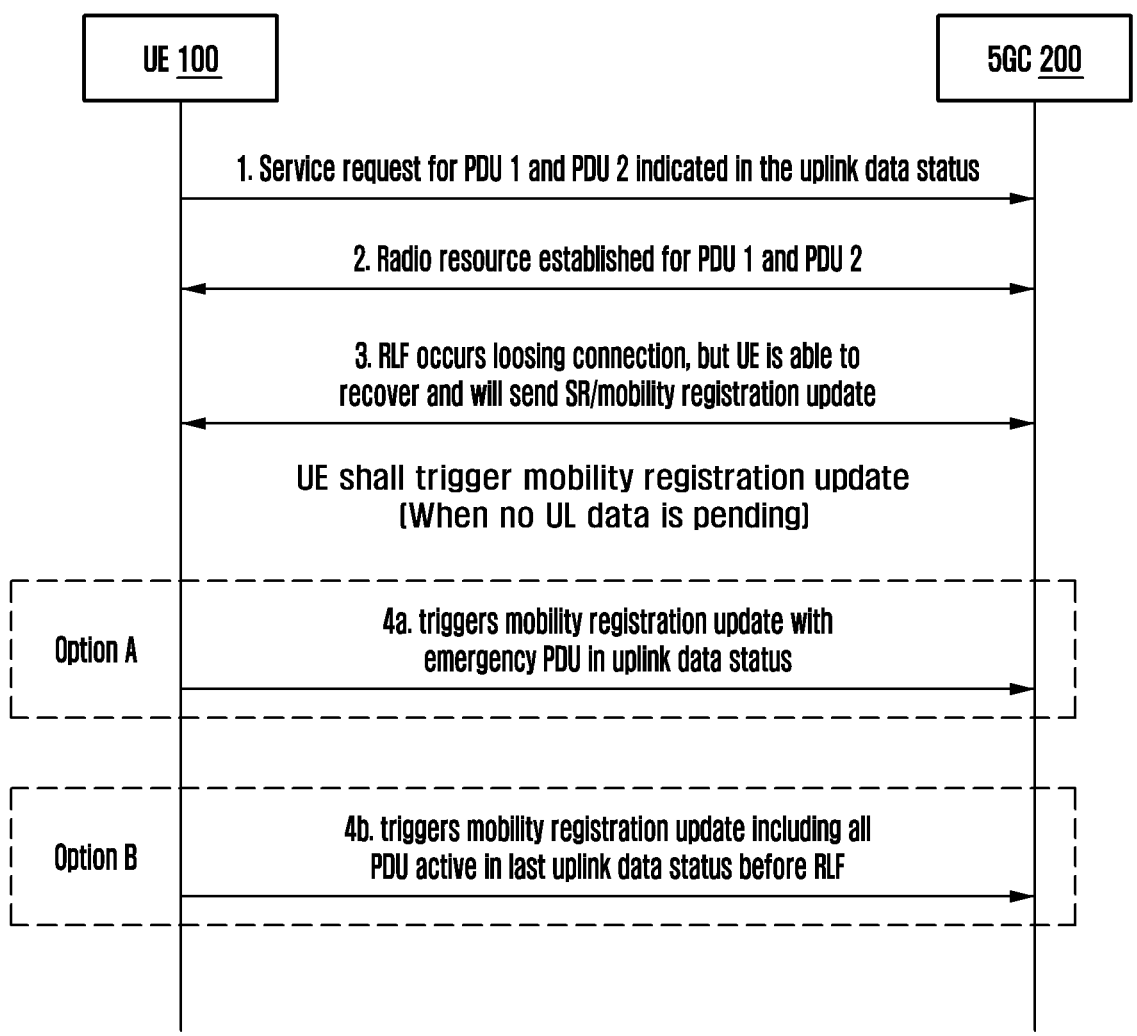
FIG. 14 is a sequence diagram illustrating that the UE shall trigger mobility registration update when there is no uplink data pending, according to embodiments as disclosed herein.

FIG. 14 is a sequence diagram illustrating that the UE 100 shall trigger mobility registration update when there is no uplink data pending, according to embodiments as disclosed herein.

Case B: the UE 100 shall trigger Mobility Registration Update when there is no uplink Data Pending with one of the two options:

UE triggers Mobility Registration Update with Emergency PDU in Uplink Data Status IE at 4*a* in the FIG. 14, or UE triggers Mobility Registration Update including all PDUs active in the last Uplink Data status IE at 4*b* in the FIG. 14.

Figure 15:
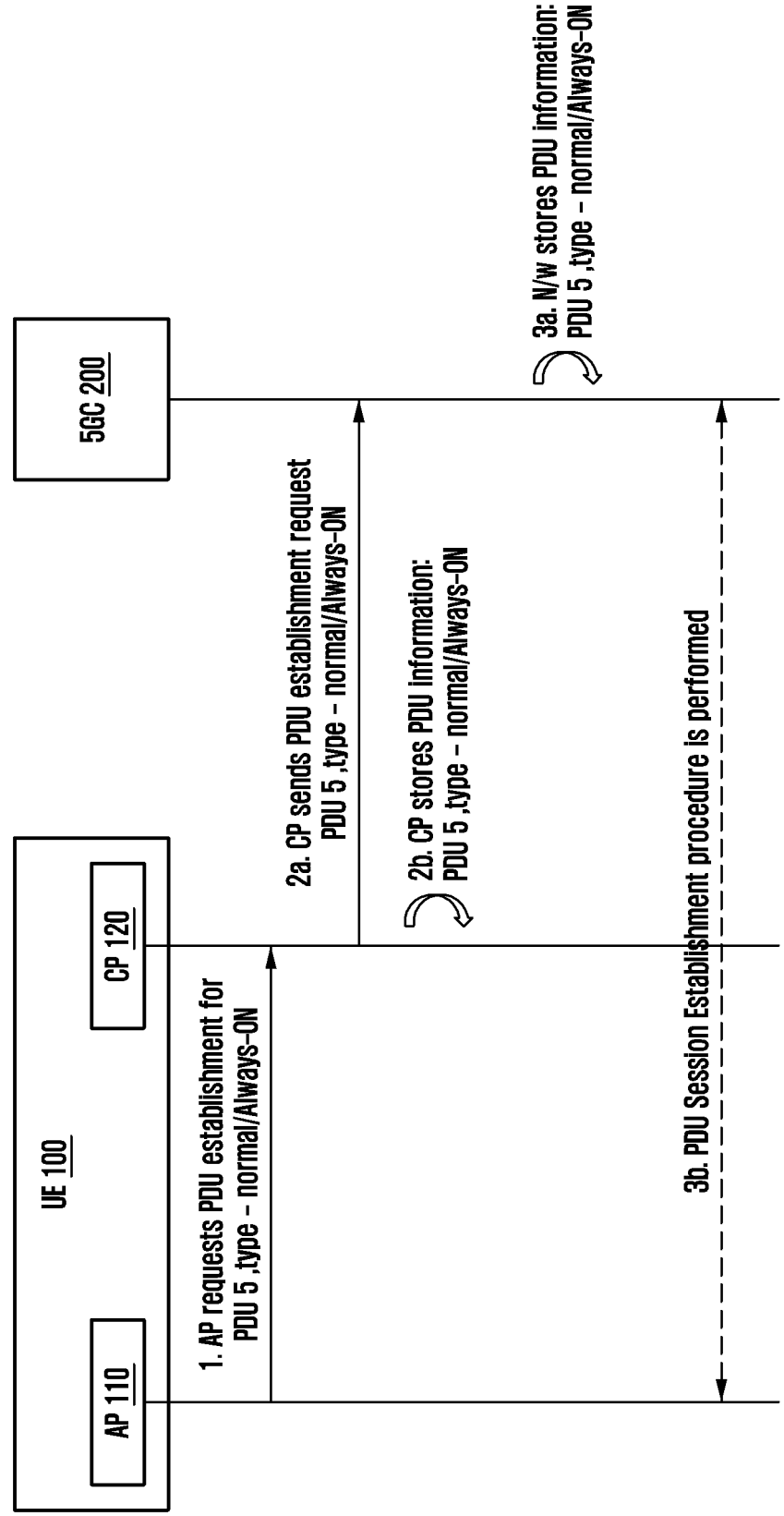
FIG. 15 is an illustration of PDU session establishment procedure, according to embodiments as disclosed herein.

FIG. 15 is an illustration of a PDU session establishment procedure, according to embodiments as disclosed herein.

As shown in the FIG. 15, an application processor (AP) initiates PDU session establishment procedure with communication processor (CP) 120 or NAS by sending PDU to be established indicating if it is an always-on PDU (i.e. higher priority PDU session). And CP 120 includes the indication of type in PDU establishment request message to the network 200. Later this information of PDU and its type is utilized by the network 200 during inactivity timer expiry to determine if the user plane resources needs to be released or not. If PDU type is always on, then the network 200 will not release the user plane resources even upon inactivity timer expiry and continues to maintain the UE context or if the PDU type is always on, then the network 200 shall not run inactivity timer. Due to any RLF reasons or error situations the DRB is released then the network 200 shall reactivate the always-on PDU session. The AMF 500 shall inform gNodeB, SMF, UPF and other relevant network elements about the always-on PDU session. So that if the network elements determine that such PDU sessions DRB's are released the network elements can start the DRB activation process.

As shown in the FIG. 15, At 1, the AP 110 requests PDU establishment for PDU 5, type—normal/Always-ON to the CP 120. At 2*a*, the CP 120 sends PDU establishment request PDU 5, type—normal/Always-ON to the network 200. At 2*b*, the CP 120 stores PDU information (i.e., PDU 5, type—normal/Always-ON). At 3*a*, the network 200 stores PDU information (i.e., PDU 5, type—normal/Always-ON). At 3*b*, the PDU session establishment procedure is performed between the AP 110 and the network 200.

Figure 16:
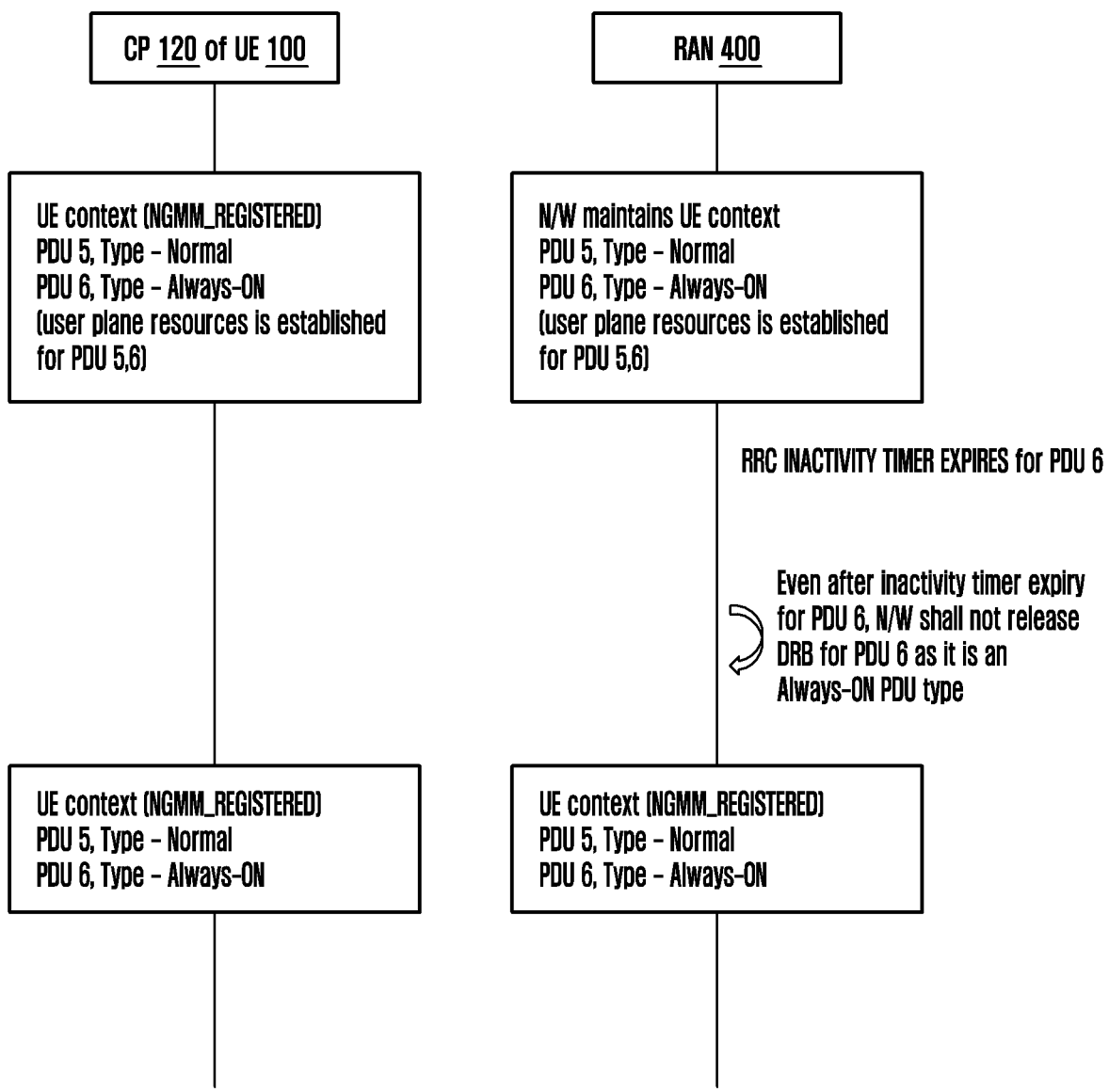
FIG. 16 is an illustration of network maintaining UE context, according to embodiments as disclosed herein.

FIG. 16 is an illustration of the network 200 maintaining UE context, according to embodiments as disclosed herein.

In an embodiment in FIG. 16, Where the UE 100 has more than 1 PDUs with user plane resources of which one is an always on PDU type. When the inactivity timer expires for always on PDU, the network 200 shall not release the user plane resources maintaining the UE context.

Figure 17:
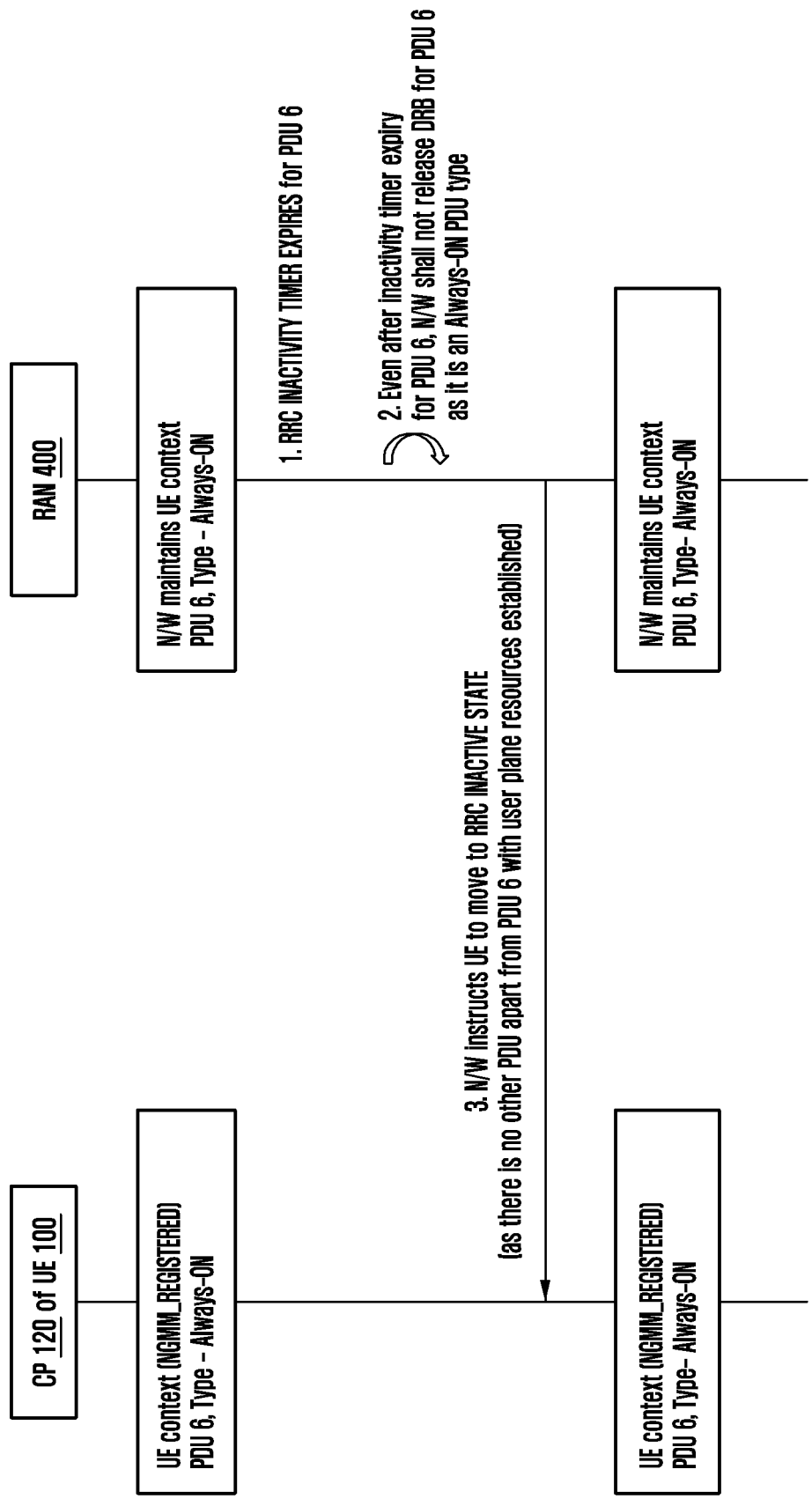
FIG. 17 is an illustration of network instructing UE in moving to RRC inactive state, according to embodiments as disclosed herein.

FIG. 17 is an illustration of the network 200 instructing the UE 100 in moving to RRC inactive state, according to embodiments as disclosed herein.

In an embodiment in FIG. 17, the UE 100 has only one PDU which is of type Always ON with active user plane resources. When the inactivity timer expires for this always on PDU, the network 200 shall not release the user plane resources and instruct the UE 100 to enter to RRC inactive state at 1-3. Alternately, if gNode-B is having Always-On PDU session and inactive timer expires, indicating that there was no data transfer for implementation dependent time then gNode-B can release for the physical resources of DRB and move that particular DRB to INACTIVE state, keeping all other DRB's active. i.e., per DRB INACTIVE state movement. Now whenever data is received on the DRB which is moved to INACTIVE it is resumed with physical resource allocation.

Figure 18:
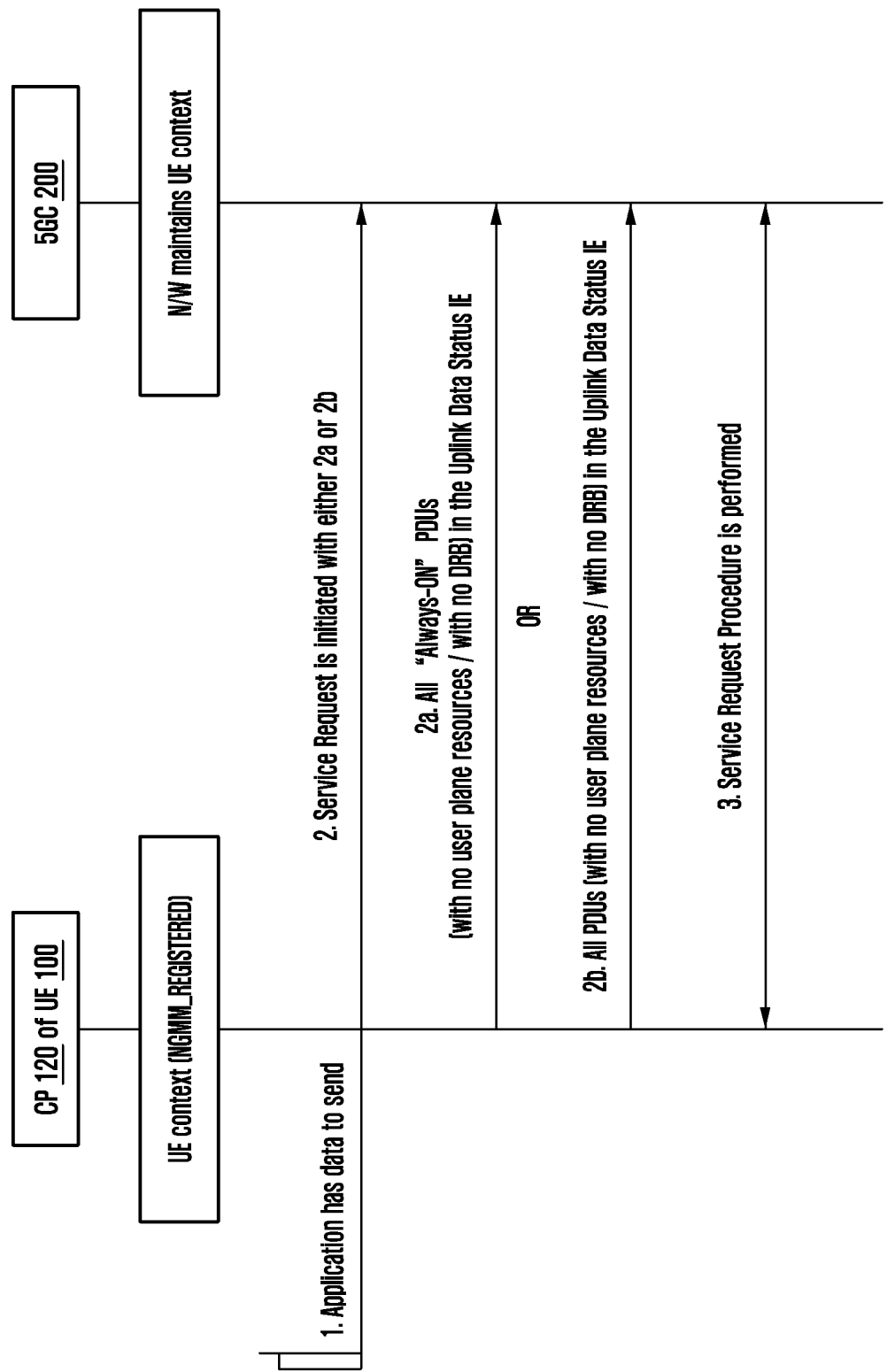
FIG. 18 is an illustration of performing service request procedure, according to embodiments as disclosed herein.

FIG. 18 is an illustration of performing service request procedure, according to embodiments as disclosed herein.

In an embodiment in FIG. 18, at 1, if any application has data to send, then the UE 100 shall send service request including that PDU session id (mapped to the requested application) along with either all other active PDUs or all active PDUs of type always-on which don't have user plane resources in the uplink data status IE at 2*a* and at 2*b*. So, that the delay is minimized and satisfying the key requirements of low latency, delay intolerant service PDUs. Alternatively while sending the service request or the registration request message, the UE 100 has always-on PDU then the UE 100 will indicate to the network 200 that the UE 100 needs DRB for all the active PDUs. In such a case, the network 200 should establish the user plane resources for all the active PDU's for the UE 100. i.e. in general if AP 110 has indicated always-on PDU session then each time then the UE 100 triggers the service request procedure and if the DRB is not established for those PDU sessions then the UE 100 shall include those PDU session ID's in uplink data status IE. Alternatively, in general if the AP 110 has indicated always-on PDU session then each time the UE 100 triggers service request procedure irrespective of DRB established for those PDU sessions, the UE 100 shall include those PDU session ID's in uplink data status IE. Alternative, if the UE 100 is of type higher priority access or supporting mission critical service or low latency applications then it shall set all the active PDU session ID's as part of uplink data status IE each time the UE 100 triggers service request procedure. Alternatively, if the UE 100 is of type higher priority access or supporting mission critical service or low latency applications then the network 200 shall run long duration INACTIVE timer, or shall not run INACTIVE timer so that DRB's are never released and whenever DRB release happen network elements shall initiate a procedure to re-establish the DRB's. The network 200 can understand that UE is of higher priority access or supporting mission critical service or low latency application from subscription information or explicit indication from UE or after determination of type of service UE 100 is requesting (for example if the UE request for mission critical service and hence establishes those PDU sessions).

In an embodiment in FIG. 15-FIG. 18, the AP 110 is indicating (PDU) type as normal or always-on for PDU 5. This is done only for clear understanding of the solution. Indication of (PDU) type from the AP 110 is sent only for always-on PDU otherwise it is implicit that they come under normal PDU type. Always-on (or higher priority PDU session) described in this disclosure is a PDU session which are established for the services which need low latency and low connection establishment time (for example mission critical services).

Figure 19:
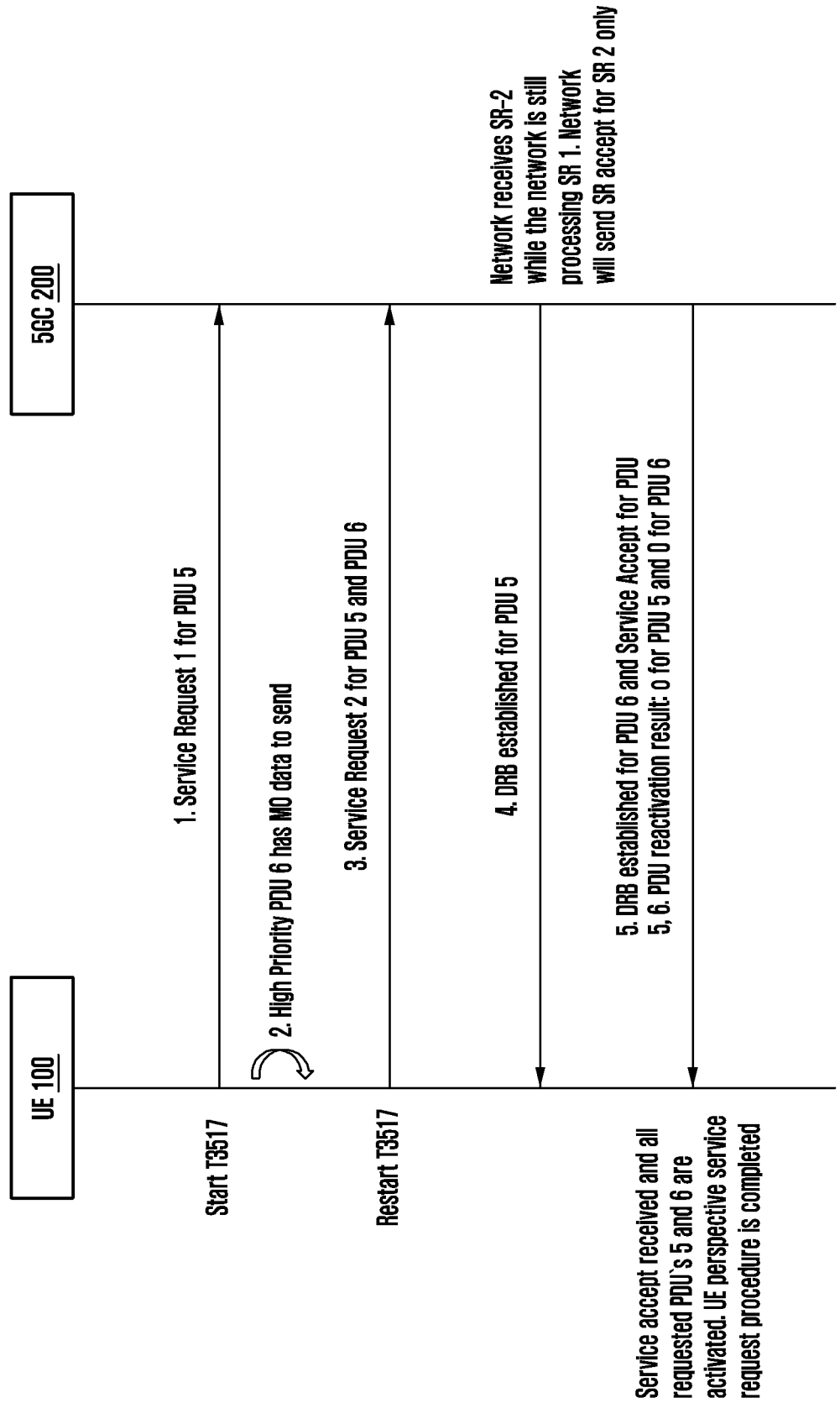
FIG. 19 is an illustration of requested DRB's of PDU session, according to embodiments as disclosed herein.

FIG. 19 is an illustration of requested DRB's of PDU session, according to embodiments as disclosed herein.

At 1, the UE 100 sends the SR 1 for PDU 5 to the network 200. At 2, the high Priority PDU 6 has MO data to send. At 3, the UE 100 sends the service request 2 for PDU 5, 6. At 4, the DRB is established for PDU 5 and at 5, the DRB is established for PDU 6 and service accept for PDU 5 and 6 (PDU Reactivation Result: 0 for PDU5 and 0 for PDU 6).

In an embodiment, the system disclose about service accept received and all the requested DRB's of PDU session ID's of SR-2 are activated. SR procedure is marked as completed from UE perspective as the DRB is established for all the PDU session ID(s) for which user plane radio resources were requested in last sent service request message and are also indicated successfully activated in PDU session reactivation result IE in SERVICE ACCEPT message.

Figure 20:
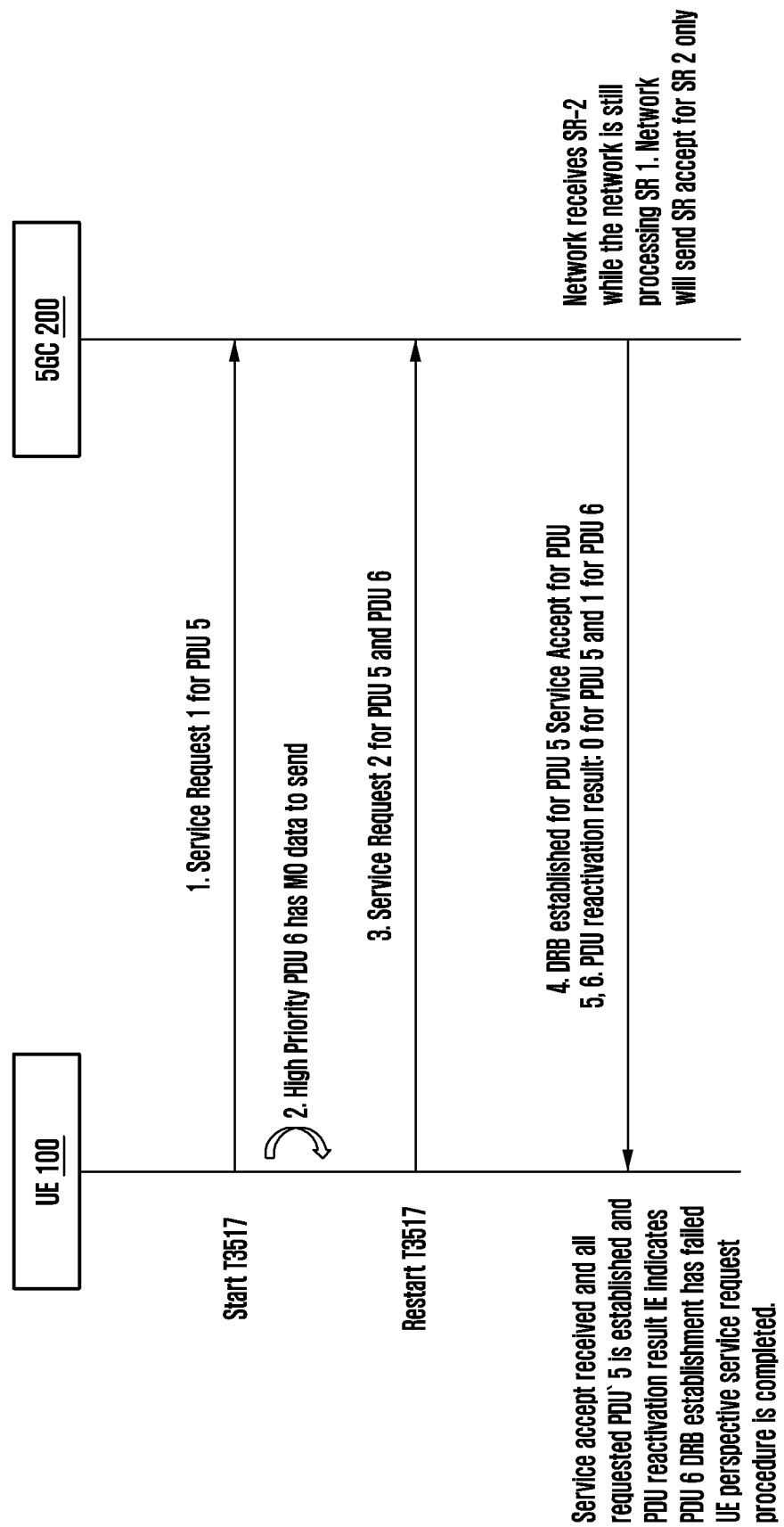
FIG. 20 is an illustration of PDU session reactivation result, according to embodiments as disclosed herein.

FIG. 20 is an illustration of PDU session reactivation result, according to embodiments as disclosed herein.

As shown in the FIG. 20, at 1, the UE 100 sends the SR 1 for PDU 5 to the network 200. At 2, the high Priority PDU 6 has MO data to send. At 3, the UE 100 sends the service request 2 for PDU 5, 6. At 4, the DRB is established for PDU 5 and service accept for PDU 5 and 6 (PDU Reactivation Result: 0 for PDU5 and 1 for PDU 6).

In an embodiment, system disclose about after receiving service accept message with PDU session reactivation result IE indicating one of the requested PDU session ID's DRB of second service request message establishment has failed. The SR procedure is marked as completed from the UE perspective as the UE 100 received the user plane activation result for all the PDU session ID(s) for which user plane resources had been requested in the last sent SR message that matches with the PDU session reactivation result IE in the service accept message.

Figure 21:
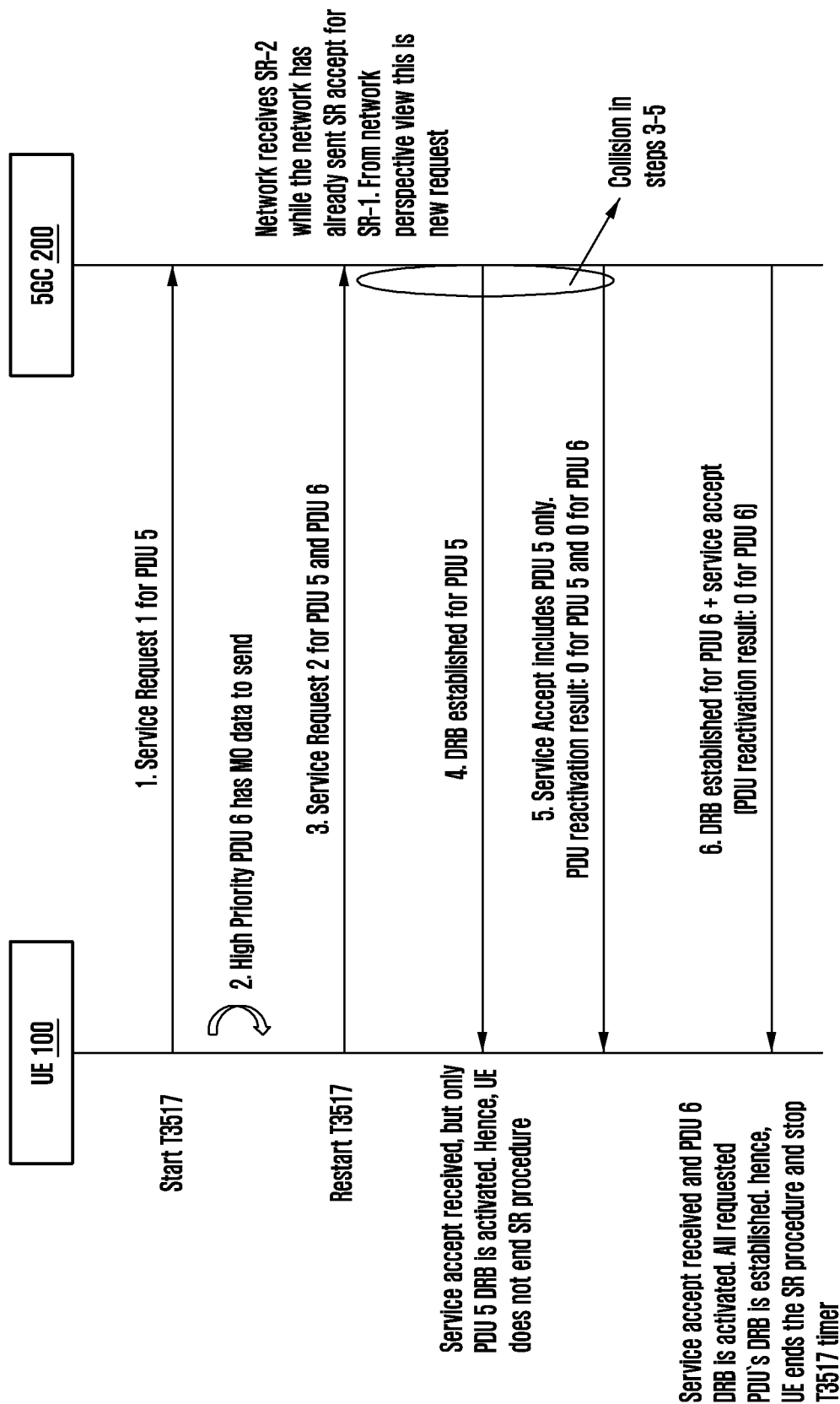
FIG. 21 is an illustration of receiving second service accept message, according to embodiments as disclosed herein.

FIG. 21 is an illustration of receiving second service accept message, according to embodiments as disclosed herein.

As shown in the FIG. 20, at 1, the UE 100 sends the SR 1 for PDU 5 to the network 200. At 2, the high Priority PDU 6 has MO data to send. At 3, the UE 100 sends the service request 2 for PDU 5, 6. At 4, the DRB is established for PDU 5. At 5, the network 200 sends the service accept including the PDU 5 only (PDU Reactivation Result: 0 for PDU5 and 0 for PDU 6). At 6, the DRB is established for PDU 6 and service accept for PDU 5, 6 (PDU Reactivation Result: 0 for PDU 6)

In an embodiment, the system describes about after receiving second service accept message i.e. when the UE 100 sends second SR and before it reaches the network 200, the AMF 500 might have responded back with service accept for the first SR. The UE 100 receives the first service accept for SR1 in which the PDU session reactivation result IE indicates successful user plane activation for PDU 5. From UE perspective, the SR procedure is still not completed (i.e. UE remains in 5GMM-service-request-initiated state) as user plane resources has not yet been activated for all the PDU session ID's requested in the last send SR message (i.e. in this example for PDU 6 user plane resources have not yet been established). Further the SR procedure is marked as completed from UE perspective when the UE 100 receives the next service accept message as it includes the PDU session activation result IE for all the user plane resources requested in the last sent SR message (SR2).

In an embodiment in FIG. 19-FIG. 21, the system describes about where the UE 100 has initiated service request procedure and there is a uplink data request received for a new PDU (of higher priority application) while the UE 100 is waiting for completing the service request procedure then the UE 100 can abort the current on-going service request procedure and proceed with new service request procedure. The UE 100 sends service request (uplink data status IE set to 5) message to AMF. The UE 100 is in 5GMM-service-request-initiated state and 5GMM layer receives a request from upper layers to establish DRB for PDU session ID 6. The UE 100 aborts first service request and sends second service request message (restart T3517) with PDU Session ID in uplink data status IE set to 5 and 6. The network 200 receives new SR message and processes the latest received SR message. The service request procedure is considered completed on UE side when any of the following events occur.

Figure 22:
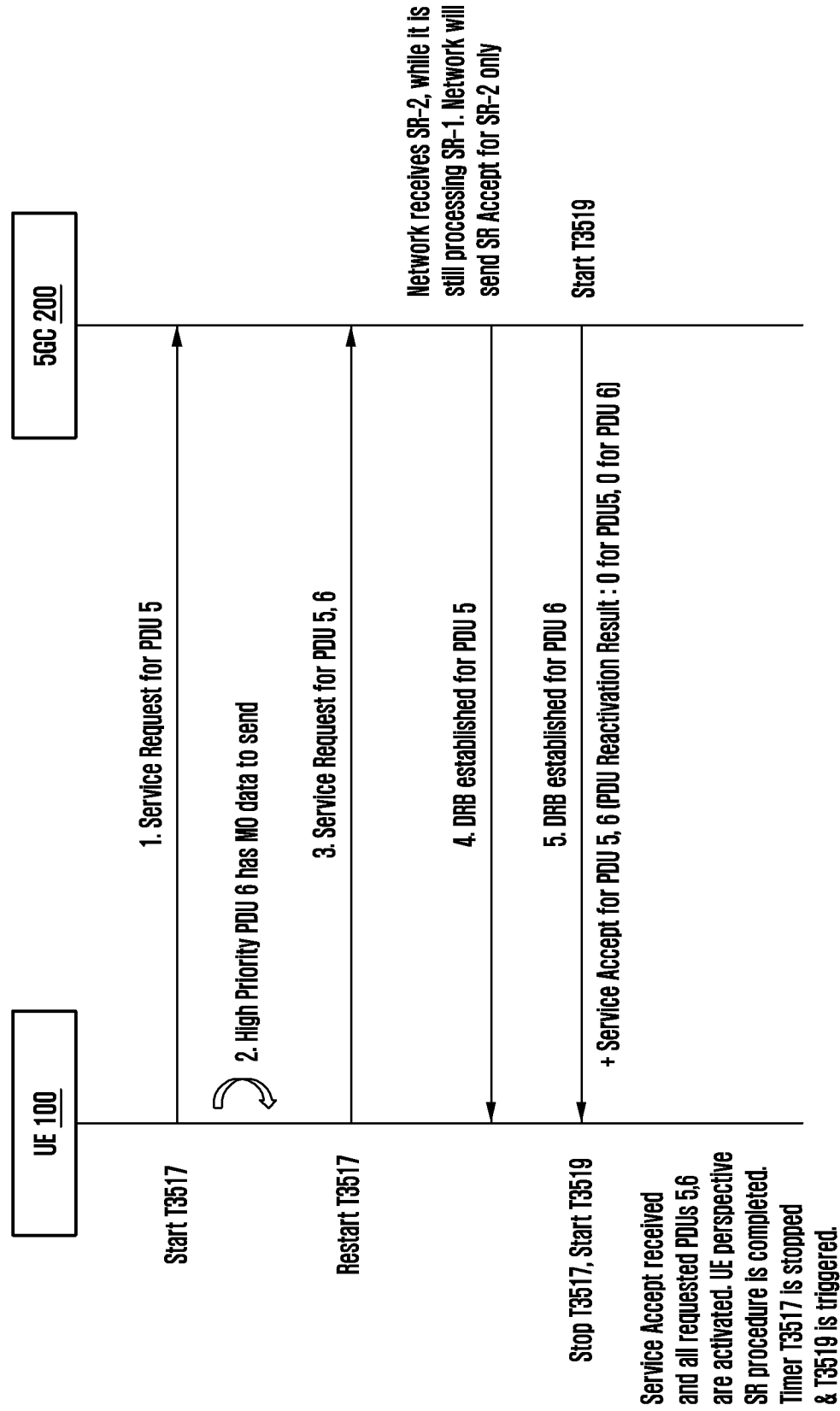
FIG. 22 is an illustration of completing UE perspective SR procedure, according to embodiments as disclosed herein.

FIG. 22 is an illustration of completing UE perspective SR procedure, according to embodiments as disclosed herein.

As shown in the FIG. 22, at 1, the UE 100 sends the SR for PDU 5 to the network 200. At 2, the high Priority PDU 6 has MO data to send. At 3, the UE 100 sends the service request for PDU 5, 6. At 4, the DRB is established for PDU 5. At 5, the DRB is established for PDU 6 and service accept for PDU 5, 6 (PDU Reactivation Result: 0 for PDU 6).

In an embodiment, the UE 100 has initiated service request procedure and there is a uplink data request received for a new PDU (of higher priority application) while UE 100 is waiting for completing the service request procedure then UE 100 can abort the current on-going service request procedure and proceed with new service request procedure. Further, the UE 100 sends service request (uplink data status IE set to 5) message to the AMF. The UE 100 is in 5GMM-service-request-initiated state and 5GMM layer receives a request from upper layers to establish DRB for PDU session ID 6. The UE aborts first service request and sends second service request message with PDU session id in uplink data status IE set to 5 and 6. The network 200 receives new SR message and processes the latest received SR message. At successful completion of service request procedure, the UE 100 and network 200 shall trigger a timer T3519 (similar to T3319 in 3G). Until expiry of this timer, the UE 100 shall not initiate service request for the PDUs that were requested in the last service request procedure. Even if UE 100 initiates service request for the PDUs that were requested in the last service request procedure, the network 200 is expected to ignore the request until T3519 expiry.

In an embodiment in FIG. 19 to FIG. 22, if no service accept message is received from the network 200 and the timer T3517 (guarding the SERVICE REQUEST procedure on the UE side) expires then the UE 100 marks the service request procedure as completed.

In an embodiment in FIG. 19-FIG. 22, whenever the UE aborts the first service request procedure (SR1) and sends a new service request message (SR2) then it re-starts the timer T3517 (guarding the service request procedure on the UE side).

Figure 23:
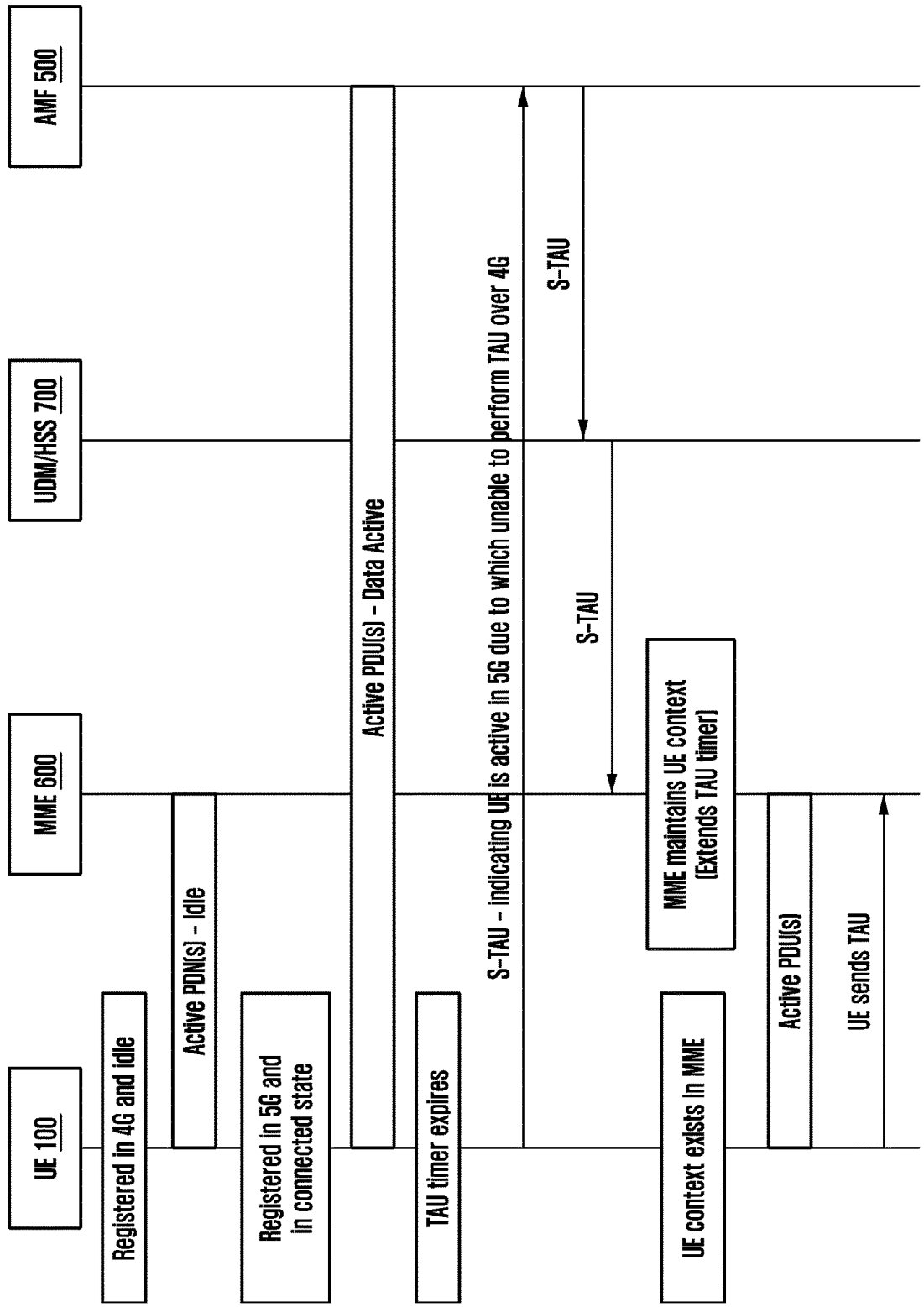
FIG. 23 is an illustration of MME not checking for S-TAU indication, according to embodiments as disclosed herein.

FIG. 23 is an illustration of MME 600 not checking for S-TAU indication, according to embodiments as disclosed herein.

In an embodiment in FIG. 23, the system describes about MME 600 not checking for S-TAU indication. When EPC periodic TAU timer expires in the UE 100, then the UE 100 should be allowed to send an indication to the UDM (via AMF) indicating that the UE 100 is unable to trigger TAU procedure due to the on-going data session over 5G. The UDM 700 then shall indicate to MME 600 that the UE 100 sent an indication which can be treated as semi-TAU (S-TAU) procedure. The MME 600 can extend TAU timer expiry for the UE 100. Once 5G data session is over, the UE 100 can trigger TAU and update to MME. Like UDM 700, there can be any other node or interface that can be used to route TAU to MME. Periodic timer value to be greater for dual registration supported UEs compared to single registration supported UEs.

Figure 24:
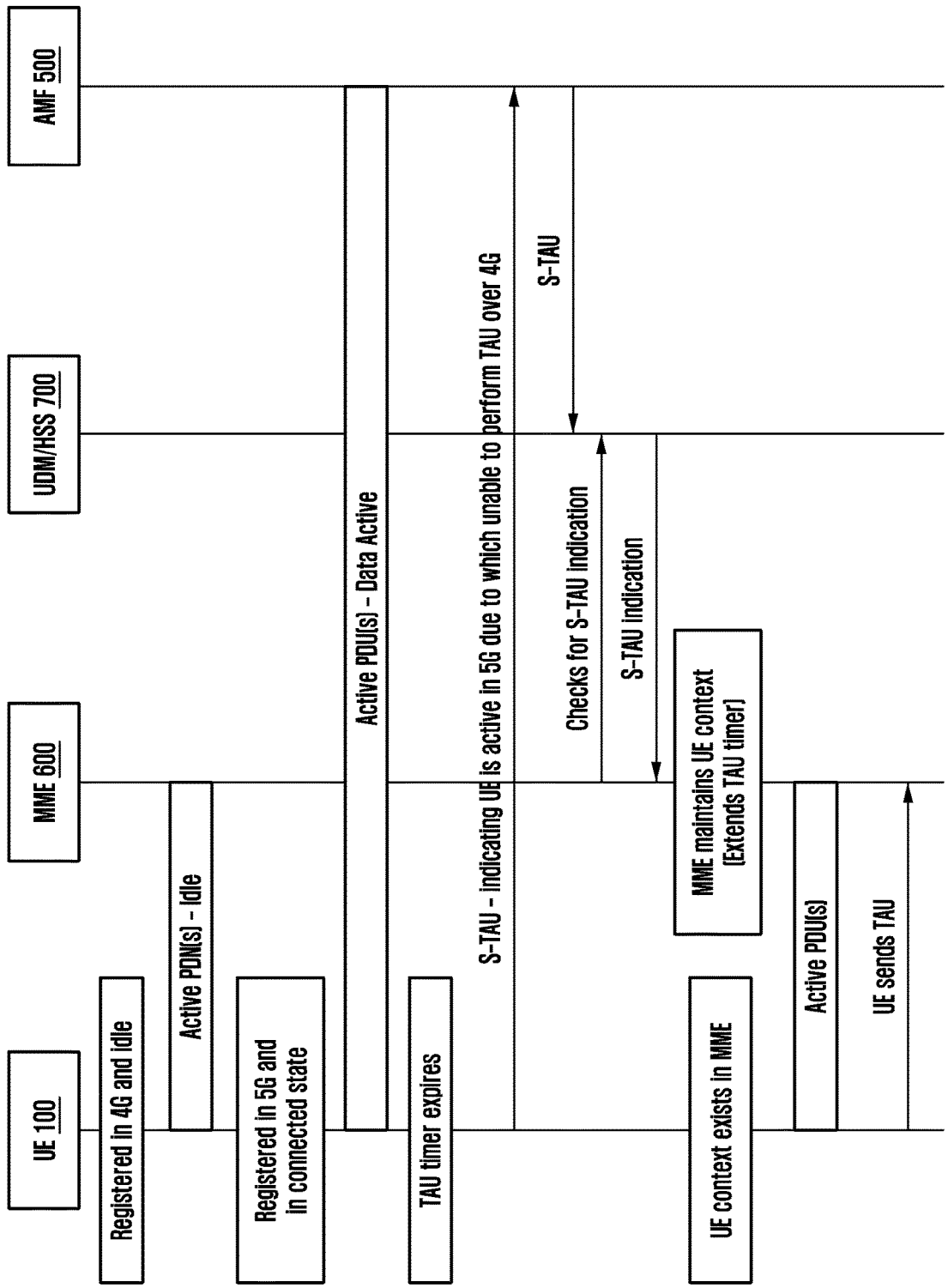
FIG. 24 is an illustration of MME checking for S-TAU indication, according to embodiments as disclosed herein.

FIG. 24 is an illustration of MME 600 checking for S-TAU indication, according to embodiments as disclosed herein.

In an embodiment in FIG. 24, when EPC periodic TAU timer expires in the UE 100, then the UE 100 should be allowed to send an indication to the UDM (via AMF) indicating that the UE is unable to trigger TAU procedure due to the on-going data session over 5G. When MME side periodic timer expires, the MME 600 checks with the UDM 700 if the UE 100 is available in 5G and any data session is active. If the UDM has received indication from the UE 100 then UDM 700 can update to MME 600 and MME 600 can keep UE context for some time. Like UDM 700, there can be any other node or interface that can be used to route TAU to MME.

In an embodiment, there would be high priority PDUs (delay intolerant, low latency, etc.) whose paging will be missed due to the registration in Dual Rx, Single Tx configuration. Consider a case where the UE 100 is dual registered (Dual Rx, Single Tx) to both 4G, 5G with an on-going data session over 5G (5G Connected mode, 4G Idle mode). Due to which paging will be missed over 4G if the UE 100 does not tune for the paging occasions over 4G. This is a major concern. Existing method and system resolve this as in the following by the MME 600 sends paging to the UE 100 over 4G and sends notification over 5G (as 5G is in connected mode) simultaneously and the MME 600 sends notification through 5G only if the MME 600 is unable to reach the UE (and knows that UE supports dual registration). Alternatively, the MME 600 can send notification over 5G only if the request has come for high priority PDUs instead of sending notification to 5G for every PDU. Further, high priority PDUs are those with requirements like low latency, delay intolerant or emergency PDUs which shall be prioritized. Upon receiving notification over 5G for a 4G PDU, the UE 100 needs to perform one of the following actions further the UE 100 to respond to paging over 4G if MT paging is for a high priority PDU; or the UE 100 to move 4G PDU (to one to which paging has been received or all the high priority PDUs) to 5G (as 5G is in connected mode).

In an embodiment, UE can tune to 4G during paging occasions to listen to paging or to perform TAU. When Periodic TAU timer expires, UE can tune to 4G to send TAU suspending on-going session over 5G. Once TAU procedure is performed, UE enters 4G IDLE state and resumes suspended data session over 5G. If MT paging has come for high priority PDU, then UE can suspend the current on-going session over 5G to respond to paging for the high priority PDU over 4G and perform movement of PDU from 4G to 5G and respond to paging. High priority PDUs are those with requirements like low latency, delay intolerant or emergency PDUs which shall be prioritized. This approach will lead to high battery consumption and degradation in performance over the RAT with on-going data session. Therefore, this is not an effective solution.

In an embodiment, the network 200 indicates the PDU to be always-on PDU or not in
PDU session establishment response message to the UE 100. In the PDU session establishment request, the UE 100 shall either indicate PDU Type Preference (Always-ON or Normal) or shall not indicate PDU Type Preference to the network 200.

In an embodiment, AT commands can also be used to indicate to modem or NAS layer about which PDU's are to be considered as always-on PDU. During PDU establishment procedure, the UE 100 shall optionally either indicate PDU type preference (always-on or normal) to the network or does not include the PDU type preference to the network 200 in the request message and the network 200 shall indicate a PDU to be always-on PDU or not in PDU session establishment response message to the UE 100.

In another embodiment, during PDU movement between accesses like 4G to 5G or vice versa, the UE 100 shall indicate PDU type preference (always-on or Normal) irrespective of PDU establishment cause (handover, emergency, normal etc.) and network 200 shall indicate the PDU to be always-on PDU or not in response to the UE 100. The UE 100 shall subsequently use the same indication provided by the network 200 in response above until network indicates otherwise.

In another embodiment, if it is not necessary that the PDU is always-on PDU throughout, so this characteristic/feature should be configurable dynamically. The network 200 shall base the decision on different factors like the UE 100 is camped onto home network or visited network, network slice instance, congestion or priority compared with other higher priority users based on subscription in the current registration area etc. This dynamic configuration of the PDU type (always-on PDU or not) shall be provisioned through procedures like UE generic configuration update, PDU modification or any procedure that supports dynamic configuration of UE.

In another embodiment, the PDU and its type (always-on PDU or not) shall be configured statically through SIM and these corresponding SIM fields shall be updated if the network 200 dynamically configures it. A few alternatives to achieve this through SIM (adding a new EF) is listed below. Add this feature/rule as part of the URSP (UE route selection policy) for each PDU/DNN/S-NSSAI. Optionally include the expected behavior of the UE for that particular PDU/DNN/S-NSSAI in the home network as well as visited network (can be part of new EF or modify the existing EF). Alternatively, the information shall be stored in the non-volatile memory of the UE. Provision as a configuration object inside UE. Add new EF in SIM for each PDU (optionally one for home or visited network each/one per PDU irrespective of camped network). Alternatively add one EF that defines number of PDUs that are considered by the network 200 as a candidate for always-on PDUs and adds EF for each PDU to indicate the PDU type preference. The network 200 shall use static/dynamic methods to update the PDU type preference by network.

In another embodiment, the CP 120 stores the PDU type preference (always-on or normal) as configured by the network 200 during static/dynamic methods. Based on this, the CP 120 shall decide if PDU type is always-on or Normal. Also, the CP 120 decides the PDU type preference based on AT command parameter, device type or based on latency, priority requirements indicated in the AT command or DNN/APN name.

In another embodiment, the negotiation of PDU type preference (always-on or normal) between the UE 100 and the network 200 shall be included as a feature supported by the UE during registration procedure and the network shall confirm if this negotiation feature for PDU is supported or not in the registration response message. The network 200 shall indicate as an independent feature support or as part of the network feature support IE. Only if the network confirms the feature support, the UE 100 shall set PDU type preference for a PDU during PDU establishment procedure or other similar procedures where PDU type preference can be negotiated.

In another embodiment, the network or operator shall add pre-defined APN/DNN with always-on PDU type preference called "configured APN/DNN/Slice Based (NSSAI) for always-on PDU Sessions". These "configured APN/DNN/

Slice Based (NSSAI)" can be modified by the network using one of the proposed methods. The UE 100 shall use the same PDU type preference as set in configured APN/DNN/Slice Based (NSSAI) for always-on PDU Session in all subsequent procedures until network indicates otherwise.

In another embodiment, the method can be used to handle the abnormal cases where the network 200 sends a reject to UE for the service request or PDU Session Establishment procedure or any other procedures where PDU Type preference is negotiated.

After getting reject with a cause during PDU session establishment procedure, any of the following actions are performed.

Option 1: the UE 100 can immediately re-request PDU session establishment for that DNN/S-NSSAI but not mark as Always ON, Option 2: the UE 100 can re-request the PDU session establishment for that DNN/S-NSSAI and mark as Always-ON ONLY after a pre-defined time based on the cause, Option 3: the UE 100 will never re-request that PDU session as always on for that DNN/S-NNSAI, and Option 4: the UE 100 can re-request PDU session establishment for that DNN/S-NSSAI and mark as always on based on some pre-defined number of times.

After getting Service Reject, based on the reject cause possible options are:

a) The UE 100 does not include the always on PDU as part of uplink data status IE when sending the next SR unless there is data pending for that PDU at the time of sending SR, b) The UE 100 continues to include the always on PDU as part of uplink data status IE when sending the next SR, c) operate as mentioned in point (b) above but only for a pre-defined time and after that time has elapsed then continue as mentioned in point (a) above, d) Operate as mentioned in point (a) until the UE 100 is power off, USIM removed, e) The above 4 options (i.e., a to d) can be performed based on the DNN or S-NSSAI or any combination thereof.

In another embodiment, if the UE 100 receives the different 5G-GUTI in 3GPP access in registration accept message then the network 200 indicates that N3GPP registration is required in result IE of registration accept or any other way, then the UE 100 shall do the re- registration for non-3GPP access using new 5G-GUTI through a N3IWF 300.

In another embodiment, if the UE 100 receives the different 5G-GUTI in 3GPP access in registration accept message then the network 200 indicates that N3GPP registration is required in result IE of registration accept or any other way, and the UE 100 shall do the re- registration for non-3GPP access by below way. The UE 100 will use new 5G-GUTI for routing parameters so that the N3WIF selects the new AMF. In registration message, the UE 100 shall send the old GUTI which was there for N3WIF, so that new AMF fetches the context from old AMF.

In another embodiment, if the UE 100 receives the different 5G-GUTI in N3GPP access in registration accept message then the UE 100 and/or the network 200 indicate that 3GPP Registration is required in result IE of registration accept or any other way (e.g. if network 200 provides registration accept only for N3GPP), then the UE 100 shall do the re-registration for 3GPP using new 5G-GUTI through the 3GPP access RAN.

In another embodiment, if the UE 100 receive the different 5G-GUTI in N3GPP access in registration accept message then the UE 100 and/or network 200 indicates that 3GPP registration is required in result IE of registration accept or any other way (e.g. if the network 200 provides registration accept only for N3GPP), then the UE 100 shall do the re- registration for 3GPP using 3GPP access RAN 400 by below way. The UE 100 will use new 5G-GUTI for routing parameters so that 5G Node B selects the new AMF. In registration message, the UE shall send the old GUTI which was there for 3GPP, so that new AMF fetches the context from old AMF.

Figure 25:
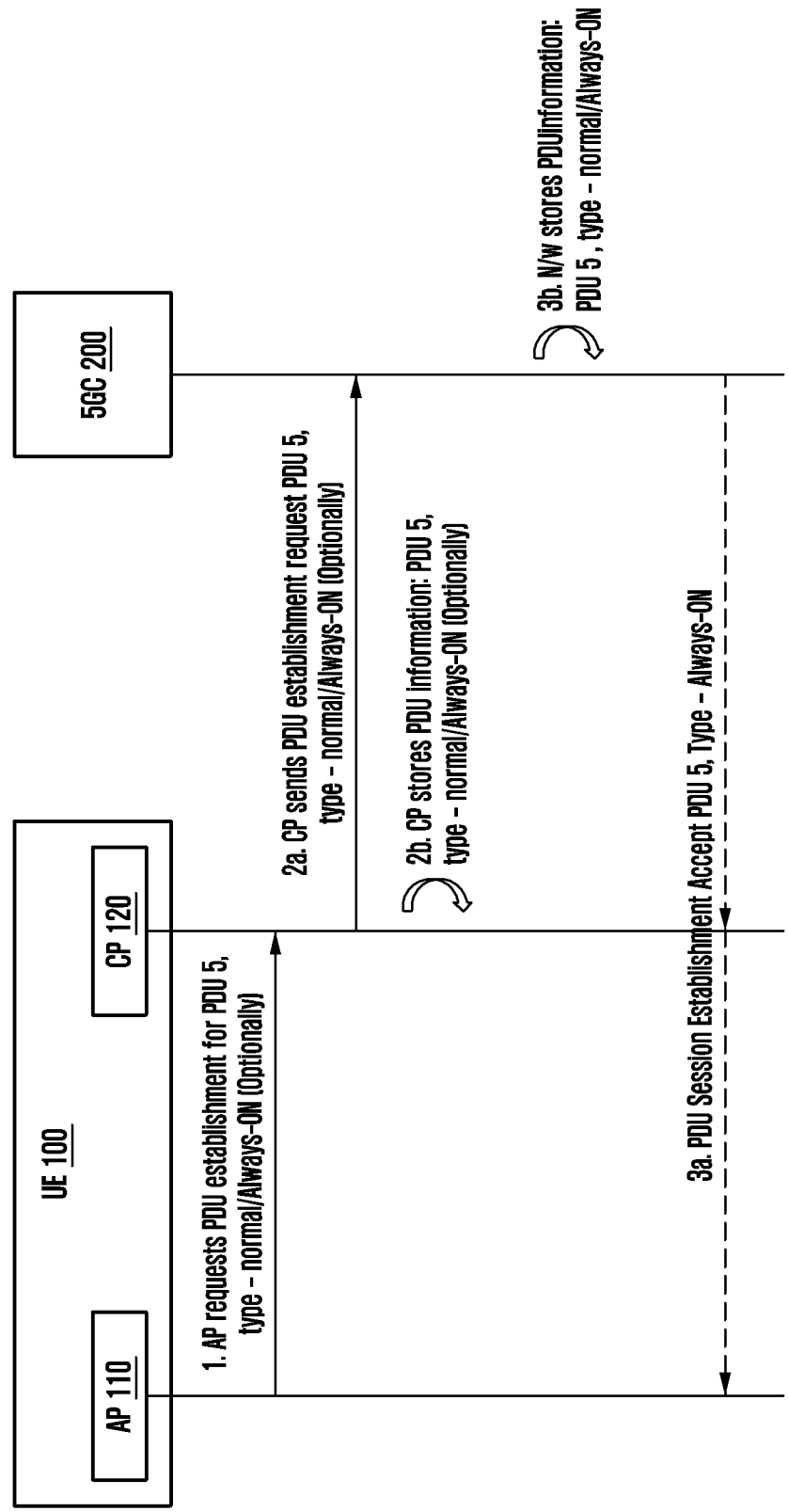
FIG. 25 is an illustration of a method for a network shall indicate a PDU to be always-on PDU or not in PDU session establishment response message to UE, according to embodiments as disclosed herein.

FIG. 25 is an illustration of the network 200 indicating the PDU to be always-on PDU or not in PDU session establishment response message to the UE 100, according to embodiments as disclosed herein.

In an embodiment, the when UE 100 initiates PDU session establishment procedure, either optionally shall indicate the PDU type preference as always-on PDU or normal PDU and the network 200 shall indicate the accepted PDU preference type (always-on or normal) to the UE 100 in the PDU session establishment accept message.

At 1, the AP 110 requests PDU establishment for PDU 5, type - normal/Always-ON (Optionally). At 2a, the CP 120 sends PDU establishment request PDU 5, type—normal/Always-ON (Optionally) to the network 200. At 2b, the CP 120 stores PDU information: PDU 5, type—normal/Always-ON (Optionally). At 3a, the network 200 sends the PDU session establishment accept PDU 5, Type—Always-ON to the UE 100. At 3b, the network 200 stores PDU information: PDU 5, type—normal/Always-ON.

Figure 26:
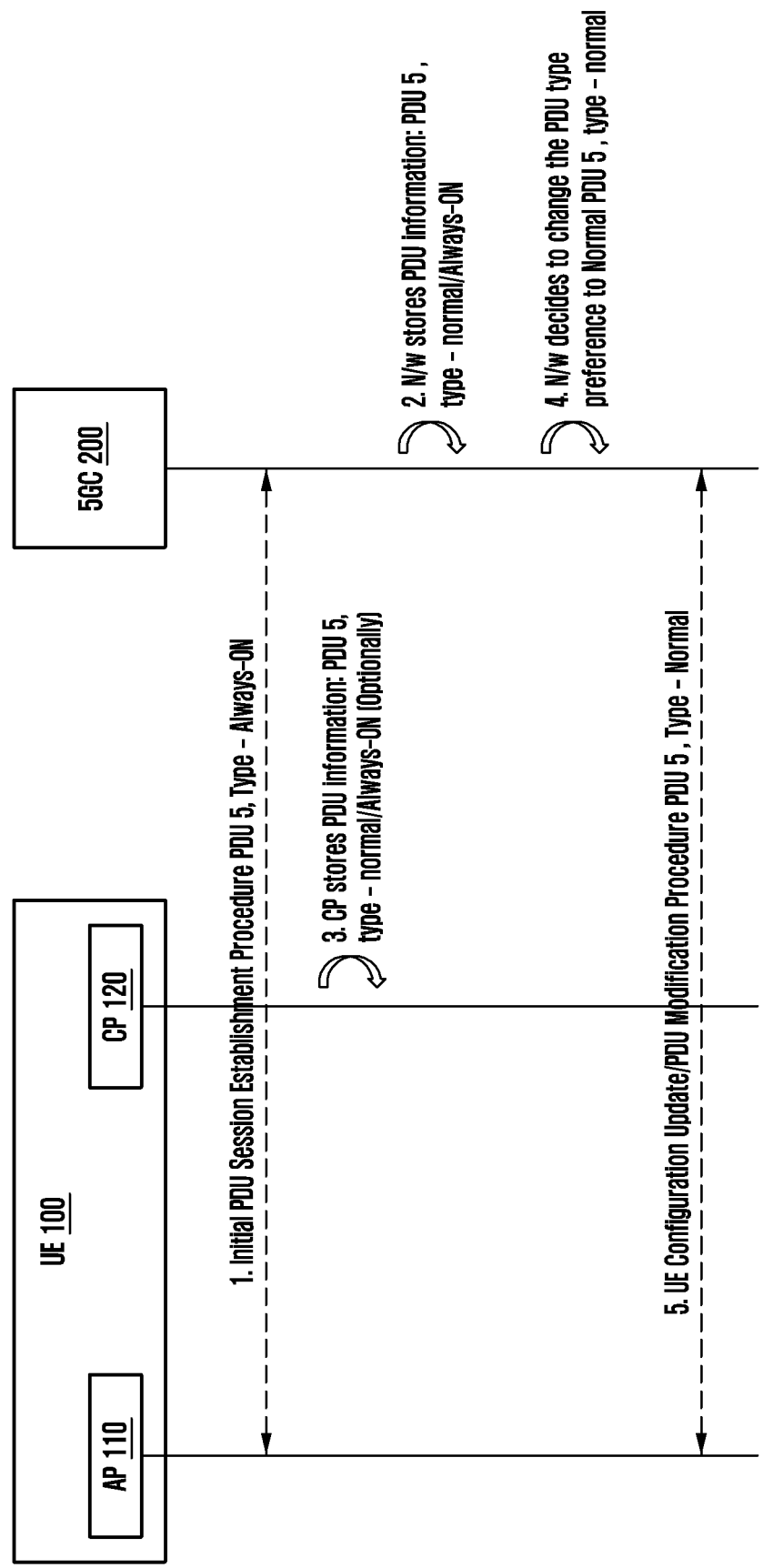
FIG. 26 is an illustration of a method for dynamic configuration of a PDU type (Always-ON PDU or not) to UE, according to embodiments as disclosed herein.

FIG. 26 is an illustration of a method for dynamic configuration of the PDU type (i.e., Always-ON PDU or not) to the UE 100, according to embodiments as disclosed herein.

During initial PDU session establishment procedure, the network 200 and the UE 100 negotiate the PDU preference type for each PDU. Consider a scenario where the network 200 decides to modify the PDU preference type from always-on to normal due to say subscription issues. This can be achieved by dynamically configuring the PDU preference type using procedures like UE generic configuration update or PDU modification, etc.

As shown in the FIG. 26, At 1, Initial PDU session establishment procedure PDU 5, Type—Always-ON. At 2, the network 200 stores PDU information (i.e., PDU 5, type—normal/Always-ON). At 3, the CP 120 stores PDU information (i.e., PDU 5, type—normal/Always-ON (Optionally)). At 4, the network decides to change the PDU type preference to normal PDU 5, type—normal. At 5, the UE 100 performs the configuration update/PDU Modification Procedure PDU 5 and Type—Normal.

In an embodiment, if the UE 100 has one or more active PDU sessions which are not accepted by the network 200 as always-on PDU sessions and no uplink user data pending to be sent for those PDU sessions then, the UE 100 shall not include those PDU sessions in the Uplink data status IE in the REGISTRATION REQUEST message.

In an embodiment, if the UE 100 has one or more active PDU sessions which are not accepted by the network 200 as always-on PDU sessions and no uplink user data pending to be sent for those PDU sessions then, the UE 100 shall not include those PDU sessions in the Uplink data status IE in the service request message.

If the Always-on PDU session indication IE is included in the PDU session modification command message then, the value of the IE is set to "Always-on PDU session required", the UE 100 shall consider the established PDU session as an always-on PDU session; or b) The value of the IE is set to "Always-on PDU session not allowed", the UE 100 shall not consider the established PDU session as an always-on PDU session.

In an embodiment, the UE shall not consider the modified PDU session as an always-on PDU session if the UE 100 does not receive the Always-on PDU session indication IE in the PDU session modification command message.

In an embodiment, if the UE 100 requests to establish the new PDU session as an always-on PDU session, the UE 100 shall include the Always-on PDU session requested IE and set the value of the IE to "Always-on PDU session requested" in the PDU session establishment request message.

In an embodiment, the AT commands can be used to indicate to modem/NAS layer about which PDU's are to be considered as always-on PDU. When the UE 100 initiates PDU session establishment procedure, either optionally shall indicate the PDU type preference as always-on PDU or normal PDU and the network 200 shall indicate the accepted PDU preference type (always-on or normal) to the UE 100 in PDU session establishment accept message.

Figure 27:
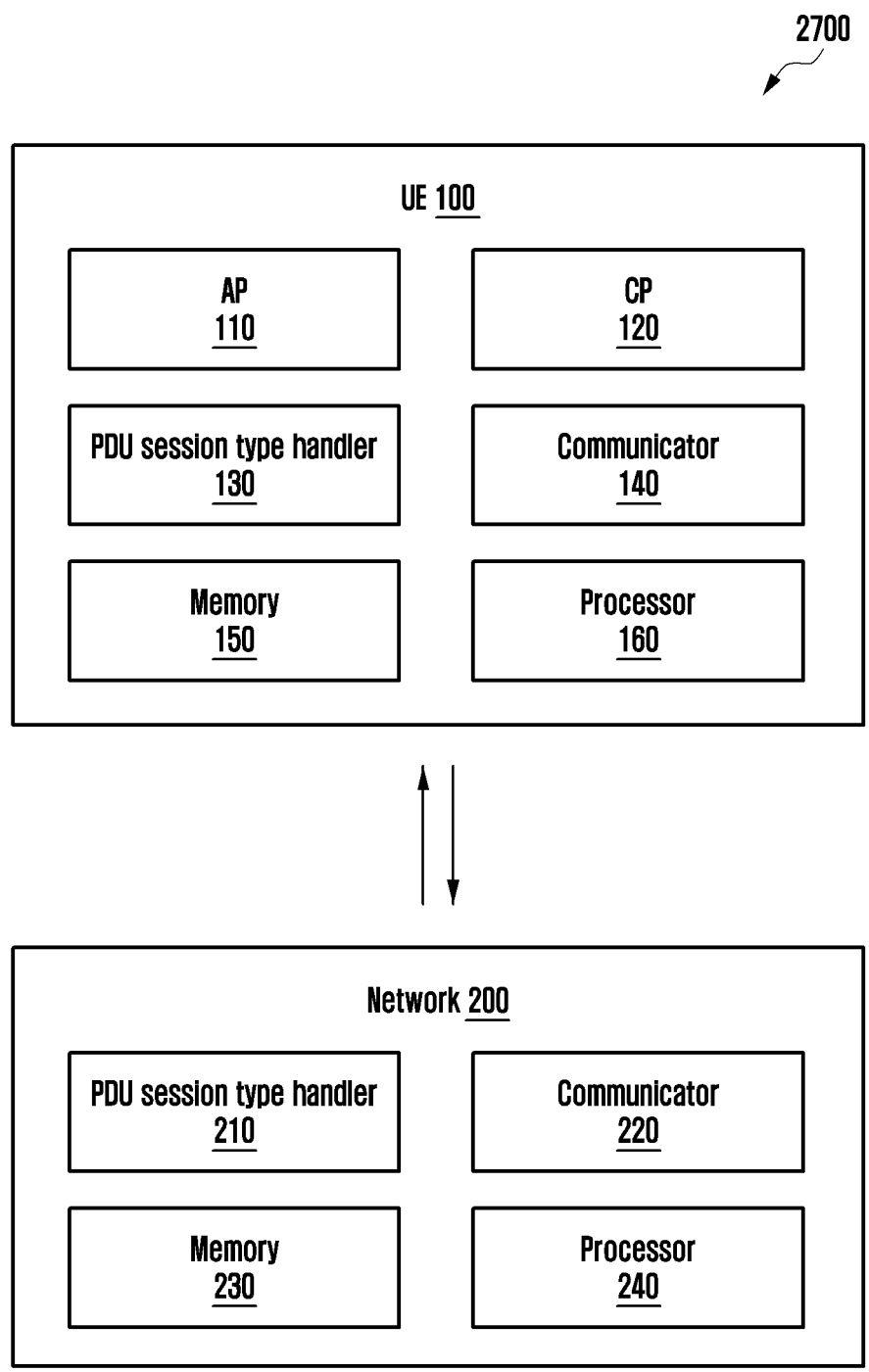
FIG. 27 is a schematic diagram of a system for handling the service request procedure in a wireless communication system, according to embodiments as disclosed herein.

FIG. 27 is a schematic view of a wireless communication system 2700 for handling the service request procedure, according to embodiments as disclosed herein. In an embodiment, the wireless communication system 2700 includes the UE 100 and the network 200. The UE 100 includes an AP 110, a CP 120, a PDU session type handler 130, a communicator 140, a memory 150 and a processor 160. The network 200 includes a PDU session type handler 210, a communicator 220, a memory 230 and a processor 240.

The processor 160 is communicated with the AP 110, the CP 110, the PDU session type handler 130, the communicator 140, and the memory 150. The PDU session type handler 130 configures the PDU session type as always-ON type. Further, the PDU session type handler 130 is configured to initiate one of the service request and the registration request procedure to the network 200. The one of the service request and the registration request procedure includes the PDU session type as always-ON type in the uplink status information element (IE) request. Further, the PDU session type handler 130 is configured to handle the service request procedure in the wireless communication system based on the one of the service request and the registration request procedure including the PDU session type as always-ON type in the uplink status IE request.

In an embodiment, the PDU session type as always-ON type indicates that activate user plane resources between the UE 100 and the network 200, when the UE 100 is moving from the CM IDLE mode to the CONNECTED mode. In an embodiment, the PDU session type as always-ON type in the uplink status IE request avoids the delay in resource establishment for PDUs.

In an embodiment, the PDU session type as always-ON type manages user plane resources when the UE (100) is in the CM_CONNECTED mode.

In an embodiment, the PDU session type handler 130 is configured to request a PDU session to be established as the always-on PDU session based on indication from the upper layers (e.g. application layer 110) and the network 200 decides whether the PDU session is established as the always-on PDU session.

In an embodiment, the UE (100) configuring a Protocol Data Unit (PDU) session type as an always-ON type and send a PDU session establishment request message including the PDU session type to be the always-ON type to a network (200) during an initial PDU session establishment procedure. The network (200) receives the PDU session establishment request message including the PDU session type to be the always-ON type from the UE (100) and determines that the PDU session type as the always-ON type or a normal PDU type based on the PDU session establishment request message.

In an embodiment, the UE (100) configures the PDU session type as the always-ON type based on one of a configuration in a Universal Integrated Circuit Card (UICC), an indication from upper layers, and attention (AT) commands.

In an embodiment, the PDU session type is determined as the always-ON type or the normal PDU type based on one of a configuration in the network (200), a subscription in the network (200), and indicating to the UE (100) in a PDU session establishment response message.

In an embodiment, the network (200) configures the PDU session to be the always-ON type in a PDU session establishment response message based on one of a configuration in the network (200) and a subscription in the network (200) irrespective of no indication of the PDU session type as the always-ON type from the UE (100) during the PDU session establishment procedure.

In an embodiment, the UE (100) configures the PDU session type as the always-ON type based on the UE configuration irrespective of no indication in the PDU session establishment response from the network (200).

In an embodiment, the UE (100) is configured to initiate one of a service request procedure and a registration request procedure to the network (200), wherein the one of the service request procedure and the registration request procedure comprises a PDU session identifier with a PDU session type as always-ON type in an uplink data status information element (IE) request.

In an embodiment, the PDU session identifier with the PDU session type as the always-ON type in the uplink data status IE request indicates setting a bitmap of the PDU session ID in the uplink data status IE which is the always-ON type.

In an embodiment, the PDU session type as the always-ON type indicates that a user plane resource between the UE (100) and the network (200) is always activated for PDU sessions, when one of the UE (100) is moving from a CM IDLE mode to a CM-CONNECTED mode and the UE (100) is in a CM-CONNECTED mode.

In another embodiment, the UE (100) dynamically configures a change corresponding to a PDU session type as an always-ON type to a normal PDU type or a normal PDU type to an always-ON type and indicates a PDU session type as one of an always-ON type and a normal type to a network (200) irrespective of a PDU establishment cause in a PDU session establishment request message. The network (200) receives the PDU session type as one of the always-ON type and the normal type from the UE (100) and determines that the PDU session type as the always-ON type or the normal type based on one of the PDU session establishment request message, a configuration in the network (200) and a subscription in the network (200).

In an embodiment, the PDU establishment cause indicates at least one of a handover scenario, an emergency scenario, and a normal scenario.

In an embodiment, the PDU session type as the always-ON type is maintained at the UE (100) and the network (200).

In an embodiment, the UE 100 has one or more active PDU sessions which are not accepted by the network 200 as always-on PDU sessions and no uplink user data pending to be sent for those PDU sessions then, the PDU session type handler 130 shall not include those PDU sessions in the uplink data status IE in a registration request message.

In an embodiment, if the UE 100 has one or more active PDU sessions which are not accepted by the network 200 as always-on PDU sessions and no uplink user data pending to be sent for those PDU sessions, the PDU session type handler 130 shall not include those PDU sessions in the uplink data status IE in the service request message.

In an embodiment, the UE 100 shall not consider the modified PDU session as the always-on PDU session if the PDU session type handler 130 does not receive the Always-on PDU session indication IE in the PDU session modification command message.

In an embodiment, if the UE 100 requests to establish a new PDU session as the always-on PDU session, the PDU session type handler 130 shall include the always-on PDU session requested IE and set the value of the IE to "Always-on PDU session requested" in the PDU session establishment request message.

In an embodiment, the requested PDU session needs to be established as the always-on PDU session, a SMF shall include the always-on PDU session indication IE in the PDU SESSION ESTABLISHMENT ACCEPT message and shall set the value to "Always-on PDU session required".

Below table 3 indicates the PDU session establishment request message content.

TABLE 3

| EI | Information Element | Type/Reference | Presence | Format | Length |
|---|---|---|---|---|---|
|  | Extended protocol discriminator | Extended protocol discriminator 9.2 | M | V | 1 |
|  | PDU session ID | PDU session identity 9.4 | M | V | 1 |
|  | PTI | Procedure transaction identity 9.6 | M | V | 1 |
|  | PDU SESSION ESTABLISHMENT ACCEPT message identity | Message type 9.7 | M | V | 1 |
|  | Selected PDU session type | PDU session type 9.10.4.8 | M | V | ½ |
|  | Selected SSC mode | SSC mode 9.10.4.12 | M | V | ½ |
|  | DNN | DNN 9.10.3.19 | M | LV | 2-TBD |
|  | Authorized QoS rules | QoS rules 9.10.4.9 | M | LV-E | 7-65538 |
|  | Session AMBR | Session-AMBR 9.10.4.10 | M | LV | TBD |
| 59 | 5GSM cause | 5GSM cause 9.10.4.2 | O | TV | 2 |
| 29 | PDU address | PDU address 9.10.4.7 | O | TLV | 7,11 or 15 |
| 56 | RQ timer value | GPRS timer 9.10.2.3 | O | TV | 2 |
| 22 | S-NSSAI | S-NSSAI 9.10.2.6 | O | TLV | 3-10 |
| 7F | Mapped EPS bearer contexts | Mapped EPS bearer contexts 9.10.4.6 | O | TLV-E | 7-65538 |
| 78 | EAP message | EAP message 9.10.2.2 | O | TLV-E | 7-1503 |
| 7B | Extended protocol configuration options | Extended protocol configuration options 9.10.4.4 | O | TLV-E | 4-65538 |
| xx | Always-on PDU session indication | Always-on PDU session indication 9.10.4.y | O | TV | 1 |

Below table 4 indicates PDU SESSION ESTABLISHMENT ACCEPT message content.

TABLE 4

| EI | Information Element | Type/Reference | Presence | Format | Length |
|---|---|---|---|---|---|
|  | Extended protocol discriminator | Extended protocol discriminator 9.2 | M | V | 1 |
|  | PDU session ID | PDU session identity 9.4 | M | V | 1 |
|  | PTI | Procedure transaction identity 9.6 | M | V | 1 |
|  | PDU SESSION ESTABLISHMENT ACCEPT message identity | Message type 9.7 | M | V | 1 |
|  | Selected PDU session type | PDU session type 9.10.4.8 | M | V | ½ |

TABLE 4-continued

| EI | Information Element | Type/Reference | Presence | Format | Length |
|---|---|---|---|---|---|
| | Selected SSC mode | SSC mode 9.10.4.12 | M | V | ½ |
| | DNN | DNN 9.10.3.19 | M | LV | 2-TBD |
| | Authorized QoS rules | QoS rules 9.10.4.9 | M | LV-E | 7-65538 |
| | Session AMBR | Session-AMBR 9.10.4.10 | M | LV | TBD |
| 59 | 5GSM cause | 5GSM cause 9.10.4.2 | O | TV | 2 |
| 29 | PDU address | PDU address 9.10.4.7 | O | TLV | 7, 11 or 15 |
| 56 | RQ timer value | GPRS timer 9.10.2.3 | O | TV | 2 |
| 22 | S-NSSAI | S-NSSAI 9.10.2.6 | O | TLV | 3-10 |
| 7F | Mapped EPS bearer contexts | Mapped EPS bearer contexts 9.10.4.6 | O | TLV-E | 7-65538 |
| 78 | EAP message | EAP message 9.10.2.2 | O | TLV-E | 7-1503 |
| 7B | Extended protocol configuration options | Extended protocol configuration options 9.10.4.4 | O | TLV-E | 4-65538 |
| xx | Always-on PDU session indication | Always-on PDU session indication 9.10.4.y | O | TV | 1 |

Below table 5 indicates the PDU SESSION MODIFICATION REQUEST message content.

TABLE 5

| IEI | Information Element | Type/Reference | Presence | Format | Length |
|---|---|---|---|---|---|
| | Extended protocol discriminator | Extended protocol discriminator 9.2 | M | V | 1 |
| | PDU session ID | PDU session identity 9.4 | M | V | 1 |
| | PTI | Procedure transaction identity 9.6 | M | V | 1 |
| | PDU SESSION MODIFICATION REQUEST message identity | Message type 9.7 | M | V | 1 |
| 28 | 5GSM capability | 5GSM capability 9.10.4.1 | O | TLV | 3-15 |
| 55 | Maximum number of supported packet filters | Maximum number of supported packet filters 9.10.4.6 | O | TV | 3 |
| 7A | Requested QoS rules | QoS rules 9.10.4.9 | O | TLV-E | 3-65538 |
| 7B | Extended protocol configuration options | Extended protocol configuration options 9.10.4.4 | O | TLV-E | 4-65538 |
| TBD | Always-on PDU session requested | Always-on PDU session requested 9.10.4.x | O | TV | 1 |

The Always-on PDU session requested information element is coded as shown in table 6.

TABLE 6

| 8 | 7 | 6 | 5 | 4 | 3 | 2 | 1 | |
|---|---|---|---|---|---|---|---|---|
| Always-on PDU session requested IEI | | | | 0 Spare | 0 Spare | 0 Spare | APSR | octet 1 |

Table 7 indicates the Always-on PDU session requested information:

TABLE 7

Always-on PDU session requested (APSR) (octet 1)

| Bit | | |
|---|---|---|
| 1 | | |
| 0 | | Always-on PDU session not requested |
| 1 | | Always-on PDU session requested |

Bits 2, 3 and 4 are spare and shall be coded as zero.

In another embodiment, the Always-on PDU session indication information element is coded as shown in table 8. The Always-on PDU session indication is a type 1 information element.

TABLE 8

| | | | | | | |
|---|---|---|---|---|---|---|
| 8 7 6 5 4 3 2 1 | | | | | | |
| Always-on PDU session indication IEI | 0 Spare | 0 Spare | 0 Spare | APSI | octet 1 | |

Table 9 indicates the Always-on PDU session indication.

TABLE 9

| Always-on PDU session indication (APSI) (octet 1) | |
|---|---|
| Bit | |
| 1 | |
| 0 | Always-on PDU session not allowed |
| 1 | Always-on PDU session required |

Bits 2, 3 and 4 are spare and shall be coded as zero,

The processor 160 is configured to execute instructions stored in the memory 150 and to perform various processes. The communicator 140 is configured for communicating internally between internal hardware components and with external devices via one or more networks.

The memory 150 also stores instructions to be executed by the processor 160. The memory 150 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 150 may, in some examples, be considered a non-transitory storage medium. The term "non-transitory" may indicate that the storage medium is not embodied in a carrier wave or a propagated signal. However, the term "non-transitory" should not be interpreted that the memory 150 is non-movable. In some examples, the memory 150 can be configured to store larger amounts of information than the memory. In certain examples, a non-transitory storage medium may store data that can, over time, change (e.g., in Random Access Memory (RAM) or cache).

In an embodiment, the network (200) includes a PDU session type handler (210) coupled with the memory (230) and the processor (240). The PDU session type handler (210) is configured to receive one of a service request and a registration request procedure from a UE (100). The one of the service request and the registration request procedure includes a Protocol Data Unit (PDU) session identifier and PDU session type as an always-ON PDU type. The PDU session type handler (210) is configured to determine to provide user plane resources for PDUs based on the PDU session identifier. The PDU session type handler (210) is configured to handle the service request procedure in the wireless communication system based on the user plane resources.

In an embodiment, the PDU session type handler (210) configures a PDU to be an always-ON and activates a user plane resource for a particular PDU session for handling service request irrespective of no indication of the PDU session type as the always-ON in an Uplink Status information element (IE) request during one of a service request procedure and a registration request procedure.

In an embodiment, the PDU session type handler (210) dynamically triggers a configuration change corresponding to a PDU session type as an always-ON type to normal PDU type or a normal PDU type to always-ON type using one of a UE generic configuration update procedure and a PDU modification procedure.

In an embodiment, the PDU session type handler (210) is configured to receive one of a service request and a registration request procedure from a User Equipment (UE) (100). The one of the service request and the registration request procedure includes a Protocol Data Unit (PDU) session identifier with a PDU session type as an always-ON PDU type. The PDU session type handler (210) is configured to determine to provide user plane resources for PDUs based on the PDU session identifier. The PDU session type handler (210) is configured to dynamically trigger the configuration change corresponding to the PDU session type using one of a UE generic configuration update procedure and a PDU modification procedure. The PDU session type handler (210) is configured to handle the service request procedure in the wireless communication system based on the configuration change.

In an embodiment, the PDU session type handler (210) is configured to determine that a PDU session type to be Always-ON PDU type or a normal PDU type in a negotiation between a User Equipment (UE) (100) and the network (200) during an initial PDU session establishment procedure. The PDU session type handler (210) is configured to determine to provide the user plane resources for PDUs. The PDU session type handler (210) is configured to handle the service request procedure in the wireless communication system based on the user plane resources.

The processor 240 is configured to execute instructions stored in the memory 230 and to perform various processes. The communicator 220 is configured for communicating internally between internal hardware components and with external devices via one or more networks.

The memory 230 also stores instructions to be executed by the processor 240. The memory 230 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 230 may, in some examples, be considered a non-transitory storage medium. The term "non-transitory" may indicate that the storage medium is not embodied in a carrier wave or a propagated signal. However, the term "non-transitory" should not be interpreted that the memory 230 is non-movable. In some examples, the memory 230 can be configured to store larger amounts of information than the memory. In certain examples, a non-transitory storage medium may store data that can, over time, change (e.g., in Random Access Memory (RAM) or cache).

In an embodiment, the PDU session type handler (130) includes a PDU session type configuration unit used to handle the service request procedure in the wireless communication system. In an embodiment, the PDU session type handler (210) includes a PDU type determining unit, a user plane resource handling unit, a PDU session type handling unit used to handle the service request procedure in the wireless communication system.

Although the FIG. 27 shows various hardware components of the wireless communication system 2700 but it is to be understood that other embodiments are not limited thereon. In other embodiments, the wireless communication system 2700 may include less or more number of components. Further, the labels or names of the components are used only for illustrative purpose and does not limit the scope of the invention. One or more components can be combined together to perform same or substantially similar function to handle the service request procedure in the wireless communication system 2700.

Figure 28:
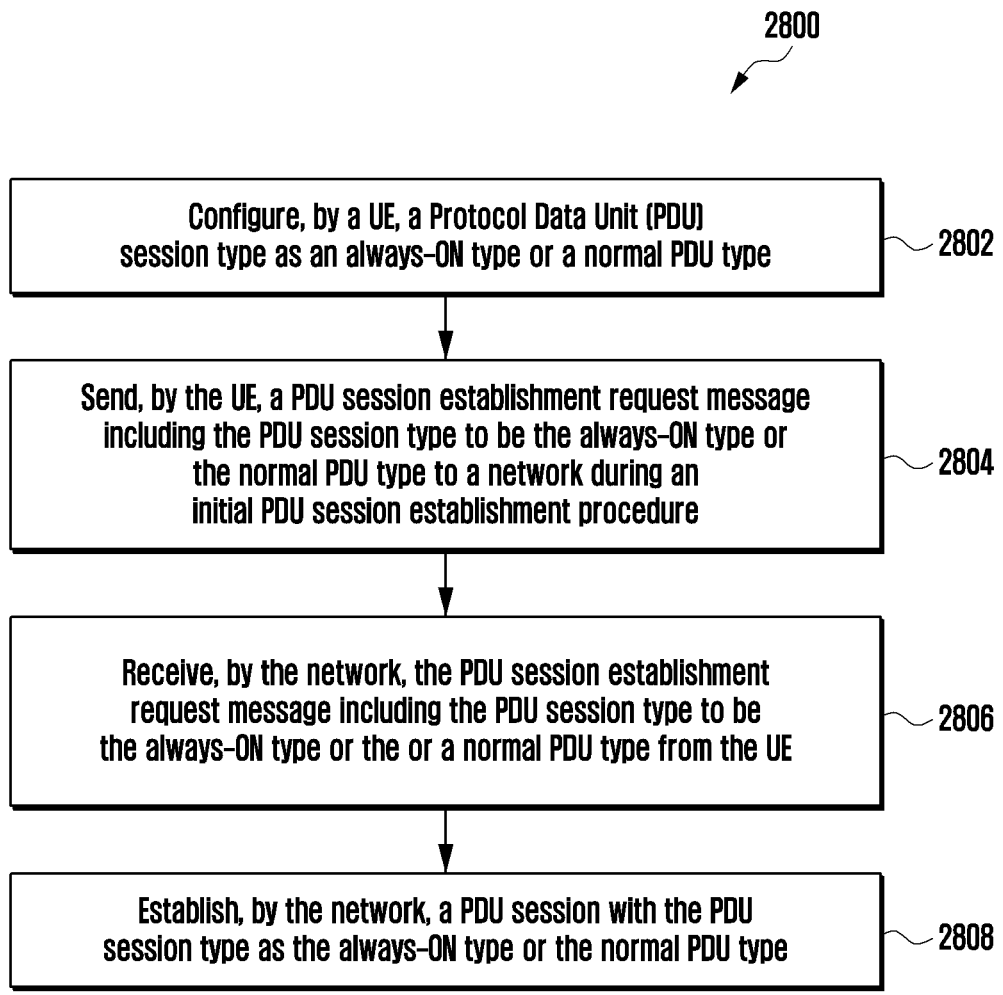
Figure 29:
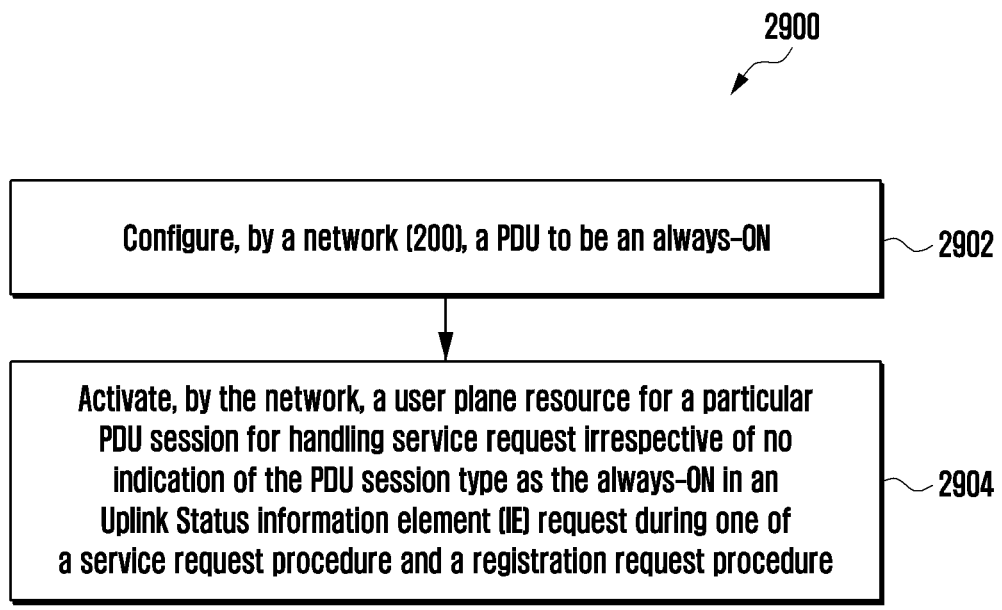

FIG. 28-30 are flow diagrams 2800-3000 illustrating various operations, implemented by the wireless communication system 2700, handling the service request procedure, according to embodiments as disclosed herein.

As shown in the FIG. 28, at 2802, the UE (100) configures the PDU session type as the always-ON type or the normal PDU type. At 2804, the UE (100) sends the PDU session establishment request message including the PDU session type to be the always-ON type or the normal PDU type to the network (200) during the initial PDU session establishment procedure. At 2806, the network (200) receives the PDU session establishment request message including the PDU session type to be the always-ON type or the normal PDU type from the UE (100). At 2808, the network (200) establishes the PDU session with the PDU session type as the always-ON type or the normal PDU type.

As shown in the FIG. 29, at 2902, the network (200) configures the PDU to be the always-ON. At 2904, the network (200) activates the user plane resource for the particular PDU session for handling service request irrespective of no indication of the PDU session type as the always-ON in the Uplink Status IE request during one of a service request procedure and a registration request procedure.

As shown in the FIG. 30, At 3002, the UE (100) dynamically configures the change corresponding to the PDU session type as an always-ON type to a normal PDU type or a normal PDU type to an always-ON type. At 3004, UE (100) indicates the PDU session type as one of an always-ON type and a normal type to a network (200) irrespective of a PDU establishment cause in a PDU session establishment request message. At 3006, the network (200) receives the PDU session type as one of the always-ON type and the normal type from the UE (100). At 3008, network (200) determines that the PDU session type as the always-ON type or the normal type based on one of the PDU session establishment request message, a configuration in the network (200) and a subscription in the network (200).

The various actions, acts, blocks, steps, or the like in the flow diagrams 2800-3000 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a terminal, the method comprising:
   identifying a protocol data unit (PDU) session as an always-on PDU session based on an indication from an upper layer;
   transmitting, to a network entity, a PDU session establishment request message including first information for requesting to establish the PDU session as the always- on PDU session;
   receiving, from the network entity, a PDU session establishment accept message as a response to the PDU session establishment request message, the PDU session establishment accept message including second information indicating whether the PDU session is established as the always-on PDU session;
   determining that the established PDU session is considered as the always-on PDU session, in case that the second information indicates that the PDU session is required as the always-on PDU session; and
   determining that the established PDU session is not considered as the always- on PDU session, in case that the second information indicates that the PDU session is not allowed as the always-on PDU session.

2. The method of claim 1, further comprising:
   identifying whether a user-plane resource for the always-on PDU session is established; and
   transmitting, to the network entity, a message including uplink data status information indicating user data is pending for the always-on PDU session, in case that the user-plane resource for the always-on PDU session is not established,
   wherein the message is a service request message or a registration request message.

3. The method of claim 1, further comprising:
   receiving, from the network entity, a PDU session modification command message including third information indicating whether a PDU session is modified as the always-on PDU session;
   determining that the PDU session as the always-on PDU session, in case that the third information indicates that the PDU session is required as the always-on PDU session; and
   determining that the PDU session is not considered as the always-on PDU session, in case that the third information indicates that the PDU session is not allowed as the always-on PDU session.

4. A method performed by a network entity, the method comprising:
   receiving, from a terminal, a protocol data unit (PDU) session establishment request message including first information for requesting to establish a PDU session as an always-on PDU session;
   determining whether the PDU session is established as the always-on PDU session; and
   transmitting, to the terminal, a PDU session establishment accept message as a response to the PDU session establishment request message, the PDU session establishment accept message including second information indicating that the PDU session is established as the always-on PDU session, in case that the PDU session is established as the always-on PDU session; and
   transmitting, to the terminal, a PDU session establishment accept message as a response to the PDU session establishment request message, the PDU session establishment accept message including third information indicating that the PDU session is not established as the always-on PDU session, in case that the PDU session is not established as the always-on PDU session.

5. The method of claim 4, further comprising:
receiving, from the terminal, a message including uplink data status information indicating user data is pending for the always-on VDU session, in case that a user-plane resource for the always-on PDU session is not established,
wherein the message is a service request message or a registration request message.

6. The method of claim 4, further comprising:
determining whether a PDU session is modified as the always-on PDU session;
transmitting, to the terminal, a PDU session modification command message including fourth information indicating that the PDU session is modified as the always-on PDU session, in case that the PDU session is established as the always-on PDU session; and
transmitting, to the terminal, a PDU session modification command message including fifth information indicating that the PDU session is not allowed as the always-on PDU session, in case that the PDU session is not established as the always-on PDU session.

7. A terminal comprising:
a transceiver; and
at least one processor coupled with the transceiver and configured to:
identify a protocol data unit (PDU) session as an always-on PDU session based on an indication from an upper layer,
transmit, to a network entity, a PDU session establishment request message including first information for requesting to establish the PDU session as the always-on PDU session,
receive, from the network entity, a PDU session establishment accept message as a response to the PDU session establishment request message, the PDU session establishment accept message including second information indicating whether the PDU session is established as the always-on PDU session,
determine that the established PDU session is considered as the always-on PDU session, in case that the second information indicates that the PDU session is required as the always-on PDU session, and
determine that the established PDU session is not considered as the always-on PDU session, in case that the second information indicates that the PDU session is not allowed as the always-on PDU session.

8. The terminal of claim 7, wherein the at least one processor is further configured to:
identify whether a user-plane resource for the always-on PDU session is established, and
transmit, to the network entity, a message including uplink data status information indicating user data is pending for the always-on PDU session, in case that the user-plane resource for the always-on PDU session is not established,
wherein the message is a service request message or a registration request message.

9. The terminal of claim 7, wherein the at least one processor is further configured to:
control to maintain the PDU session as the always-on PDU session after inter- system change between 5G and 4G.

10. The terminal of claim 7, wherein the at least one processor is further configured to:
receive, from the network entity, a PDU session modification command message including third information indicating whether a PDU session is modified as the always-on PDU session,
determine that the PDU session as the always-on PDU session in case that the third information indicates that the PDU session is required as the always-on PDU session, and
determine that the PDU session is not considered as the always-on PDU session, in case that the third information indicates that the PDU session is not allowed as the always-on PDU session.

11. A network entity comprising:
a transceiver; and
at least one processor coupled with the transceiver and configured to:
receive, from a terminal, a protocol data unit (PDU) session establishment request message including first information for requesting to establish a PDU session as an always-on PDU session,
determine whether the PDU session is established as the always-on PDU session, and
transmit, to the terminal, a PDU session establishment accept message as a response to the PDU session establishment request message, the PDU session establishment accept message including second information indicating that the PDU session is established as the always-on PDU session, in case that the PDU session is established as the always-on PDU session, and
transmit, to the terminal, a PDU session establishment accept message as a response to the PDU session establishment request message, the PDU session establishment accept message including third information indicating that the PDU session is not established as the always-on PDU session, in case that the PDU session is not established as the always-on PDU session as a response to the PDU scssion establishment request message, the PDU scssion establishment accept message including second information indicating whether the PDU scssion is established as the always on PDU session.

12. The network entity of claim 11, wherein the at least one processor is further configured to:
receive, from the terminal, a message including uplink data status information indicating user data is pending for the always-on PDU session, in case that a user-plane resource for the always-on PDU session is not established,
wherein the message is a service request message or a registration request message.

13. The network entity of claim 11, wherein the at least one processor is further configured to:
maintain the PDU session as the always-on PDU session after inter-system change between 5G and 4G.

14. The network entity of claim 11, wherein the at least one processor is further configured to:
determine whether a PDU session is modified as the always-on PDU session,
transmit, to the terminal, a PDU session modification command message including fourth information indicating that the PDU session is modified as the always-on PDU session, in case that the PDU session is established as the always-on PDU session, and transmit, to the terminal, a PDU session modification command message including fifth information indicating that the PDU session is not allowed as the always-on PDU session, in case that the PDU session is not established as the always-on PDU session.

* * * * *